(12) United States Patent
Paiz

(10) Patent No.: US 11,468,128 B1
(45) Date of Patent: Oct. 11, 2022

(54) SEARCH ENGINE OPTIMIZER

(71) Applicant: Richard Paiz, N. Miami Beach, FL (US)

(72) Inventor: Richard Paiz, N. Miami Beach, FL (US)

( * ) Notice: Subject to any disclaimer, the term of this patent is extended or adjusted under 35 U.S.C. 154(b) by 1334 days.

(21) Appl. No.: 14/582,236

(22) Filed: Dec. 24, 2014

Related U.S. Application Data

(60) Division of application No. 14/578,439, filed on Dec. 21, 2014, now abandoned, which is a division of application No. 14/474,268, filed on Sep. 1, 2014, now abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No.
(Continued)

(51) Int. Cl.
*G06F 16/951* (2019.01)
*G06F 16/953* (2019.01)

(52) U.S. Cl.
CPC .......... *G06F 16/951* (2019.01); *G06F 16/953* (2019.01)

(58) Field of Classification Search
CPC ......... G06F 17/30867; G06F 17/30525; G06F 17/30731; G06F 17/30598; G06F 17/30056; G06F 17/30705; G06F 17/30817; G06F 17/30707; G06F 17/30687; G06F 17/303672; G06F 17/30979; G06F 17/30994; G06F 16/735; G06F 16/953; G06F 16/951
See application file for complete search history.

(56) References Cited

U.S. PATENT DOCUMENTS 5,025,369 A 6/1991 Schwartz
5,063,506 A 11/1991 Brockweil et al.
(Continued)

FOREIGN PATENT DOCUMENTS

EP 0448800 A1 10/1991

OTHER PUBLICATIONS

Wolfram MathWorld, http://mathworld.wolfram.com/Probability.html, printed Mar. 29, 2019, 2 pp. (Year: 2019).*
(Continued)

*Primary Examiner* — Marc S Somers
(74) *Attorney, Agent, or Firm* — Jonathan Torchman; Torchman IP LLC

(57) ABSTRACT

A search engine optimizer, which works independently and in parallel with a browser and search engine supercomputer to gather, analyze, and distill input information interactively. The optimizer reorganizes the input, and providing an optimized version as an output. The optimized version of the input (e.g. output) is sent to the search engine, which responds to the end user with search results. The optimizer recognizes each request as a pattern and stores the pattern in an advanced Glyph format. This permits the optimizer to identify a left and ride side check mate combination required to achieve certitude.

19 Claims, 26 Drawing Sheets

Related U.S. Application Data

12/785,122, filed on May 21, 2010, now Pat. No. 8,386,456, which is a continuation-in-part of application No. 12/778,228, filed on May 12, 2010, now Pat. No. 8,239,229, which is a continuation-in-part of application No. 11/584,941, filed on Oct. 23, 2006, now Pat. No. 7,809,659, application No. 14/582,236, which is a division of application No. 14/578,439, filed on Dec. 21, 2014, now abandoned, which is a division of application No. 14/474,268, filed on Sep. 1, 2014, now abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/146,420, filed on Jun. 25, 2008, now Pat. No. 7,908,263, application No. 14/582,236, which is a division of application No. 14/578,439, filed on Dec. 21, 2014, now abandoned, which is a division of application No. 14/474,268, filed on Sep. 1, 2014, now abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 11/584,271, filed on Oct. 20, 2006, now abandoned, application No. 14/582,236, which is a division of application No. 14/578,439, filed on Dec. 21, 2014, now abandoned, which is a division of application No. 14/474,268, filed on Sep. 1, 2014, now abandoned, said application No. 14/028,508 is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/778,228, filed on May 12, 2010, now Pat. No. 8,239,229, which is a continuation-in-part of application No. 12/764,934, filed on Apr. 21, 2010, now Pat. No. 8,676,667.

(56) References Cited

U.S. PATENT DOCUMENTS

| | | | |
|---|---|---|---|
| 5,265,065 A * | 11/1993 | Turtle | G06F 17/30011 |
| 5,488,725 A * | 1/1996 | Turtle | G06F 16/3346 |
| 5,504,889 A * | 4/1996 | Burgess | G06F 16/93 |
| 5,585,839 A | 12/1996 | Ishida et al. | |
| 5,671,363 A | 9/1997 | Cristofich et al. | |
| 5,706,497 A | 1/1998 | Takahashi et al. | |
| 5,710,916 A * | 1/1998 | Barbara | G06F 17/30247 |
| 5,748,807 A * | 5/1998 | Lopresti | G06K 9/03 382/310 |
| 5,762,552 A | 6/1998 | Vuong et al. | |
| 5,790,935 A | 8/1998 | Payton | |
| 5,794,210 A | 8/1998 | Goldhaber et al. | |
| 5,809,282 A | 9/1998 | Cooper et al. | |
| 5,819,258 A * | 10/1998 | Vaithyanathan | G06F 16/355 707/692 |
| 5,832,069 A | 11/1998 | Waters et al. | |
| 5,873,099 A | 2/1999 | Hogan et al. | |
| 5,878,113 A | 3/1999 | Bhusri | |
| 5,878,127 A | 3/1999 | Fleischer, III | |
| 5,881,269 A | 3/1999 | Dobbelstein | |
| 5,892,913 A * | 4/1999 | Adiga | H04N 7/17336 348/E7.073 |
| 5,910,981 A | 6/1999 | Bhagat et al. | |
| 5,917,899 A | 6/1999 | Moss et al. | |
| 5,931,901 A | 8/1999 | Wolfe et al. | |
| 5,940,821 A * | 8/1999 | Wical | G06F 17/30672 |
| 5,983,214 A * | 11/1999 | Lang | G06F 16/337 |
| 6,028,924 A | 2/2000 | Ram et al. | |
| 6,069,310 A | 5/2000 | James | |
| 6,078,657 A | 6/2000 | Alfieri et al. | |
| 6,088,733 A | 7/2000 | Kikuchi | |
| 6,128,378 A | 10/2000 | Diener et al. | |
| 6,219,652 B1 | 4/2001 | Carter et al. | |
| 6,243,480 B1 | 6/2001 | Zhao et al. | |
| 6,256,627 B1 | 7/2001 | Beattie et al. | |
| 6,264,560 B1 | 7/2001 | Goldberg et al. | |
| 6,282,653 B1 | 8/2001 | Berstis et al. | |
| 6,330,672 B1 | 12/2001 | Shur | |
| 6,345,182 B1 | 2/2002 | Fabritius et al. | |
| 6,363,253 B1 | 3/2002 | Valentine et al. | |
| 6,385,602 B1 * | 5/2002 | Tso | G06F 16/338 |
| 6,405,188 B1 * | 6/2002 | Schwartz | G06F 17/30687 707/706 |
| 6,408,282 B1 | 6/2002 | Buist | |
| 6,427,132 B1 | 7/2002 | Bowman-Amuah | |
| 6,442,169 B1 | 8/2002 | Lewis | |
| 6,445,785 B1 | 9/2002 | Chan et al. | |
| 6,453,315 B1 * | 9/2002 | Weissman | G06F 16/3338 |
| 6,463,275 B1 | 10/2002 | Deakin | |
| 6,490,345 B2 | 12/2002 | Fleischer et al. | |
| 6,490,580 B1 * | 12/2002 | Dey | G06F 17/30864 |
| 6,508,709 B1 | 1/2003 | Karmarkar | |
| 6,510,419 B1 | 1/2003 | Gatto | |
| 6,516,337 B1 * | 2/2003 | Tripp | G06F 16/951 709/202 |
| 6,529,592 B1 | 3/2003 | Khan | |
| 6,529,878 B2 | 3/2003 | De Rafael et al. | |
| 6,601,044 B1 | 7/2003 | Wallman | |
| 6,614,781 B1 | 9/2003 | Elliott et al. | |
| 6,629,890 B2 | 10/2003 | Johnson | |
| 6,661,884 B2 | 12/2003 | Shaffer et al. | |
| 6,915,268 B2 | 7/2005 | Riggs et al. | |
| 6,947,540 B2 | 9/2005 | Madoch et al. | |
| 7,006,988 B2 | 2/2006 | Lin et al. | |
| 7,059,515 B2 | 6/2006 | White | |
| 7,103,536 B1 | 9/2006 | Kanno | |
| 7,499,914 B2 | 3/2009 | Dieb et al. | |
| 7,552,395 B2 | 6/2009 | Neale et al. | |
| 7,660,815 B1 | 2/2010 | Scofield et al. | |
| 7,725,465 B2 | 5/2010 | Liao et al. | |
| 7,756,850 B2 | 7/2010 | Keith, Jr. | |
| 7,890,526 B1 | 2/2011 | Brewer et al. | |
| 8,620,951 B1 * | 12/2013 | He | G06F 17/3053 707/608 |
| 8,630,975 B1 * | 1/2014 | Guo | G06N 7/005 707/608 |
| 2002/0042793 A1 | 4/2002 | Choi | |
| 2002/0049622 A1 | 4/2002 | Lettich et al. | |
| 2002/0137217 A1 | 9/2002 | Rowe | |
| 2003/0018547 A1 | 1/2003 | Steele | |
| 2003/0050819 A1 | 3/2003 | Koenigbauer et al. | |
| 2004/0024739 A1 | 2/2004 | Copperman et al. | |
| 2005/0114324 A1 | 5/2005 | Mayer | |

(56) References Cited

U.S. PATENT DOCUMENTS

| | | | |
|---|---|---|---|
| 2005/0165753 A1 | 7/2005 | Chen et al. | |
| 2006/0242098 A1 | 10/2006 | Wnek | |
| 2007/0050393 A1 | 3/2007 | Vogel et al. | |
| 2007/0094251 A1* | 4/2007 | Lu | G06F 17/30056 |
| 2008/0168033 A1 | 7/2008 | Ott et al. | |
| 2008/0195477 A1 | 8/2008 | Kennedy et al. | |
| 2009/0100125 A1 | 4/2009 | McDowell | |
| 2009/0150156 A1* | 6/2009 | Kennewick | G06Q 30/0261 |
| | | | 704/257 |
| 2010/0017267 A1 | 1/2010 | Negron | |
| 2011/0125743 A1 | 5/2011 | Immonen et al. | |
| 2011/0145088 A1 | 6/2011 | Bonner et al. | |

OTHER PUBLICATIONS

Robertson, et al. "Cone Trees: Animated Visualization of Hierarchical Information", 1991.

Hearst, et al. "Cat-a-Cone: An Interactive Interface for Specifying Searches and Viewing Retrieval Results using a Large Category Hierarchy", 1997.

Zamir, et al. "Grouper: A Dynamic Clustering Interface to Web Search Results", 1999.

Dumai, et al. "Hierarchical Classification of Web Content", 2000.

Wen, et al. "Clustering User Queries of a Search Engine", 2001.

Yue, et al., "A Video Summarization Tool Using Two-Level Redundancy Detection for Personal Video recorders", 2010.

Unknown, American Banker, "Chemical Buys Trading Software from Reuters", ( v 154, n 145, p. 17, Dialog file 9, Accession No. 00500233), 1994.

Croneliusson, Roy, SAP-R3, Jan. 1999. Downloaded from https:llQupea.ub.gu.se/dspace/bitstream/2077/1359/1/hattab.lA7400,pdf downloaded on Mar. 26, 2008, 47 pages.

SAP-CAPS, 1999. Downloaded from http://web.archive.org/web/19991105101002/www.caps.com/products/sap/sapr3.htm, 3 Pages.

RoutePro, 1999, Downloaded from http://web.archive.org/web/20010627035933/www.caps.com/products/rprodsgrfrpdsgrfeat.htm, 2 pages.

* cited by examiner

# SEARCH ENGINE OPTIMIZER

CROSS REFERENCE TO RELATED APPLICATIONS

This Divisional Patent Application claims the benefit of a. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 12/778,228, filed on May 12, 2010 (issued as U.S. Pat. No. 8,239,229 on Aug. 7, 2012), which claims priority to U.S. Continuation-In-Part patent application Ser. No. 11/584,941 filed on Oct. 23, 2006 (issued as U.S. Pat. No. 7,809,659 on Oct. 5, 2010), which claims the benefit of U.S. Non-Provisional patent application Ser. No. 10/852,394, filed May 24, 2004, (now abandoned), which claims the benefit of U.S. Non-Provisional patent application Ser. No. 10/603,963, filed Jun. 25, 2003, (issued as U.S. Pat. No. 6,842,511 on Jan. 11, 2005), which claims the benefit of U.S. Non-Provisional patent application Ser. No. 09/544,238, filed Apr. 7, 2000, (issued as U.S. Pat. No. 6,614,893 on Sep. 2, 2003), which claims priority to U.S. Provisional Application Ser. No. 60/184,537 filed on Feb. 24, 2000;

b. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 12/146,420, filed on Jun. 25, 2008 (issued as U.S. Pat. No. 7,908,263 on Mar. 15, 2011);

c. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 11/584,271, filed on Oct. 20, 2006 (now abandoned); which claims the benefit of U.S. Continuation-In-Part patent application Ser. No. 10/926,446, filed on Aug. 25, 2004 (issued as U.S. Pat. No. 7,050,813 on May 23, 2006); which claims the benefit of U.S. Continuation-In-Part patent application Ser. No. 10/603,963, filed on Jun. 25, 2003 (issued as U.S. Pat. No. 76,614,893 on Sep. 2, 2003); which claims priority to U.S. Provisional Application Ser. No. 60/184,537 filed on Feb. 24, 2000;

d. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 11/584,271, filed on Oct. 20, 2006 (now abandoned); which claims the benefit of U.S. Continuation-In-Part patent application Ser. No. 10/852,394, filed on May 24, 2004 (now abandoned); which claims the benefit of U.S. Continuation-In-Part patent application Ser. No. 10/603,963, filed on Jun. 25, 2003 (issued as U.S. Pat. No. 6,842,511 on Jan. 11, 2005); which claims the benefit of U.S. Continuation-In-Part patent application Ser. No. 09/544,238, filed on Apr. 7, 2000 (issued as U.S. Pat. No. 6,614,893 on Sep. 2, 2003); which claims priority to U.S. Provisional Application Ser. No. 60/184,537 filed on Feb. 24, 2000;

e. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 12/778,228, filed on May 12, 2010

(issued as U.S. Pat. No. 8,239,229 on Aug. 7, 2012); which claims the benefit of U.S. Continuation-In-Part patent application Ser. No. 10/926,267, filed on Aug. 25, 2004 (now abandoned); which claims the benefit of U.S. Continuation-In-Part patent application Ser. No. 9/514,940, filed on Feb. 28, 2000 (issued as U.S. Pat. No. 7,058,601 on Jun. 6, 2006);

f. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 12/778,228, filed on May 12, 2010 (issued as U.S. Pat. No. 8,239,229 on Aug. 7, 2012); which claims the benefit of U.S. Continuation-In-Part patent application Ser. No. 12/764,934, filed on Apr. 21, 2010 (issued as U.S. Pat. No. 8,676,667 on Mar. 18, 2014); which claims the benefit of U.S. Continuation-In-Part patent application Ser. No. 11/223,226, filed on Sep. 9, 2005 (now abandoned); which claims the benefit of U.S. Continuation-In-Part patent application Ser. No. 10/135,493, filed on Apr. 30, 2002 (now abandoned); which claims priority to U.S. Provisional Application Ser. No. 60/289,033 filed on May 4, 2001;

g. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 12/778,228, filed on May 12, 2010 (issued as U.S. Pat. No. 8,239,229 on Aug. 7, 2012); which claims the benefit of U.S. Continuation-In-Part patent application Ser. No. 12/764,934, filed on Apr. 21, 2010 (issued as U.S. Pat. No. 8,676,667 on Mar. 18, 2014); which claims the benefit of U.S. Continuation-In-Part patent application Ser. No. 11/085,678, filed on Mar. 21, 2005 (now abandoned); which claims the benefit of U.S. Continuation-In-Part patent application Ser. No. 09/819,174, filed on Mar. 27, 2001 (now abandoned); which claims priority to U.S. Provisional Application Ser. No. 60/193,160 filed on Mar. 28, 2000;

h. co-pending U.S. patent application Ser. No. 14/578,439 filed on Dec. 21, 2014, which is a Divisional Application claiming the benefit of U.S. patent application Ser. No. 14/474,268 filed on Sep. 1, 2014, which is a Divisional Application claiming the benefit of U.S. Continuation-In-Part patent application Ser. No. 14/028,508 filed on Sep. 16, 2013, which is a Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of U.S. Continuation-In-Part patent application Ser. No. 13/247,964 filed on Sep. 28, 2011 (issued as U.S. Pat. No. 8,868,535 on Oct. 21, 2014), which claims the benefit of U.S. Continuation-In-Part patent application Ser. No. 12/785,122, filed on May 21, 2010 (issued as U.S. Pat. No. 8,386,456 on Feb. 26, 2013), which claims the benefit of U.S. Continuation-In-Part patent application Ser. No. 12/778,228, filed on May 12, 2010 (issued as U.S. Pat. No. 8,239,229 on Aug. 7, 2012); which claims the benefit of U.S. Continuation-In-Part patent application Ser. No. 12/764,934, filed on Apr. 21, 2010 (issued as U.S. Pat. No. 8,676,667 on Mar. 18, 2014); which claims the benefit of U.S. Continuation-In-Part patent application Ser. No. 11/223,226, filed on Sep. 9, 2005 (now abandoned); which claims the benefit of U.S. Continuation-In-Part patent application Ser. No. 10/135,493, filed on Apr. 30, 2002 (now abandoned); which claims priority to U.S. Provisional Application Ser. No. 60/289,033 filed on May 4, 2001; all of which are incorporated herein in their entireties.

BACKGROUND OF THE INVENTION

Field of the Invention

The present invention relates generally to an Internet search engine optimizer. More particularly, the present invention relates to an interface product that works independently and in parallel with the browser and search engine supercomputer that gathers, analyzes and distills input information interactively.

Conventional Search Engines have various limitations, drawbacks and/or disadvantages that get compounded as the scope of the search increases.

SUMMARY OF THE INVENTION

The invention is directed to an internet search engine. It would be desirable to implement a search engine that-operates with an interactive search scope.

1) Organizing the Environment: The information comprising the environment must be standardized, primed, distributed and configured as a MPS™ supercomputer. Cholti Search Engine Optimizer is the client side of the architecture and behaves in the same manner as traditional 'Boolean Algebra' browser that is able to identify, validate and verify interactively each end user request. Then it categorizes keywords, clusters and geospatial keywords and assigns them to left or right side of the brain. The left side of the brain consists of the hierarchical three tiers that analyze, and statistically shrinks the valid size of the environment. The right side of the brain is the secondary method of shrinking the size of the environment by assisting the left side by weighting and distilling the hierarchical set with geospatial information.

First, the software must select from the available valid keywords for a combination that does a global domain search that is referred as the Superset (i) of a request. The keywords used to create the Superset (i) must be exhausted from the request bitmap that stores with 1 and 0 each keyword. 1 denotes valid and unused, while 0 invalid or used. Second, the software must continue to select from the remainder valid keywords for a combination that does a regional domain search that is referred as the Set (i, j) of the request and is subordinate to a superior Superset (i). The keywords used to create the Set (i, j) are exhausted from the request bitmap. For each Superset (i) a plurality of Set (i, j) may exist. Third, the software must continue to select from the remainder valid keywords for a combination that does a local domain search that is referred as the Subset (i, j, k) of the request and is subordinate to a superior Set (i, j). The keywords used to create the Subset (i, j, k) are exhausted from the request bitmap. For each Set (i, j) a plurality of Subset (i, j, k) may exist. Based on the request bitmap unused keywords become essential in the process of deciphering with certitude the optimal result page.

2) Limiting the size of the environment: From the master list of keywords for a specific language in this case English the optimizer will be able to associate them to related groups. Keyword can be English language words, mixed or commercial names, scientific words, important people, geographical places such as cities or zip codes, IP Addresses and ANI or phone numbers. The MPS™ uses organizational management techniques to partition the environment into three managerial hierarchical tiers from top to bottom global, regional and local. Furthermore, each keyword belongs to an environment that may not exceed 2^30 or 1,073,741,824 or 1 billion page results. Those page results that exceed the maximum limit are considered improbable. By prohibiting the environment size never to exceed the one 1 billion page result limit the following trend occurs: "as the size of the environment is reduced proportionally the informal entropy improves". Performing analysis on smaller primed and valid environments permits the optimizer to eliminate the geometric rate of growth of complexity associated with the raw and unmanaged Internet. Complexity is the core catalyst of why the environment is confounded and disorganized and resembles spaghetti. The Superset (i), Set (i, j) and Subset (i, j, k) hierarchical set are designed to logically partition the raw and unmanaged environment. Cholti uses mathematical parameters to create smaller primed and valid environments that take into account that any given request in particular the last one is not optimal. The system creates Super Sites that comprise of correlating the entire content of the IP Address into a single object. Each object is assigned to a unique Quality plane to further help the optimizer to assign a search value limit. Super Sites will have a value or weight associated with each unique significant difference requests in a session.

Using the benefit of U.S. Pat. No. 7,809,659 Independent Claim 1 language teaches as follows:

(A) defining a searchable environment;
(B) subdividing and arranging the searchable environment into a managerial hierarchy resembling a pyramid structure;
(C) providing a keyword database containing all of the recognized words for a given language;
(D) measuring the relative occurrence of each of said recognized words within the searchable environment and assigning a quantitative value to each said recognized word, establishing a minimum word value associated with vague terms and establishing a maximum word value associated with unique terms, wherein said vague terms are defined as terms having the highest quantity of occurrences of the term in the searchable environment and unique terms are defined as terms having the lowest quantity of occurrences of the term in the searchable environment;
(E) providing a link database of searchable Internet web pages, wherein the searchable Internet web pages are provided within the searchable environment;
(F) analyzing the content of each of said Internet web pages based upon a set of predetermined semantic guidelines for said language and assigning a relative quantitative value to each of said Internet web pages based on said analysis;
(G) quantifying and qualifying the content of each of said Internet web pages based on a comparison of said content with a plurality of predefined individual word collections, each word in a particular one of said word collections sharing a common assigned value;
(H) creating an Environmental Bitmap Pyramid Structure, wherein the pyramid structure arranges words in hierarchical groupings, being arranged via a probabilistic weighted value of each of said Internet web pages wherein,
(I) an environmental bitmap is defined as a summary analysis of the best fit web pages for a given partition of the searchable environment;
(J) an Environmental Bitmap Pyramid Structure is defined as a having at least two of the following layers:
   (i) a keyword search returning an estimated $10^{10}$ matches,
   (ii) a simple layer refinement returning an estimated $10^6$ matches,
   (iii) a hybrid layer refinement returning an estimated $10^4$ matches,
   (iv) a complex layer refinement returning an estimated $10^2$ matches,
   (v) an optimal layer refinement returning the optimal match, and
(K) wherein the subject layers corresponding to said managerial hierarchical sub partition for a given keyword search;

The following 25 Paragraphs are presented and incorporated by reference in its entirety as originally presented in U.S. patent application Ser. No. 11/584,941 filed on Oct. 23, 2006 (issued as U.S. Pat. No. 7,809,659 on Oct. 5, 2010).

W_RANK

An expert system Supercomputer, commercially known as XCommerce, works in an organized and hierarchical manner to represent all of the links, content of the Internet and the massive traffic volumes derived from the consumers interactions with the environment.

UCommerce Searches: The client software must require from the end user a supplier before making a search. Once the end user selects the valid supplier for a given product, the system can start the partial search commands that are sent to each TWS®, SIS® and MPS® that using X_FOB and Y_CDIF methods create optimal transportation cost from Leg X to Leg Y. When the supplier system responds from the active memory information of each Intelligent Component, the client merges all of the partial commands to a single version of the truth. The Intelligent Component does not make a SQL command request instead of the Intelligent Component has control of the inventory, and is responsible for managing and coordinating the flow of information sent to it to be processed by the different clients. Once the information is made to the Intelligent Component, it will match/merge optimal routes in its entirety or partially until the best satisfying means of delivery are obtained.

Rule 84: Electronic Files, Internet links and the associated HTML content can be standardized, organized and transformed into geospatial information using W_RANK Rule 85: W_RANK uses eigenvectors to identify the value of each link and its content, and the supplier system must normalize this information into a compatible Partial Vector CDR method that is based on Partial Differential Equations. The lion share of the conversion and normalization is done by the specialized programming of the 'HIVE', which gathers, distills and analyzes the spaghetti of the environment by mapping, standardizing, organizing and transforming the information into logical groups and sets to make them compatible.

Rule 97: Each node is an element belonging to a superset, set, subset and sub cluster or group configuration.

Rule 98: XCommerce uses W_RANK, the environmental bitmap of optimal inventory that measures the Internet content based on quality, quantity, reliability and security values. The Internet is considered a Superset (U) that can consist of a plurality of sets, subsets, groups and basic elements.

Browsers Gather Information: The (UI) or the Internet Universe Superset contains all of the information that is obtained by web crawlers that are programmed to scan predefined subdivision of the chaos and anarchy environment, and in return then as geospatial data with balance, harmony and proportion, so that a cluster of 64 CPU can divide and conquer its content. Each node has 1/n links or content of the Internet. These nodes parse the information with a plurality of regular expressions designed to identify common denominator patterns of alphanumeric characters that are hereinafter referred as KEYWORDS. Each unique IP Address is considered a link that is comprised by a plurality of HTML web pages with content, hereinafter referred as PAGES. The cluster, using a dictionary of valid Keywords and databases of LINK values, helps populate the multi independent variables associated with solving the Eigenvector most satisfying solution based on the known content (UI).

Rule 99: Each link is considered to be a container that has a plurality of pages.

Rule 100: Each page consists of a plurality of valid words that are used to measure the value of each page in the Internet.

Browsers Organized Information: Now, that the information has been normalized and standardized, the cluster can correlate the data to eliminate bad or incomplete information and through the process of simplification remove the lion share of data which is redundant, leaving only exact data that is highly useful and unique. As each link is extracted and valorized for content value of its subordinate PAGES, the system places signature values such as (I) KEYWORD, (J) Frequency, (K) LINGUISTIC WORD PATTERNS, (X) LINK Value, (Y) Reliability and (Z) Popularity, with a mini set or micro universe of the browsers (UB) limitations to a discrete number of responses n, where the cluster cherry picks the discrete sorted by valuing the resultant of the maximized Eigenvector (UB) with (I, J, K, X, Y, Z,) characteristics that respond to a simple regular expression inquiry. LINGUISTIC WORD PATTERN valorization method is explained in the new art concerning XCommerce. To those in the field each link describes a IP Address and Pages describes web pages belonging to the IP Address.

Rule 101: End users can use a valid word or Keyword to make a broad search of the content of the Internet that has the same characteristics of an Order.

Rule 102: Advanced Keyword Searches consist of associating valid words and operands to form a group set that has the same characteristics of a Micro Order.

Browsers Standardize Information: The browsers gather the information from the environment as begin rationalizing and standardizing the raw mountains of meaningless data into the essence of the matter that mathematical explains with quantifiable values what is good, bad or redundant. As each HTML is parsed, the browser detects Keywords and compares the historical LINK information (X, Y, Z,) preserved in a Data Warehouse. Then the system uses eigenvectors based on algorithms to normalize, quantify and qualify as statistical distribution that permits which discrete group of PAGES (I, J, K,) or elements of the Superset (UI) is the most satisfying response to the end user inquiry.

Rule 103: Each cluster has a hash table for the most valuable results of a Keyword Search, in addition, the hash table contains the pointer address of location within the compressed files possessing the content of the Internet. The hash table contains information of the domain of each node.

Rule 104: The Master node possesses a hash table for the entire Internet that helps derive the filtering parameters to instantiate a query response.

Rule 105: The system uses Eigenvectors to quantify and qualify with mathematical formulas Advanced Keyword Searches, so the system can derive an optimal discrete query response. The Master node match/merges the response of each node and then correlates into a single list.

Browsers Transform Information: As the content of a HTML is converted into Keywords and WORD PATTERNS values, all of a sudden, the raw meaningless data can be expressed as the primed correlated single version of the truth vector based data with (I, J, K, X, Y, Z,) independent variables, to name a few. Where (I, J, K,) are the independent variables that analyze the KEYWORD content as it refers to a group of logically organized words, used to communicate a message that has been translated into a lingua franca mathematical language that is not confounded. Furthermore, possessing (X, Y, Z,) that independent variables that are used to normalize links within the scope of particular sets, that belong to the superset UI that is relational and dimensioned based on quality, popularity, product and satisfaction patterns of behavior.

Rule 106: The first Keyword is considered primary, the second one secondary, the third one tertiary, and so forth. A primary Keyword has a higher weighted value than a secondary one, and so forth.

Rule 107: The system match/merges an Advanced Keyword Search or a Regular Expression instantiates the equivalent of a Micro Order container.

Rule 108: The system categories the magnitude of each Keyword from 0 to 15, where 0 is vague expressed in billions of responses, and 15 unique.

Rule 109: The system for each Keyword creates three structures: Simple, Hybrid and Complex Pyramids that gather, distill, analyze, organize and transform the content into geospatial bitmap data.

Rule 110: A Simple Pyramid search consists of a container that possesses the equivalent of exactly 1,000,000 optimal query responses that resemble a resultant Macro Order after match/merging a plurality of Partial Vector Set Searches.

Rule 111: A Hybrid Pyramid search consists of a container that possesses the equivalent of exactly 10,000 optimal query responses that resemble a resultant Super Order after match/merging a plurality of Partial Vector Set Searches.

Rule 112: A Complex Pyramid search consists of a container that possesses the equivalent of exactly 100 optimal query responses that resemble a resultant Global Order after match/merging a plurality of Partial Vector Set Searches.

Rule 116: The system must first identify the magnitude of each valid word.

3) Deductive Reasoning: Once the search engine optimizer creates an equation and assigns valid Hot & Cold Algorithm parameters to reduce the size of the environment. Hot Algorithm measures the end user's usage pattern for each keyword, whereas Cold Algorithm analyzes the usage patterns and the fluctuating 'Boolean Algebra' keyword strength to determine its irrelevancy factor.

Using the benefit of U.S. Pat. No. 7,809,659 Independent Claim 1 language teaches (L) a probabilistic weighted value is a weighted magnitude respective to the number of occurrences of a search pattern identified within each web page belonging to each said subject layers, the weighted magnitude having a lowest magnitude, a highest magnitude, and a series of values therebetween, wherein the lowest magnitude is associated with the lowest certainty and precision and the highest magnitude is associated with the highest certainty and precision of the search pattern within the subject layers;

(M) gathering, correlating and distilling the content of each of said subject layers to match and merge its own vector data record with its own environmental bitmap using at least one common denominator keyword as the independent variable;

(N) determining the relative magnitude of each web page of said subject layers based on said analysis and the results of said quantifying and qualifying, and assigning a relative magnitude to each of said common denominator page clusters; and (O) determining and presenting the optimal results of the requested search by utilizing refining steps provided in the Environmental Bitmap Pyramid Structure.

Once the environmental boundaries are known for a request and session using the Hot & Cold parameters for each keyword or cluster Cholti has all required information to solve mathematically for the optimal solution.

Then keywords and clusters are converted into Glyph objects. Each Glyph has an exact match value that is used to measure the quality of each page. The three groups of Glyphs that are used to create the hierarchical set are Superset (i), Set (i, j) and Subset (i, j, k) have a value of 1. When a page has a value of it 1 it is denotes that it is being measured using 'Boolean Algebra' means. The system creates Super Pages that are objects that store a plurality of relative value a given page may have during a session. A session comprises a plurality of consecutive requests. The system optimally gathers four samples for each request as follows:

A) Ax or 'Before' measures the implicit 'Boolean Algebra' size of the environment, and serves as a point of reference to calibrate a search.

B) Bx or 'After' is how the optimizer reorganizes and valorizes each keyword in a request to further distill and limit the size of the environment.

C) Cx or 'Improved' is the process that derives the optimal environment size by using the Hot and Cold Algorithms. During this process information is match/merged and stored into the Super Sites objects. The Cx samples are relative small and range in size from 10,000 to 1,000.

D) Dx or 'Optimal' is the process that 'cherry picks' the optimal results by comparing the resulting Cx sample size against the dynamic value of each valid Glyph. During this process information from relevant pages are match/merged and stored into Super Page objects. The Dx samples are tiny and range in size from 1,000 to 100 always being ten percent of the Cx sample. The top 20 Super Pages that have the highest values based on the end user session conditions are parsed and measured by paragraph to determine the final value. The highest valued Super Page is the optimal result.

To those in the field the neural network performs a set of nested probabilistic reductions sample environments the Ax or 'Before', then the Bx or 'After', then the Cx or 'Improved' and finally the Dx or 'Optimal' intermediate reductions to map the output.

4) Session driven requests: The optimizer must take into account a plurality of requests within a session. Those requests that can be associated with a valid common denominator Superset (i), Set (i, j) or Subset (i, j, k) keyword or cluster are considered related. Those that are not directly associated to the last end user's request are considered unrelated. Related requests that are not directly linked to the last request are considered inactive, whereas unrelated requests are mulligan and are omitted. Keywords that are considered to be too strong are de-emphasized from the 'Boolean Algebra' process and are known as 'Zero Clusters' that in turn are converted into Super Glyphs but removed from the environmental filtering process. Omitted keywords via mulligan are also converted into Super Glyphs that help during the process of weighting each Super Pages. A Super Page for each request has a 'Deductive Reasoning' W_Rank Basis value that determines the relative weight that ranges from 0.001 no good to 10 awesome.

5) Super Pages: The system uses the Super Sites to identify missing gaps of information, and logically inserts them into Super Pages. The systems also identifies auxiliary variables that consists of a collection of keywords that would be directly associated with keywords or clusters used in the environmental filtering process. The Super Page is an improvement over the traditional page rank, since it contains a plurality of values obtained from each valid request used to reach the final destination, and not just a single request. As a dynamic object the system can insert missing gaps of information, and then rank each page within its own limited IP Address or Super Site environment.

Cholti uses 'Deductive Reasoning' approach that is a clever and more intuitive criminal investigation means that mimics Sherlock Holmes case solving techniques. A language based search engine optimizer must use as point of reference a lingua franca that is mathematical and simultaneously integrates a particular language, personal, geospatial, time and corporate information.

Cholti Scripted Algorithm (hereinafter Cholti) is the commercial name of the client side of the XCommerce Architecture and these are its new features:

1) Restricting the Size of the Environment: Cholti is programmed to limit the size of the Internet environment between the Upper Limit of approximately 1 billion and Lower Limit of 1,024 page results compared to its existing size of approximately 30+ billion. The environment is subdivided parallel running planes that represent the different quality $Q(x)$ of the sites from 0 to 10. Each Site also has a sub partition or $Q(x, y)$ where y ranges from 1 to 100. $Q(x, y, z)$ has a third dimension where z is the commercial value of the Keyword.

Once the system filters out redundancy and each Page and each Site is given a Quality value $Q(x)$, Cholti awards to each valid page a W_Rank Basis from 0.001 to 10. Each page based on their page rank gets a W_Rank Basis as follows: 0=0.001, 1=0.01, 2=0.10, 3=0.25, 4=0.50, 5=1, 6=2, 7=4, 8=6, 9=8, and 10=10. When analyzing a given request Cholti may use other variables and mathematical filters to be able to shrink the environment optimally. Cholti software accomplish said task by doing the following:

A) Identifies each Keyword to be valid or invalid and then assigns to each keyword a raw vector value based on the raw magnitude. Verifies each keyword to belong to the left or right side of the brain, where English (E), Mixed (M) and some geospatial (G) belonging to clusters comprise the [L]

(left side) and geospatial information comprises the [R] (right side). The Mayan lingua franca Cholti is based on the use of Glyphs from combining [L] left side and [R] right side information to express a thought, thus the software also mimics the same.

B) Creates an Auxiliary Variables and Cluster List. See Example #1 XCommerce Finds missing gaps of Information.

C) Validates [L]+[R] side independent variables belonging to a request based on raw hits to see if they are valid by being below the 1 billion and above the Lower Limit 1,024 result page W_RANK Basis parameters.

D) Plots and maps keywords into a Basic Glyphs and determines the estimated 'Boolean Algebra' search value X[0] and then finds the best preprocessed Basic Glyph Y[0].

2) Estimated Point of Origin X[0] 'Before'

A) Groups keywords to belong to (E), (M), (G), & (Z) categories.

B) (Z) are 'Zero Clusters' or very strong keywords. 'Zero Clusters' restrict a search, since they often obscure or hide the best results. We will later show how Zero Cluster limits 'Boolean Algebra' searches, and how to circumvent these pitfalls to yield optimal results.

C) An anchor is a single keyword that is used as a common denominator to shrink the size of the environment. See Example #2 Basic Glyphs. A cluster is a group of two to five consecutive keywords that consists of a valid English language common denominator that filters the size of the environment. [L] Left Side Basic Glyphs consists primarily of English grammar or language logical groups.

D) For each request made by the end user the system creates a bitmap that maps and assigns with an element each independent variable. Example: "American Civil War Battlefield" is converted to (G1+E1+E2+E3). Where "American"=G1, "Civil"=E1, "War"=E2 and "Battlefield"=E3. Cholti creates a bitmap that looks as this 1111. 1 denotes that a keyword is valid and 0 invalid or already used.

E) Superset (i) is the primary filter that attempts to shrink the size of the environment to 4,194,304 W_Rank Basis. The anchor keyword or the best filtering word is "Battlefield" or E3. Cholti determines that "Civil War" or (E1+E2) and "American Civil War" or (G1+E1+E2) are valid clusters. The system always assigns for a Superset the top valid Cluster filter. In this case "American Civil War" is the top cluster that is less than approximately 1 billion and greater than 4,194,304 W_Rank Basis. Thus, Cholti assigns to Superset (i) the cluster "American Civil War" or (G1+E1+E2) and then updates the bitmap to 0001.

F) Set (i, j) is the secondary filter that attempts to shrink the environment to a size of 131,072 W_Rank Basis. The anchor keyword or the remaining best filtering word is E3 or "Battlefield". Cholti determines no valid clusters are available. The system always assigns for a Set the top valid Cluster filter otherwise the highest valued keyword. In this case "Battlefield" or E3 within Superset (i) consisting of "American Civil War" or (G1+E1+E2) is the top keyword that is greater than 131,072 net result pages or W_Rank Basis. Thus, Cholti assigns to Set (i, j) the keyword "Battlefield" or E3 and then updates the bitmap to 0000.

Example: End user's request is "American Civil War Confederate Battlefield". Cholti converts it into (G1+E1+E2+E3+E4) and has a bitmap of 11111. "American Civil War" or (G1+E1+E2) is the Superset (i), and "Confederate" or E3 is the Set (i, j) and updates the bitmap to 00001.

G) Subset (i, j, k) is the tertiary filter that attempts to shrink the environment to a size of 16,384 net result pages or W_Rank Basis. The anchor keyword or the best filtering word is "Battlefield" or E4. Cholti determines no valid clusters are available. The system always assigns for a Subset the top valid Cluster filter otherwise the highest valued Keyword. In this case "Battlefield"=E4 is the top keyword within Superset (i) consisting of "American Civil War" or (G1+E1+E2) that is within the Set (i, j) "Confederate" or E3 that is greater than 16,384 W_Rank Basis. Thus, Cholti assigns to Subset (i, j, k) the keyword "Battlefield" or E4 and updates the bitmap to 00000.

Example: End user's request is "American Civil War Confederate Battlefield Gettysburg". Cholti converts it into (G1+E1+E2+E3+E4+G2) with a bitmap of 111111. Superset (i) consists of the cluster "American Civil War" or (G1+E1+E2), the Set (i, j) consists of the keyword "Confederate" or E3, and Subset(i, j, k) consists of the keyword "Battlefield" or E4 and updates the bitmap to 000001.

H) Left Side data exists as long as Superset(i) or Set(i, j) or Subset(i, j, k) are greater than 0. [R] Right Side Glyphs consists of geospatial keywords that are expressed as Geodata (w, x, y, z) vectors. Where each letter refers to the following: w=country, x=state, y=city or county and z=zip code. Geodata (w, x, y, z) belongs to the [R] right side and is the counterpart of the [L] left side anchors and clusters that modify the W_Rank Basis value of each page.

Example: End user's request is "Wachovia Bank". That in turn is converted into (G1+E1) and has a corresponding bitmap of 11. (G1+E1) is the Set (i, j). The Superset (i)=0 and the Subset (i, j, k)=0.

I) Only during the Y[3] or the third point of the triangulation is that Cholti attempts to find the optimal result.

3) Preprocessed Basic Glyph patterns Y[0]

Preprocessing is done by AI Spider Parsers that scan, gather, analyze and update the content of the environment. Cholti and XCommerce creates a master hierarchical distribution known as the 'CORE List' comprising of 100,000 Superset (i) that is partitioned into 10,000,000 of subordinate Set (i, j) and is further partitioned into 1,000,000,000 subordinate Subset (i, j, k) to solve for 95% of the random surfing searches to the final destination. The list is further reinforced with a list of 15,000,000 keywords, 10,000 real time, 100,000 hourly, 1,000,000 daily, 10,000,000 weekly, 100,000,000 monthly and 1,000,000,000 yearly top requests based on the usage pattern of the entire internet that are estimated to solve 95% of the direct searches to the final destination. An exact or direct request is one that reaches the final destination in one request. Exact or direct searches are estimated to be 30% of the traffic whereas random surfing the remainder 70%. Data warehousing resource intensive preprocessing are performed for each keyword as follows: About 90% of the keywords belonging to 'CORE List' are geospatial and have no auxiliary variables or clusters lists and are known as Geodata (w, x, y, z). The remainder 10% of the keyword has the top 8 to 32 clusters and the associated auxiliary variables with Hot & Cold parameters.

To those in the field the HIVE scans, gathers, analyzes and updates the content of the Internet and stores the optimal dataset within the 'CORE List' describes using the benefit of U.S. Pat. No. 7,908,263 dependent Claim 2 language "scanning each request and determining based on the quality of the keyword combination whether at least one of the supersets (i), the secondary sets (i, j), and the tertiary subsets (i, j, k) of the managerial hierarchical partition exists in the Super Glyph database, and thus having readily available and pre-processed the optimal response, requiring no further calculations, bypassing the usage of existing search engine capabilities.".

Ax or 'Before' is an end user request made with 'Boolean Algebra' and create a default hierarchical set with specific limits as follows:

A) Superset (i) size is less than 1 billion and greater than 4 million net result pages W_Rank Basis. The Superset upper limit is the minimum of (Superset (i) W_Rank Basis*1.33 or 1 billion). The Superset lower limit is the maximum of (Superset (i) W_Rank Basis*0.70 or 4,194, 304). Where Superset (i)>Set (i, j)>Subset (i, j, k). The overall Superset (i) has the upper limit of the highest valued Superset (i) and the highest valued lower limit in a session.

B) Set (i, j) size is less than Set (i, j) upper limit and greater than Set (i, j) lower limit expressed in net result page or W_Rank Basis. Set (i, j) upper limit is minimum of (Ax Set (i, j) W_Rank Basis*0.7 or 33,554,432). Set (i, j) lower limit is maximum of (Ax Superset (i) lower limit*0.2 or 262,144).

C) Subset (i, j, k) size is less than Subset (i, j, k) upper limit and greater than Subset (i, j, k) lower limit expressed in net result pages or W_Rank Basis. Subset (i, j, k) upper limit is minimum of (Ax Subset (i, j, k) W_Rank Basis*0.7 or 262,144). Subset (i, j, k) lower limit is maximum of (Set (i, j) lower limit*0.2 or 16,384).

D) Each Superset (i) of a session is greater or equal to all the valid Set (i, j) subordinate domains. Each Set (i, j) of a session is greater or equal than all the valid Subset (i, j, k) subordinates domains.

E) A session may a have up to 20 significant 'before' requests. Each request has at least one Superset (i) such as 'before''after', and 'improved'. Superset (i) may have a plurality of valid Set (i, j) for a given request. Set (i, j) may have a plurality of valid Subset (i, j, k) for a given request. Each valid request has at least one Superset (i) or one valid geospatial Glyph. Each valid Superset (i) has a plurality of Set (i, j). Each valid Set (i, j) has a plurality of Subset (i, j, k).

Example: The Basic Keyword is "War"=E1. Cholti will develop "War" as the Superset (I=1) and "War+DV pairs+ Homepage" Superset (I=2). Where Superset (I=1) is the upper limit and Superset (I=2) is lower limit.

Example: Superset (1)="War" and Superset (2)="War+ DV+Homepage" will have a plurality of valid Set (1, j 1-4) broadest, Set (2, j 1-4), Set (3, j 1-4), Set (4, J 1-4) narrowest. Thus Civil War, American Revolutionary War, War World I, War World II, Iraq War, Vietnam War exists based on the value of the cluster at the moment of the calculation.

Example: Subset (1, 1, 1-16) . . . Subset (4, 4, 1-16) for a total of 256 or (4*4*16) valid sets. Note some Subset (i, j, k) or Set (i, j) may be null or empty. Note: if a Superset (i), Set (i, j) or Subset (i, j, k) is not null then it must comply with the numeric Upper and Lower limits.

F) Cholti uses Q (x, y, z) values to filter and shrink each member of the hierarchical set to its top 1024 W_Rank Basis.

G) When a request is not part of the 'CORE List' the following procedures occur: 1) each active HQ node rearward chains to the HQ owner the request the top 1, 5, 10, 50, 100, 500, and 1024 Q(x, y, z) values via environmental bitmap. 2) Then HQ owner of the request match/merges the environmental bitmap information with Q(x, y, z) information of its subordinates and determines the Q(x, y, z) value that yield the top 1024 values. 3) Then HQ owner of the request forward chains to each participating HQ nodes the 'Cherry picking' Q(x, y, z) values. 4) Participating HQ node rearward chain the information to the HQ owner. 5) The HQ owner creates a localized Z_Price Bitmap. 6) The HQ owner rearward chains the localized Z_Price Bitmap 7) The AI Spider Parsers analyzes the content of the bitmaps and then determines if the information is of significant difference based on traffic usage patterns to be included in the 'CORE List'.

H) Alternatively to G) the system identifies the closest common denominator Basic Glyph known patterns Q(x, y, z) and adjusts the value for a slightly broader search. Then performs all the steps in G). The difference is that many top values of HQ nodes may be null, drastically reducing the match/merge process. HQ nodes always send top 1, 5 and 10 results or send a null bitmap response.

4) First Point of the Triangulation X[1] 'After'

A) Cholti reorganized the end user's request and transforms the Basic Glyph and converts them into an Advanced Glyph or a valid search pattern of behavior. Clusters are converted into Unload or Loaded Cholti Symbols or C(x). Single keyword remains as they were. Then Cholti creates a bitmap the size of the valid independent variables, based on request made on the end user. For example "American Civil War Battlefield" is converted to (C1+E3). Where "American Civil War"=C1 or (G1+E1+E2) and "Battlefield"=E3. Cholti request bitmap looks as 1111. 1 denotes that a keyword is valid and 0 used. During the Hot & Cold Algorithm evaluation Unload Cholti Glyphs that are determined to be reasonable or certain become Loaded Cholti.

B) Superset (2) denotes 'After'. See Example #3 Advanced Glyphs. Superset (2) or 'After' is the primary filter that attempts to shrink the environment to a size of 1,048,576 net page results or W_Rank Basis. The anchor keyword or the best filtering word is Battlefield or E3. Cholti determines that clusters "Civil War"=C1 or (E1+E2) and "American Civil War"=C2 or (G1+E1+E2) are valid or Unloaded Cholti Symbols. The system always assigns for a Superset (i) the top valid filter Cluster. In this case "American Civil War" is the top cluster that is less than 1 billion hits and greater than 1,048,576 W_Rank Basis. Thus, Cholti assigns to the Superset (i) "American Civil War" or (G1+ E1+E2) and then updates the bitmap to 0001. Note: Bx limits are ¼ of Ax limits when a valid cluster is calculated since Cholti estimates exact match patterns where (G1+E1+ E2) becomes "G1+E1+E2".

D) Set (i, j) is the secondary filter that attempts to shrink the environment to a size of 32,768 net page results or W_Rank Basis. The anchor keyword or the best filtering word is E3 or "Battlefield". Cholti determines no valid clusters are available. The system always assigns for a Set (i, j) the top valid filter Cluster otherwise the highest valued Keyword. In this case "Battlefield"=E3 is the top keyword within Superset (i) consisting of "American Civil War" or (G1+E1+E2) that is greater than 32,768 result pages W_Rank Basis. Thus, Cholti assigns to Set (i, j) the keyword "Battlefield" or E3 and updates the bitmap to 0000.

Example: End user's request is "American Civil War Confederate Battlefield". Cholti converts it into (G1+E1+ E2+E3+E4) with a corresponding bitmap of 11111. C1= ("G1+E1+E2") or "American Civil War" is the Superset (i), E3 or "Confederate" is the Set (i, j) and updates the bitmap to 00001.

E) Subset (i, j, k) is the tertiary filter that attempts to shrink the environment to a size of 4,096 W_Rank Basis. The anchor keyword or the best filtering word is Battlefield or E4. Cholti determines no valid clusters are available. Cholti always assigns for a Subset (i, j, k) the top valid filter Cluster otherwise the highest valued keyword. In this case, "Battlefield"=E4 is the top keyword within Superset (i) "American Civil War" or (G1+E1+E2) and within Set (i, j) "Confederate" or E3 that is greater than 4,096 net page results. Thus, Cholti assigns the keyword "Battlefield" or E4 to Subset (i, j, k) and then updates the bitmap to 00000.

Example: End user's request is "American Civil War Confederate Battlefield Gettysburg". Cholti converts it into (G1+E1+E2+E3+E4+G2) and a bitmap of 111111. "American Civil War"=C1 or ("G1+E1+E2") is the Superset (i), "Confederate"=E3 is the Set (i, j), and "Battlefield"=E4 is the subset (i, j, k) and updates and modifies the bitmap to 000001. In this case the geospatial keyword "Gettysburg" or G2 helps valorize the value of each valid page.

Example: End user request is "Wachovia Bank". Cholti converts it into C1 or ("G1+E1") and has a corresponding bitmap of 11. C1 or ("G1+E1") is the Set (i, j). The Superset (i)=0 and the Subset (i, j, k)=0.

F) Geodata (w, x, y, z) multipliers may change from 'Before' to 'After' when creating optimal size of environmental hierarchical sets when using Hot & Cold Algorithm parameters.

5) Preprocessed Advanced Glyph patterns Y[1].

Preprocessing is done by AI Spider Parsers that update the content of the environment. Cholti and XCommerce create the environment size (2) or Superset, (2, j) or Set and (2, j, k) Subset 'After' that will be used for an entire session.

Bx or 'after' is the reorganized end user request made by Cholti and the hierarchical set limits are as follows:

A) Superset (2) size is greater than 256 million and less than 1 million result pages or W_Rank basis. The Superset upper limit is the minimum of (Superset (2) W_Rank Basis*1.33 or 256 million). The Superset lower limit is the maximum of (Superset (i) W_Rank Basis*0.70 or 1,048,576). Where Superset (i)>Set (i, j)>Subset (i, j, k).

B) Set (2, j) size is less than Set (2, j) upper limit and greater than Set (2, J) lower limit. Set (2, j) upper limit is the minimum of (Bx Set (2, j) W_RANK Basis*1.33 or 8,388,608 net result pages W_Rank Basis). Set (2, j) lower limit is the maximum of (Bx Set (2, j)*0.7 or 65,536 net result pages W_Rank Basis).

D) Subset (2, j, k) size is less than Subset (2, j, k) upper limit and greater than Subset (2, j, k). Subset (2, j, k) upper limit is the minimum of (Bx Subset (2, j, k)*1.33 or 65,536 net result pages or W_Rank Basis). Subset (2, j, k) lower limit is the maximum of (Bx Subset (2, j, k)*0.70 or 4096 net W_Rank Basis).

E) Superset (2) of the session is greater or equal to all the valid Set (2, j) subordinate domains. Each Set (2, j) is greater or equal to all the valid Subset (2, j, k) subordinate domains.

F) When a request is not part of the 'CORE List' the HQx owner uses the Ax derived Q(x, y, z) filter and multiplies it value by a coefficient to narrow by ¼ the search the forward chains the request to all the participating nodes.

6) Second Point of the Triangulation X[2] 'Improved'

A) Cholti matches/merges the results derived from the Basic and Advanced Glyphs. Then the Hot Algorithm valorizes each of the missing keyword required to make a valid cluster.

Example: In the request "War", the missing keywords used by the Hot Algorithm to create valid Sets (i, j) are "Civil", "American Civil", "Iraq" & "World" I ("I|II") etc. . . . .

B) Superset (3) or 'Improved' uses the bitmap for Superset (2) 'After'. Superset (3) denotes 'Improved' weighted and correlated data. The 'Improved' hierarchical set of Superset (i), Set (i, j) and Subset (i, j, k) have limits.

C) Geodata (w, x, y, z) has the follow range of values: 'Before' from (0.0001 to 1), 'After' from (0.001 to 15), 'Improved' from (0.01 to 255), Sites or IP Addresses from (0.1 to 4095), and ANI or telephone numbers from (1 to 65535).

D) Keywords, clusters, Glyphs and Geodata have a Social Security numbers or fingerprint that are used to parse the data. These are Social Security numbers help filter large amounts of data. Fingerprints are evenly distributed amongst keyword and Super Sites, based on supply side criteria such as demand and media value.

E) Cholti uses Q (x, y, z) and Super Glyphs to generate a mathematical equation that is able to optimally shrinks the environment, and determine the weight of Super Sites and Pages.

F) A Super Site is linked to a plurality of (green) geospatial and (orange) corporate Super Glyphs that maximizes W_Rank Basis values in a search.

G) Both Super Sites and Super Pages are objects that may a plurality of relative values in a given session. All Super Pages are subordinates to a parent Super Site. A Super Page may be subordinates to a parent Super Page.

H) As a final process Geodata, clusters and relevant keywords are converted into mathematical equations Super Glyphs to derive the Dx or 'Optimal' Sample. Thus, when everything is said and done the search becomes a simple mathematical exercise. Once HQ owner 'Cherry picks' the Dx 'Optimal' response it rearward chains the information to the end user. See Example #4 Super Glyphs.

7) Match/Merge Glyphs Process Y[2]

Preprocessing is done by the XCommerce Supercomputer that updates the content of the environment using the following configuration: MPS™ HQ manage Superset (i) where I=1 to 4, SIS™ HQ manage Set (i, j) where J=1 to 4, TWS™ HQ manage Subset (i, j, k) where K=1 to 16. XCommerce load balances and optimizes throughput and measures four samples at the same time I=1 to 4 or Ax, Bx, Cx, and Dx searches. XCommerce creates the 'Improved' environment size for Superset (3), Set (3, j) and Subset (3, j, k) that will be used for an entire session.

Cx or 'improved' is the reorganized end user request made by Cholti and the hierarchical set limits are as follows:

A) Superset (3) size is less than 128 million and greater than 524,288 result pages W_Rank Basis. The Superset upper limit is the minimum of (Superset (3)*1.33 or 128 million net result pages W_Rank Basis). The Superset lower limit is the maximum of (Superset (i)*0.70 or 524,288 W_Rank Basis). Where Superset (i)>Set (i, j)>Subset (i, j, k).

B) Set (3, j) size is less than Set (3, j) upper limit and greater than Set (3, j) lower limit. The Set (3, j) upper limit is the minimum of (Cx Set (3, j)*1.33 or 4,194,304 net result pages or W_Rank Basis). Set (3, j) lower limit is maximum of (Cx Set (2, j)*0.7 or 131,072 W_Rank Basis).

C) Subset (3, j, k) size is less than Subset (3, j, k) upper limit and greater than Subset (3, j, k) lower limit. Subset (3, j, k) upper limit is the maximum of (Set (3, j) Lower limit*0.5 or 16,384 net result pages or W_Rank Basis). Subset (3, j, k) lower limit is the minimum of (Set (3, J) Lower limit*0.5 or 1024 W_Rank Basis).

D) Superset (3) of the session is greater or equal to all the valid Set (3, j) subordinate domains. Each Set (3, j) of the session is greater or equal to all the valid Subset (3, j, k) subordinate domains.

8) Hot & Cold Algorithm (dynamically calculated)

A) Cholti measures Superset (i), Set (i, j), Subset (i, j, k) and Geodata (w, x, y, z) managerial hierarchy using hot values that reflects the probability or influence an end user's wants for a given keyword. Cholti uses these probabilities when creating logical distribution of resources. All Sessions are owned by the MPS™ (HQ6 and HQ5) that converts glyphs into mathematical Super Glyphs. All Supersets are owned by the SIS™ (HQ4 and HQ3). All Sets are owned by the TWS™ (HQ2 and HQ1). All Subsets are owned by HQ0 nodes. Cholti identifies 'CORE List' keywords, clusters and Glyphs. MPS™ creates all Z_Price Bitmaps.

B) Each request may have a Basic and Advanced Glyphs. Cholti after each request updates the hot or relative vector value and the cold or relative influence value for each keyword. Keyword frequency and usage patterns can temporarily convert keywords into a 'Zero Cluster' or vice versa. By arranging keywords into Basic and Advanced Glyphs Cholti is able to request for optimal Z_Price Bitmaps that has enough information to bypass resource intensive Ax, Bx, Cx, and Dx calculations since they already have the Q(x, y, z) filtering parameters that yields the top 1,024 net page results W_Rank Basis.

C) Hot Algorithm parameters are assigned a higher value the closer the keyword belongs to the last request or is part of significant requests in a session. The Hot Value probabilities helps change the filtering parameters, so that Superset (i), Set (i, j) and Subset (i, j, k) environment sizes approach the lower limits. Once the optimal Super Glyph equation is available the MPS™ creates the Z_Price Bitmap.

D) Cold Algorithm parameters are assigned a lower value when keywords that are denser based on their 'Boolean Algebra' value belongs to non significant requests in a session. The Cold Value probabilities helps change the filtering parameters, so that Superset (i), Set (i, j) and Subset (i, j, k) net result pages or W_Rank approach the optimal maximal limits. Cold Values probabilities help Cholti and XCommerce to decipher the best result using 'Deductive Reasoning' instead of using 'Boolean Algebra' or 'Caesar's divide and conquer' means.

E) Based on Ax 'Before' and Bx 'After' samples and adjusting the environment with Hot & Cold Algorithms the system creates a Super Glyph collection that measures the top Super Site Top 1,024 W_Rank Basis.

F) After Cholti identifies a significant difference request by measuring the change in magnitude the present request is compared to its predecessor. The first valid request is always significant, since it compares against 0 that reflects the entire Internet environment or 30 billion+ result pages. The system readily weights the value of each keyword, cluster and Glyph using Z_Price Bitmaps data from XCommerce.

G) Cholti identifies and validates interactively (or as the end user is typing) and determines each keyword, cluster and best fit Geodata (w, x, y, z).

H) Cholti has specific guidelines to create and identify Basic and Advanced Glyphs. These patterns are continuously updated as the system adds new items to its 'CORE List'. Once the software is able to identify a predefined Basic and/or Advanced Glyph it will immediately have optimal environment results for sessions with exactly one request. When the system has in its possession a Z_Price Bitmap with optimal preprocessed results, it bypasses Ax, Bx, Cx, Dx searches and has the corresponding Superset (i), Set (i, j), and Subset (i, j, k) hierarchical set.

I) Cholti creates a probability telecommunication link tree that associates people, sites and ANI based on analysis of plausible Geodata.

J) 'CORE List' is stored in a Data Warehouse that contains all the valid Glyphs. Items are stored into the 'CORE List' each time a newly derived valid Glyph is dynamically encountered with a Z_Price Bitmap with up to 1,024 results. 'CORE List' has predefined all the Geodata (w, x, y, z) and corporate data. MPS™ assigns keyword and Geodata probabilistic filter values when performing a search. MPS™ 'cherry picks' the top 1, 5, 10, 50, 100, 500, and 1000 responses for each Superset (i) derived the environmental bitmap created by SIS™ nodes. U.S. Pat. No. 6,614,893 and its continuations teach how the forward and rearward chaining of environmental information is synergistically accomplished amongst subordinates and superiors (vertical) and between siblings (horizontal).

K) SIS™ assign values to each Set (i, j) based on the Cold Algorithm probabilistic value of each Glyph and remainder list of unused keywords. SIS™ 'cherry picks' the top 1, 5, 10, 50, 100, 500, and 1000 responses for each Set (i, j) derived from the environmental bitmap created by TWS™ nodes.

L) TWS™ assign values to each Subset (i, j, k) based on the Hot Algorithm probabilistic value of each Glyph and remainder list of unused keywords. TWS™ 'cherry picks' the top 1, 5, 10, 50 and 100 results from Subset (i, j, k) derived the environmental bitmap created from HQ0 nodes.

M) HQ0 or nodes parse information based on a given Glyph search pattern to derive a small size environment, and then uses Super Glyphs collections to weight results using Hot & Cold Algorithms probabilistic values, and each keyword specific vector dimensions to identify the TOP 1, 5, 10, 50 and 100 results. By default, the TOP 10 results are sent to superiors as an environmental bitmap.

N) Glyphs main purpose is to optimally shrink the size of the environment. When a Glyph is an exact match to an end user's response the system bypasses all search process, and displays Z_Price Bitmap information that is optimal and up to date, absent of making any calculation since Cholti has the answer with certitude.

9) Third Point of the Triangulation: Cholti dynamically calculates if each request is of Significant Difference by doing the following:

A) Predefined exact Glyphs are automatically responded as optimal with the Z_Price Bitmap (or Dx) responses contained in the 'CORE List' that are stored in the Business Intelligence Data Warehouse, since the response information is certain. The Z_Price Bitmap also has the Q (x, y, z) with top 1,024 W_Rank Basis for Super Pages, and has the Q (x, y, z) with top 1,024 W_Rank Basis for Super Site information.

B) When a valid Glyph is absent Cholti can logically decipher the missing gaps of information and automatically reasonably select the optimal Z_Price Bitmap (or Dx) responses contained in the 'CORE List' since the response information is reasonably known. The optimal environment is derived using Hot and Cold Algorithm parameters and hierarchical sets. Q (x, y, z) derived from Cx 'Improved' permit Cholti to go straight to the 'Cherry Picking' process.

C) For each request Cholti determines if an appropriate Basic and Advanced Glyph exists. Then based on the unused independent variables relative vector magnitude decides whether or not to instantiate a search. If the system determines a search is not required, the end user's response is based on Z_Price Bitmap information. Otherwise, the Basic and Advanced Glyphs are matched/merged into a resultant hierarchal set.

D) When a session has exactly one significant difference request that is not part of the 'CORE List' the system arranges, organizes and creates an 'Improved' hierarchical set. Cholti weights each page result W_Rank Basis by using the Hot & Cold Algorithm parameters and weight Super Glyphs valorize optimal results.

E) The Hot & Cold Algorithm parameters generate Super Glyphs by using the optimal $Q(x, y, z)$ filter to mimic mathematically the optimal environment. Thus Super Glyph objects consist of an array of probabilities and weights that recreates the optimal environment with a size of 1,024 W_Rank result pages for each request in a given session.

F) Cholti only requests for an optimal request from XCommerce when a significant change is detected, otherwise it must correlate the data. When an optimal Z_Price Bitmap is used to correlate a plurality of common denominator related requests and converts them into a resultant that is considered a single request.

G) When Super Glyphs exists for a plurality of valid related requests the resultant Superset (i), Set (i, j) and Subset (i, j, k) is generated by the Z_Price Bitmap that contains the entire hierarchical set and is expressed with reasonable and probable Super Glyphs vector dimensions. A reasonable vector dimension has a probability greater than 95% of occurrence, otherwise it is probable. If no Super Glyph has a probability greater than 95%, then the top one is considered reasonable. Cholti valorizes with a grain of salt knowing the garbage in garbage out paradigm.

H) If multiple significant difference instances are detected during a session, then for each group a resultant Superset(i), Set(i, j) and Subset(i, j, k) is generated with the appropriate prorated Hot & Cold Algorithm parameters. Finally, the plurality of resultant Superset (i), Set (i, j) and Subset (i, j, k) are correlated to create a final hierarchical set. The results that are greater than a predefined threshold are measured otherwise they are excluded as being confounded. The final hierarchical set yields the top n optimal results. A Super Glyph can have values for a plurality of significant difference requests.

Example: Super Site XYZ has a value of 8 in the first request, 7 in the second request and 10 in the final request. It is determined for the final request three pages are an exact match and two other pages are valid after inserting the missing gaps of information. Thus Super Site XYZ has a W_Rank value of 50 for the final request.

10): Super Glyph mathematical equations: Using the Mayan lingua franca Cholti guidelines the system attempts to use grammar/language with geospatial components to describe an idea that is used to elucidate the final destination by doing the following:

A) Each end user begins interactively the process by typing requests using keywords and Cholti identifies, validates and verifies each keyword. Based on the typed end user's keyword combination Cholti creates both Basic and Advanced Glyphs and determines if a valid Geodata (w, x, y, z) exists.

B) XCommerce upon receiving a request from Cholti compares it against the 'CORE List' to determine if an exact match exists and responds with the optimal static Z_Price Bitmaps. Cholti mulligan unrelated keyword to the last request. XCommerce creates an 'Improved' hierarchical set derived from Z_Price Bitmaps for each significant request. Super Sites are assigned a probability and weight for each related group of requests or for a plurality of significant difference related group of requests. Direct relationship are extended from one request to another in a transitive manner, whereas unrelated request are skipped via the mulligan process that disregards confounded keywords, since they are converted into (yellow) unused Super Glyphs. Mulligan (yellow) unused Super Glyphs are used to weight pages and sites during the filtering process, and are very helpful during the process of 'Deductive Reasoning'.

C) Cholti may interactively ask the end user to clarify their intentions, since confounding Geodata or keyword combinations exists. The system based on the new input from the end user is able to fine tune the value of existing Super Glyphs. The software query optimizer only makes Super Glyphs based on valid request.

These are new enhancements made to XCommerce Supercomputer that continuously gathers, distills, analyzes, primes and integrates in real time organizational data so that responses are synchronized with up to date information as follows:

1) Load Balancing Request: based on the quantity and quality of the informational entropy the system must identify, validate and verify the top responses associated to an end user's request. XCommerce has evenly distributed its node configuration in four equal parts. Each part comprises of a minimum of 64 HQ0 nodes for a minimal total of 256 HQ0 nodes. The production Supercomputer configuration has eight times more HQ0 nodes for a grand total of 2048 HQ0 nodes, while the superior tiers or HQ6 to HQ1 remain unchanged. The four parts of the system are identified as Ax, Bx, Cx, and Dx that are responsible for searching and responding optimal page results based on vector parameters. Mimicking the human brain each request is broken into keywords that associated to belong to either to the [L] left or [R] right side group. When the [L] left side group keywords consisting of at least one independent variable will always have an Anchor made up of a keyword or cluster. The ability to identify keyword or cluster anchors in a hierarchical manner is paramount in creating valuable common denominator environments that are used as valid point of reference when performing comparative analysis of a plurality of requests.

Example: The English language environment begins with an estimated size of 30 billion unique page ranks and then the system determines for a request that "American Civil War" is the primary anchor and filter. From the three words associated with "American Civil War" the most common or the keyword with the lowest magnitude is assigned as the Anchor. In this case "American Civil War" American is the most common keyword and therefore is the Anchor. The anchor "American" shrinks the environment below upper limit of tolerance of 1,073,741,824 net result pages or W_Rank Basis. The environment is further reduced when applying the cluster "American Civil War" when determining the valid Superset (i). In this case "American Civil War" cluster is able to further shrink the size of the environment to approximately 80,000,000 W_Rank Basis. The Superset (i) is divided into an organizational manner with smaller sized Set (i, j) that may contain a plurality of valid associated keywords and clusters (I, $A) (I,$B), and the organization distribution is further propagated if necessary into smaller sized Subset (i, j, k) that may contain additional associated keywords or clusters (I, $A, $X), (I, $A, $Y), (I, $B, $X) and (I, $B, $Y). $A, $B, $X or $Y consists of associated keywords or clusters. When a variable is null it has a probability of 0 or 0.00%. XCommerce always works with balanced hierarchical sets. The hierarchical set when creating Set (i, j) and Subset (i, j, k) subordinates takes into account known preprocessed Advanced Glyphs hierarchical sets.

XCommerce as all calculations are made it cleans, organizes, standardizes and mirror image of the existing Internet environment. When performing said task the system correlates the content of each paragraph, and page belonging to the same Site. The system primes each paragraph, and this is when confounding data is eliminated by supplying the missing gaps of information.

A) (Ax or 'Before' analysis): Ax represents traditional 'Boolean Algebra' or prior art means that are translated into Basic Glyphs. The requests are searched 'AS IS' using existing eigenvector methods for valorization means and the Ax response is used as the point of reference for further optimizations made by Bx, Cx, and Dx.

B) (Bx 'After' analysis): Bx represents the ability to reorganize requests and identify missing gaps of information that are converted and translated into Advanced Glyphs. Cholti identifies, validates and verifies the 'AS IS' query and rearranges each request. This method is the first step that filters and weights requests dynamically and identifies, quantifies and qualifies confounded 'Boolean Algebra' over simplifications.

C) (Cx 'Improved' analysis): Cx represents the process of comparing, mapping, plotting and merging both Ax and Bx to a resultant probabilistic hierarchical set. Then Cholti gathers, distills and analyzes Cx hierarchical set. During this process the best results of each given set of elements are measured using the Hot & Cold Algorithm parameters to update the Super Site and Super Site objects and create a probabilistic distribution to yield the optimal result. Cholti identifies, validates and verifies the 'AS IS' query and reorganizes and prioritizes Keyword. Cx mission is to reduce the size of the environment between 1,024 and 10,000 result page W_Rank Basis.

D) (Dx 'Optimal' analysis): Dx or Z_Price Bitmaps represents the final process of deciphering the optimal result that where derived from Cx hierarchical sets by weighting and valorize each page against Super Glyphs filters that take into account Page Rank, Media Value, and transparency and/or content privacy. Dx mission is to reduce the size of the environment to 1024 result page W_Rank Basis.

Cholti 'Cherry picks' the best results as information certitude improves proportionally as the size of the environment is reduced. Thus when information certitude is reached, the size of the environment equals the end user select page response sample. By default browser engine response sample is set to 10 and thus when information certitude is achieved the environment size is exactly 10 page results. Alternatively, TOP result pages 1,000 W_Rank may have a minimum of 512 pages.

2) Organizing the Spaghetti

A) For each cluster, associate clusters and Glyphs the system assigns an HQ1-HQ5 owner that controls the parallel running Internet environment. Each HQ0 is assigned a plurality of keywords. Each HQ1 is assigned all the single tiered clusters of its subordinates. Each HQ2 is assigned all the dual tier clusters of its subordinates. Each HQ3 is assigned half of triple tiered clusters or Basic Glyphs of its subordinates. Each HQ4 is assigned all the Advanced Glyphs of its subordinates. Each HQ5 is assigned all the Geodata of the environment.

B) A Site based on a given extension such as ".com" is assigned to exactly one of the parallel running planes. All the pages of a Site are matched/merged with separations. Each site is read for clusters and 'Zero Clusters'. Each site has a quality value or Q(x) that ranges from 0 to 10. Complex multinational corporate organizational hierarchies consist of a plurality of Super Sites that are linked together. Consequently, a Site is assigned a Corporate ID that contains all the valid ANI, address information, and organizational information.

C) A Site rank value is equal to the sum of its Top n W_Rank subordinates. Each Site is assumed to have Top 32 pages, even if most are null. The basis of each Site is equal Top 32 valid pages in its hierarchy from the perspective of a partial environment. The W_Rank Basis of each Page is equal to the Q(x) value.

D) Sites with Q(x)>1 and valid Corporate ID are considered a Super Sites. Pages with Q(x)>1 and valid Corporate ID are considered a Super Pages. Each keyword, cluster, dual tiered cluster and Advanced Glyphs has a Q(x) value>1.

3) Glyphs based Search

A) Each Site has a fingerprint or is associated to clusters, dual tiered clusters and Advanced Glyphs. SIS™ HQ nodes are assigned for Superset (i) searches, TWS™ HQ nodes are assigned for Set (i, j) and squad leader HQ0 are assigned to Subset (i, j, k). The HQ owner of the search uses the Ax 'Boolean Algebra' Search statistics to know the raw number of hits, top pages and sites that match the end user's criteria. The HQ owner forward chains the request to all pertinent nodes. Alternatively (faster!) the 'Boolean Algebra' results are kept in memory and the entire Ax 'Boolean Algebra' step is skipped unless a given combination does not exist in memory.

B) The owner of each keyword, cluster, dual tiered cluster and Advanced Glyph keep tracts in memory the TOP n value based on the Q(x) value that is used as a filter. Then they forward chain the Q(x) value to the HQx owner of a request. Reasonable results are kept in memory and probable in memory. Alternatively (faster!) the 'Reorganized' results are kept in memory and the entire Bx 'After' step is skipped unless a given combination does not exist in memory or in a file.

C) Each Super Site and Super Page are assigned to a keyword, 'Zero Clusters', cluster, dual tiered clusters and Advanced Glyph when they belong to the estimated TOP 1,000,000 W_Rank Basis of a given 'Z_Price Bitmap'. This additional dimension or W is an extension to the Q(x, y, z) that can be used to further expedite searches. To those in the field the additional dimension W describes matching a 1,000,000 W_Rank of a given REGEX.

D) Superset (i) search limits range from 16,384 to 131,072, Set (i, j) search limits range from 8,192 to 65536, and Subset (i, j, k) search limits range from 4,096 to 32,768 net result pages or W_Rank Basis.

E) Based on the quality of the Geodata Cholti assigns filtering values as follows: 1) Geodata (n, 0, 0, 0), multiplier=0.7, 2) Geodata (n, n, 0, 0) multiplier=0.5, 3) (Geodata (n, n, n, 0) or Geodata (n, n, 0, n)) multiplier=0.35 and 4) Geodata (n, n, n, n) multiplier=0.25. The Geodata value helps to weight each page and derive the optimal size environment.

F) When the Corporate ID is valid then multiplier=0.25. The Q(x, y) is used to prorate. Each Page also has a sub partition or Q(x, y). (clarification)

G) The request HQ owner must determine the search parameter when filtering. The upper limit is always set to equal the highest Q(x) value. The lowest limit is calculated by estimating the size of the environment compared to the filter value multiplier. Q(x) total equals the summation of Q(x) from 10 to 2. Should Q(x) total value be less than the lower limit then Q(x) Total=lower limit.

Example: The system determines via the Ax Before calculation that "American Civil War" has approximately 80,000,000 page results. In this case only a Superset (i) exists. The system is interested in restricting the search that is within the request limit. The valid limits are from 16,384 to 131,072 W_Rank Basis, since no Corporate ID is known or Geodata is available. To shrink the environment Q (x, y, z) is used.

The system identifies the number of valid results based on the Q(x) values starting from 10 to 2. Initializing the Q(x) valid counter to zero, it begins to add Q(x) until the valid counter is greater than the upper limit and does not exceed it lower limit. Should it exceed the limit it must prorate using Q(x, y) values.

Example: the lower limit=1200, and upper limit=1900. Each Q(x) has 1000 items, and each sub partition has 10 items. The system initializes the valid counter and then adds 1000 items from Q (10), since the value does not exceed any of the search limits. Then Cholti analyzes and determines what to do with Q (9) data, since the extra 1000 items would exceed both limits. In this case, the system prorates the counter by filtering 80% of Q (9) and accomplish said task with Q (9, 20). The 20 is obtained from 100-80.

4) Hot Algorithm or Cx Optimizations: 'Boolean Algebra' assigns for each session the same value or 1 to each keyword. Cholti groups related requests, and thus continuously must dynamically measure each keyword based on the end user's usage and frequency patterns with a Hot Algorithm value. This value is obtained after correlating Ax 'Before' and Bx 'After' requests to yield the resultant Cx set hierarchy. These dynamic values are an enhancement to the generalization philosophy of the 'Boolean Algebra', since by taking trending into account, keywords and cluster priorities may elucidate what is hot. Once Cholti knows what is hot it can be measure the weight of Super Pages and Super Sites. The notion of static values for combinations of keyword is relegated to the process of shrinking the size of the environment, and dynamic values to the deciphering process of selecting the best solution. Hot Algorithm values do not affect 'Zero Clusters' for that the system uses Cold Algorithm values.

Example: As explained before the "American Civil War" cluster reduces the Ax environment size to 80,000,000 results. This 'Boolean Algebra' response represents the one to one relationship on how eigenvectors filter and valorize the environment. As a starting point it is good and for this reason Cholti uses this preprocessed type of information as the 'Before' or Ax and reorganizes for the 'After' or Bx. XCommerce 'CORE List' stores a plurality of commonly used request to avoid taxing unnecessarily the system throughput with redundant inquiries since Q (x, y, z) values are known.

The Hot Algorithm assigns to each keyword three components (x, y, z). x measures the trending multiplier based on the end user's pattern with regards using a keyword. y represents the relative strength of a keyword in belonging to the Advanced Glyph domain hierarchy such as Superset (i), Set (i, j) and Subset (i, j, k). z determines the probability the Keyword is necessary to reach the optimal W_RANK.

5) Cold Algorithm or Dx Optimizations: Once the Hot Algorithm has successfully helped value each site and page during the 'Improved' or Cx sample, by measuring patterns of behaviors of the end user's requests within a session. The Cold Algorithm assigns to each keyword four components (w, x, y, z) values. w measures the probability the word is required for the search. x measures the likelihood the keyword or a 'Zero Cluster' validates a W_Rank. y quantifies geospatial dimensions based on Geodata (w, x, y, z). z modifies Super Glyphs based on how Cholti measures the corporate dimensions of a request. y and z serves as a geospatial and corporate information filters to further reduce the size of the environment by assigning filter value from 0.01 to 1.00. Cholti never assigns a value of 0 since results are weighted down but never eliminated.

Example: Once the size of the environment for "American Civil War" is measured at 80,000,000 result pages as Ax or 'Before', and then reorganized and further filtered by Cholti to shrink the size of the environment to approximately 4 million result pages as Bx or 'After'. Then the Hot Algorithm analyzes the valid Superset (i), Set (i, j) and Subset (i, j, k) by request and session to further reduce the size of the environment to approximately 100,000 result pages. Then the Cold Algorithm uses 'Deductive Reasoning' to decipherer logically the essence of the matter. Extracting the essence is done to the entire hierarchical set by request and session to further reduce the size of the environment to approximately 1000 result pages. At which point the system gathers the TOP 100 page as they compare against the Super Glyph to determine the optimal result page. Super Glyphs are mathematical filters that helps 'cherry pick' the best W_Rank.

6) Cholti language Super Glyphs: each request may have one or more components 1) Superset (i), 2) Set (i, j), 3) Subset (i, j, k) and 4) Geodata (w, x, y, z). Super Glyphs are colored coded. Blue belongs to English language Cluster, Purple is a 'Zero Cluster', Yellow are unused keywords in building an Advanced Glyph, Green is a geospatial, Orange is Corporate, Black is advertisement value, and White is end user supply side commercial value. Super Glyphs that becomes reasonable to the point of certitude become Red regardless of type.

A) Super Glyph can be unloaded or loaded. A Super Glyph is loaded when the information is certain or greater or equal than 0.95, else it is unloaded. Each Superset (i) measures the quality and probability that a request is within this partial concurrent analyzing environment. Each valid Superset (i) is represented by a blue colored loaded Super Glyph. Each Geodata (x, w, y, z) Super Glyph measures the quality and probability that the request is within this partial concurrent analyzing environment. Geodata (w, x, y, z) value for a request or session may be null. For each partial environment the system assigns a geospatial green colored unloaded or loaded Super Glyph depending on all probability of certainty of a request.

B) Each Set (i, j) and Subset (i, j, k) that is a common denominator to each request in the partial environment is certain and is represent by a blue colored Super Glyph. Non significant Set (i, j) and Subset (i, j, k) are represented by a yellow colored unloaded Super Glyph.

C) Corporate geospatial data derived from a request that is represented by an orange Super Glyph. When the Corporate geospatial data is almost certain it is loaded otherwise it has a p(x)<95% (or <0.95) and is unloaded.

D) If a partial environment does not possess a common denominator loaded Super Glyph with another partial environment, the system may omit them or do a mulligan from the point of view of the last request. When a mulligan occurs from the point of view of the last request, the information that is disassociated is treated as 'Zero Clusters'.

E) 'Zero Clusters' are always loaded. 'Zero Clusters' have 0% or 0.00 'Boolean Algebra' value, but are paramount for the process of using 'Deductive Reasoning' when deciphering what is the optimal solution. Unused keywords also have 0% or 0.00 'Boolean Algebra' value, but are paramount for the process of using 'Deductive Reasoning' when deciphering what is the optimal solution. 'Zero Clusters' and unused keywords help eliminate confounding results.

F) Advanced Glyphs have 100% or 1.0 'Boolean Algebra' value, but have no value or significance in the process of using 'Deductive Reasoning'. Advanced Glyphs are a mathematical equation that shrinks the size of the environment. Once the optimal environment is derived these keywords that make part of the Advanced Glyphs are implied and logically removed from the deductive reasoning process. The number unmanaged independent variables in a search increase exponentially the complexity of solving the optimal solution.

7) Deductive Reasoning Triangulation

A) Significant Difference is an event of quantitative and qualitative importance. A significant difference occurs when an Advanced Glyphs consisting of a plurality of Super Glyph affects the size of the environment and elucidates reasonable paths to reach the final destination substantially. Thus a significant event occurs when two consecutive requests with a common denominator have a significant filtering disparity of the environment size. When two consecutive requests have the same Superset (i) and after measuring both instances the difference between them is greater than a factor of times eight a significant event is detected. A significant filtering of the environment occurs, when the environment shrinks by a factor of four or more and the Superset (i) and Set (i, j) are the same.

B) If the Geodata (w, x, y, z) is not null and is the same between two consecutive requests then raw factor is multiplied by two, making it easier to have a significant difference event. In addition if the Corporate ID is the same for two consecutive requests and is not null then the raw factor is further multiplied by two.

Example: the end user makes two related requests. First request is "American Civil War" with Ax (1) of 80,000,000 page results. Second request is "American Civil War Battlefield" with Ax (2) of 5,000,000 page results. Since, the environment shrinks by a factor of 16 or (80 M/5 M) and "American Civil War" is the common denominator Superset (i), hence Ax (2) is considered of significant difference.

C) Super Glyphs: is the process of converting English language words into mathematical equations that help yield optimal environment. Super Glyphs that are used by the Advanced Glyphs accomplish the task of creating a substantial small environment that has a plurality of common denominator elements such as Superset(i), Set(i, j), Subset(i, j, k) and Geodata(w, x, y, z). Then the remaining Super Glyphs are used in the process of 'Deductive Reasoning' to determine the weight of each site and page in a set hierarchy.

Once the weight of a site and page are known this information may help in determining from the last request point of view what is confounded. Environment size, usage patterns of behavior and total amount of valid requests affects the preprocessed Cold Algorithm threshold used by the software. 'Deductive Reasoning' analysis of the environment is done in a predefined manner. First, the preprocessed Cold Algorithm threshold is a value that measures the significant weight for each valid page. The threshold is set to a value that will distill at least 90% or 0.90. Second, the remaining 10% or 0.10 of the partial environment is further distilled another 90% or 0.90 using preprocessed Hot Algorithm threshold. Third, the system uses identified 'Zero Clusters' and Super Sites weighted values to further reduce the size of the environment another 90% or 0.90. These validations are performed as long as the size of the environment is greater than 1,024 W_Rank Basis limit.

Example: The partial environment size for "American Civil War Battlefield" is 5,000,000 page results W_Rank Basis. After the Hot Algorithm filtering the size of the environment is lowered to 500,000 page results W_Rank Basis, and then further reduced via the Cold Algorithm filtering the environment to 50,000 page results W_Rank Basis. Then Cholti dilutes the remaining environment based on the quality of the Super Sites to yield a valid environment size of 5,000 page results W_Rank Basis. As stated before Hot & Cold Algorithm parameters and 'Zero Cluster' filter may not reduce the size of the environment below 1024 weighted page results.

D) Decipherer: Once the size of the environment has reached optimal environment weighted size the system is able to decipher the plurality of significant different requests that best represents the end user's intention as follows:

Direct Surfing: Cholti is able to identify an exact keyword, cluster or dual tiered cluster or Advanced Glyph that has a Z_Price Bitmap with the latest responses, which is able to bypass the 'Boolean Algebra' search, since the information is certain readily available and environmentally and organizationally up to date.

Single Request Session: Cholti is able to group the keywords entered by the end user and organize them in Cholti language style Glyphs. The Ax and Bx are performed at the same time, and serve to calibrate, qualify and quantify responses. Cholti may estimate the results of Ax and Bx to avoid perform this resource intensive task provided the assumption is deemed to be reasonable or certain. As a final step the system correlates Ax and Bx information into a single version of the truth Cx hierarchical set. Presently, prior art or 'Boolean Algebra' search engine assign each page with a default weight of 1. In the case of Cholti each Super Page can have a value of 0.001 to 10 based on the quality of the Super Site and its associate Corporate Information.

Plurality of Related Request Sessions: The first two deciphering means reflect how present state of the art browser engine Supercomputers work. Unfortunately, most sessions can not be described as satisfying to the end user intentions in reaching the final destination in the first attempt. When the end user is dissatisfied a session will consists of a plurality of requests. Cholti will be able to tag and associate a plurality of requests. The system will be able to match/merge request that are not significant and are related. The software is able to create a single final resultant Cx after correlating a plurality of Ax and Bx of hierarchical sets. The Hot & Cold Algorithms parameters dynamically create an optimal size environment that valorizes the vector components of each valid element of the Cx hierarchical set and assigns up to date characteristics such as active, visible, reasonable probability and exact match weight. See Example #5 Related Requests.

Plurality of Unrelated Request Sessions: When Cholti determines a session possesses a plurality of consecutive unrelated requests, it must convert the unrelated keyword and clusters into (yellow) Super Glyphs. Cholti uses final resultant (yellow) Super Glyphs in the process of deciphering with 'Deductive Reasoning' the probabilistic values of each element. When Cholti creates the (yellow) Super Glyphs the associated vector components parameters describe statistically the plurality of unrelated requests or Mulligan requests. See Example #6 Mulligan Requests. Keywords that are removed via mulligan reduce the quantity of independent variables required to solve for the optimal solution.

Plurality Interrelated Request: When the system identifies a plurality of significant difference requests, Cholti is able to tag and associate these distinct hierarchical sets. The software is able to create a single final resultant Cx after correlating a plurality of Ax and Bx of hierarchical sets. When the correlation for a plurality of Ax and Bx requests is performed the result is a plurality of partial Cx. Then Cholti deciphers the different partial Cx and uses 'Deductive Reasoning' to determine the optimal Dx hierarchical set. Every time the end user clicks the 'OPTIMAL button' while using Cholti Software it is assumed the end user wants a final destination and the system can associate up to 20 consecutive and valid partial environments to derive an optimal satisfying Dx sample. Alternatively, the end user may have a 'NEW button' to initialize a session.

10) Cholti (AI) Artificial Intelligence Spiders: consists of automated programs that are designed to continuously gather, distill and analyze the environment in real time. The program after gathering information identifies new content to the known environment. For each page the program determines if the file has been deleted, moved, updated or is new. AI Spider capacities can be described as follows:

Delete Data: W_Rank is set to zero. Based on the previous W_Rank the system determines active keywords, 'Zero Clusters', clusters, dual clusters, and Z_Price Bitmaps if the removal of the W_Rank is of significant difference or sufficiently to affect a 'CORE List' inventory. Each Z_Price Bitmaps has a minimal W_Rank. If the deleted W_Rank is greater than the TOP 1000, the Index value where the existing W_Rank is set to zero, all the W_Rank below it are improved by one, and the TOP 1000 is adjusted. To avoid unnecessary resources intensive synchronizing of the inventory, Z_Price Bitmaps data structure stores TOP 1024 elements to avoid searching and recalculating replacement elements. Alternatively, once a page belongs to Z_Price Bitmap it is never eliminated it just has a lower value that the valid threshold of the top 1000 to solve for the optimal solution.

Move Data: W_Rank remain the same, and the IP Address is updated for future reference. Example: www.ibstek.com/main/technology.htm is changed to www.ibstek.com/home/technology.htm. File size, content and W_Rank are identical.

Update Data: The content of a page has changed. Four buckets are created: a) deleted, b) new, c) net deleted and d) net new. The software analyzes the net deleted bucket and determines active keywords, 'Zero Clusters', clusters, dual clusters, and Z_Price Bitmaps for removal of data. The software analyzes the net new bucket or file and determines active keywords, clusters, dual clusters, and Z_Price Bitmaps for insertion of data.

New Data: based on the site and associated links an approximate value W_RANK is created. Based on the approximate W_Rank the system determines active keywords, 'Zero Clusters', clusters, dual clusters, and Z_Price Bitmaps. Each Z_Price Bitmaps has a minimal W_Rank. If the W_Rank is greater than the TOP 1000 inventory, the programs checks up to 1000 element beginning with the first or top element and finds the first event W_Rank is greater and the new information is inserted in the given index then all the W_Rank below it are demoted by one, and the TOP 1000 is adjusted. Elements that are above the TOP 1024 may be discarded.

Significant Difference Data: Upon identifying significant changes to Z_Price Bitmap information belonging to a site hierarchy, the summary content of a Super Site and Super Page are updated.

11) Updating Page Ranks via Z_Price Bitmaps method: this process is an improvement to the XCommerce real time data model as follows:

A) Cholti Artificial Intelligence Spiders: these AI Spiders perform their standard searches for new information in the Internet. The Spider first determines the Quality Q (x) and the appropriate sub partitions Q (x, y, z) values. Then Cholti compares against the top responses derived from any known Z_Price Bitmaps and filters based on minimal valid page value parameter required to instantiate an event of significant difference in the environment. XCommerce stores all of the valid keyword, 'Zero Clusters', cluster, dual tier clusters and Advanced Glyphs in its 'CORE' List. Request HQ owners store in memory or archive in files reasonable balanced hierarchical sets once they are identified.

B) Cholti places to each page its existing page rank. In the event the page rank is unknown the system based on the quality of the parent site, page sibling and quality of 'Zero Clusters', reasonable hierarchical sets and Z_Price Bitmaps triangulates and temporarily estimates the page rank.

C) Plurality of New events: for each detected existing Advanced Glyph will attempt to update if the information is within the TOP 10,240 page result W_Rank basis. When Cholti determines the value exceeds the limit, the system immediately validates the event as having significant difference.

D) XCommerce updates the Z_Price Bitmap containing the list of 1,024 Top weighted pages, and 10,240 Top weight sites. Weight is used since, a page or site can have a weight greater than one. XCommerce updates the new limits for the Z_Price including the 'Boolean Algebra' counters for aggregate weight and frequency.

12) Cholti uses Super Glyphs to find the optimal responses. The end user begins a session consisting of consecutive requests from the end user to reach a plurality of optimal and valid final destinations. Request #1: "Sheraton Hotel Aventura" may be the exact response for a given search. Request #2: Then the end user gets the ANI (305) "###, ####" to make a reservation and finds out that the place is booked or it is too expensive so the search goes on . . . . The end user decides to find a Realtor that may assist him in finding a seasonal rental or a sweat condo buy, and using the city of Aventura in Miami-Dade County, Fla. as the center of its circle of search consisting of examples Requests #3-4. These two searches find a realtor that tells him about a great seasonal rental a boater's paradise with excellent marina view. Request #5: Then the end user is still not satisfied and continues its search to find travel arrangements and a car rental. Requests #6-10: the end user in order to make the vacation a success decides to find places of interest of where to stay. Request #1 is valid then via request #2 is determined to be invalid. Request #3 is not valid whereas #4 is optimal. Request #5 is optimal since site offer a package deal from travel and auto. Requests #6 to #10 may be optimal or not since the end user is undecided or just gathering information.

Once the Geodata (w, x, y, z) is derived to be the City of Aventura, Fla. USA, several Area Codes valid (orange) telecommunications Super Glyph (800), (888), (305), (786), (954) and (754) are assigned. The Super Glyph is red when end user interactively types significant difference valid ANI data. For each time that a Mulligan request is made the system creates a (yellow) Super Glyph for the Keyword, and by measuring via the Hot & Cold algorithms determines the patterns and frequency of usage for each keyword. Finally another algorithm measures using (black & white) advertisement Super Glyph that measure the end user's trend of using particular products and services, and the media value of the request. This is the so called z factor is the Q(x, y, z) while analyzing and solving for the optimal price. See Example #7 'Triangulation Deductive Reasoning' Optimal Requests.

A caution to the reader the word optimal is tricky. 1) Does it mean the top response from a 'Boolean Algebra' response? 2) Does it mean the triangulation 'Deductive Reasoning' solution to the end user? 3) Does it mean the best solution after taking into account media value and all the valid requests with a session? The later is the correct answer. Consequently (black & white) advertisement Super Glyph metrics are required to measure viability or profitability and not just maximizing 'Boolean Algebra' values, and this fact is the core reason why creating profitable search algorithms is so difficult.

13) Alternative Load Balancing Configuration (faster!): All the HQs participate in Ax, Bx, Cx, and Dx process. Where the assigned HQ owner estimates the Ax value and then forward chains a message with the hierarchical set parameters for Bx. Each HQ node rearward chains the Bx response with the top 10 page results or null. The HQ owner performs the Hot & Cold Algorithm to generate the Q(x, y, z) filter and forward chains the message to each HQ node that did not send a null response. Each HQ node rearward chains the Cx response with the top 10 page results or null. Now the HQ owner 'cherry picks' the optimal result.

BRIEF DESCRIPTION OF THE DRAWINGS

For the purpose of initially illustrating the invention, the specification presents drawings, flow diagrams, and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings:

The following

FIG. 16 is a diagram of the Information Pyramid Structure that interacts with the environment or Internet.

FIG. 17 is a diagram of 'the Hive' architecture of XCommerce.

FIG. 18 is a diagram of Informational Entropy.

FIG. 19 is a diagram of Deriving Information Certainty.

FIG. 20 is a schematic representation of an Interface to Browser overview using the XCommerce technology.

FIG. 21 is a schematic representation of W_RANK Updates.

FIG. 22 is a schematic representation of how the Browser Identifies the Highest Match.

FIG. 23 is a table of Sample DATA collections used by the XCommerce technology FIG. 24 is a schematic representation of Using Math to Balance an Object.

FIG. 25 is a schematic representation of Optimizing Keyword Quality

FIG. 26 is a schematic representation of a Simple Pyramid Structure

DETAILED DESCRIPTION OF THE PREFERRED EMBODIMENTS

Figure 1:
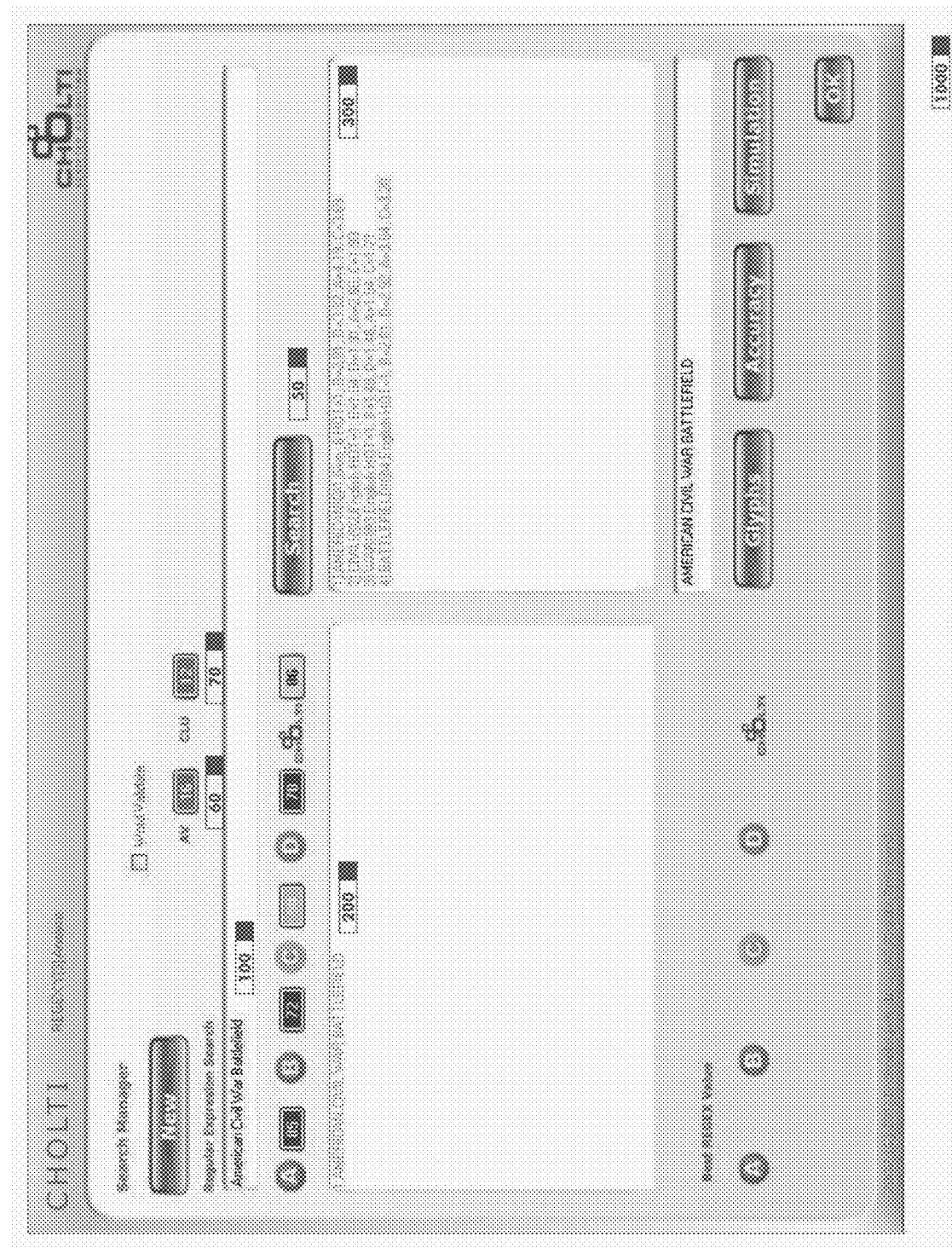
FIG. 1 presents a main page of the search engine optimizer.

These are the figures that describe Cholti:

FIG. 1: Cholti Search Engine Optimizer: (1000) Consists of the main page of the visual representation of the Cholti Scripted Algorithm. [A], [B], [C] and [D] represent leading 'Boolean Algebra' competitors, and [E] represents Cholti. Once the end user clicks (50) the Search button the system calculates 'Before' and 'After' (Ax & Bx) samples. This diagram shows the results for the Bx or 'After' request for "American Civil War Battlefield" the system has determined the accuracy for each Search engine as follows: [A]=85%, [B]=72%, [C]=58%, [D]=78% and [E]=86%.

(100) is the list of keywords typed by the end user, (200) consists the list of valid request that belong to a session, (300) represents Hot Algorithm vector component concerning each Keyword, (60) represent identified Auxiliary Variables, and (70) represent identified Clusters.

Figure 2:
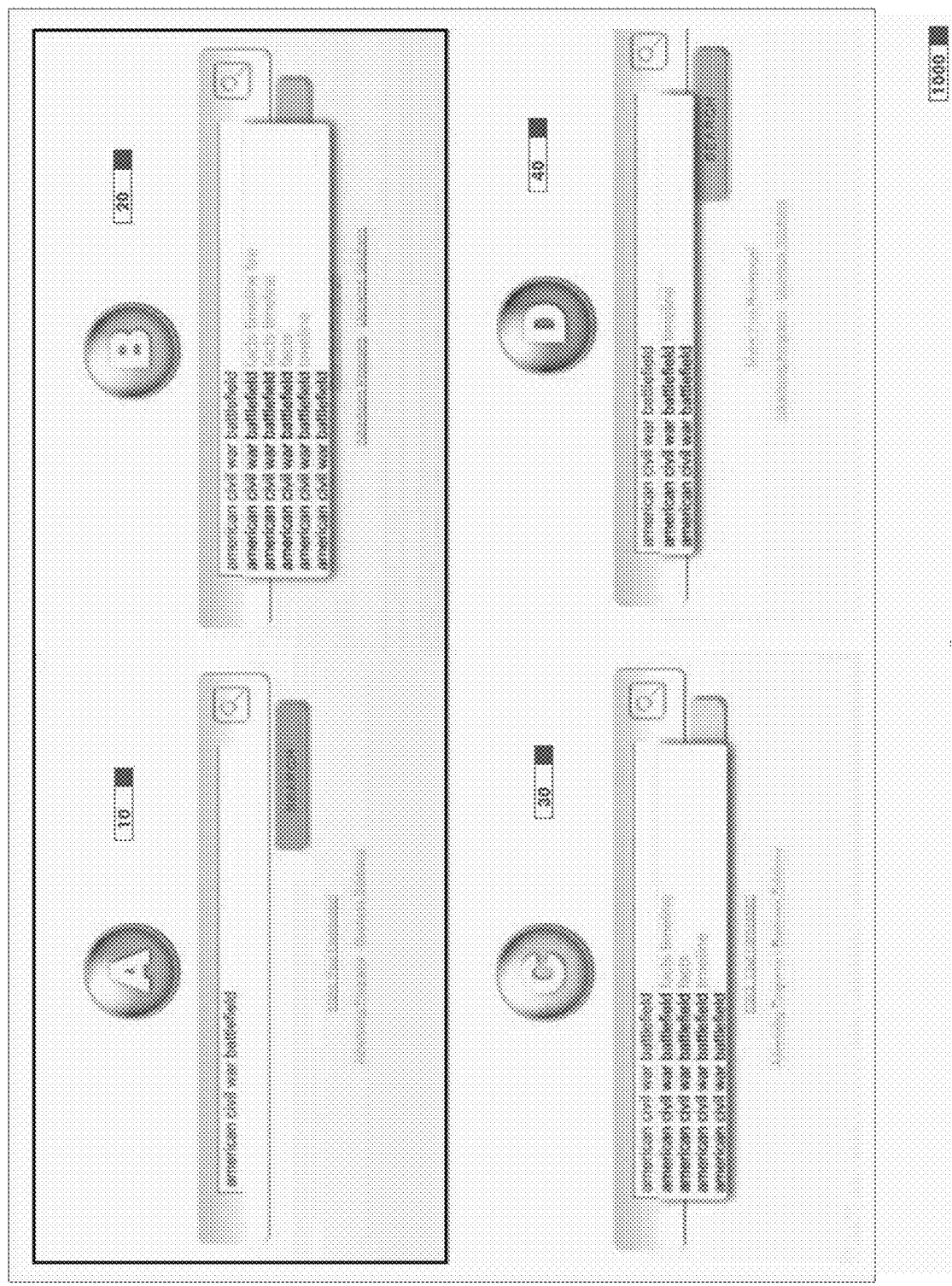
FIG. 2 presents an output of a search executed by a plurality of search engines.

FIG. 2: 'Boolean Algebra' Search Engines: [A] or (10), [B] or (20), [C] or (30) and [D] or (40) represent leading browser engines that perform their calculation using 'Boolean Logic' or 'Caesar's divide and conquer' method. In this case the end user request is "American Civil War Battlefield". Once the end user clicks on the corresponding 'Search button' or (50) the search begins. [B], [C] & [D] Search Engine have interactive cluster recognition that consists of a plurality of optimal valued preprocessed requests.

Figure 3:
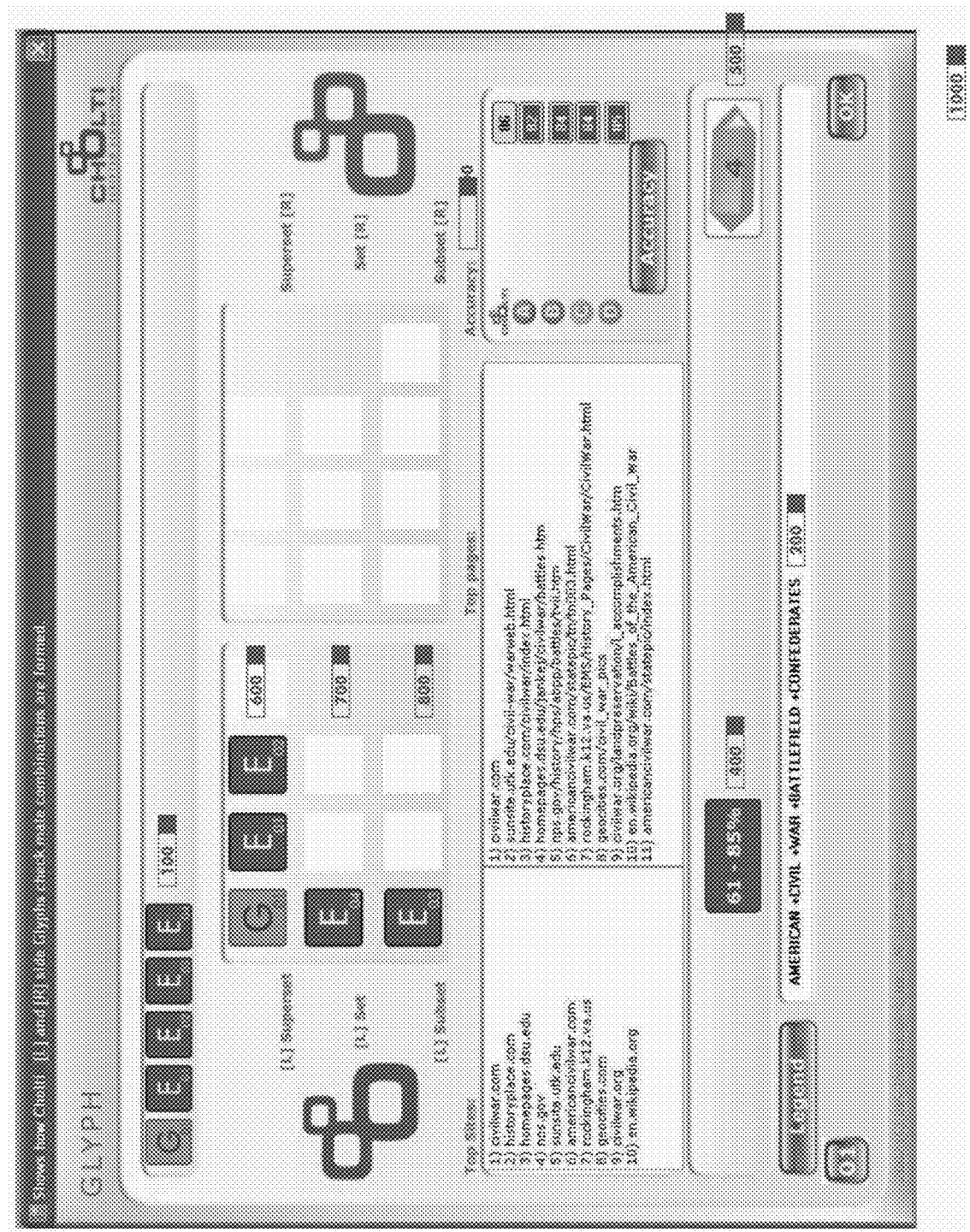
FIG. 3 presents a basic Glyphs left side.

FIG. 3: Basic Glyphs [L] Left Side: Using Cholti (1000) the end user types the following keywords (200) "American Civil War Confederates Battlefield". This request is measured to have (400) an overall accuracy of 61% to 85% and (500) quality level of 4. Respectively, (300) shows the relative accuracy of [A]=82%, [B]=84%, [C]=84%, [D]=85% the 'Boolean Search' Engines, and [E]=86% for Cholti or 'Deductive Reasoning Search' Engine. In this case the request is converted into (100) "American"=[G1], "Civil"=[E1], "War"=[E2], "Confederates"=[E3], and "Battlefield"=[E4]. The system selects (600) "American Civil War" or ([G1]+[E1]+[E2]) as the left side of the brain Superset (i). The system selects "Confederates" (700) or [E3] as the left side of the brain Set (i, j). The system selects "Battlefield" (800) or [E4] as the left side of the brain Subset (i, j, k).

Figure 4:
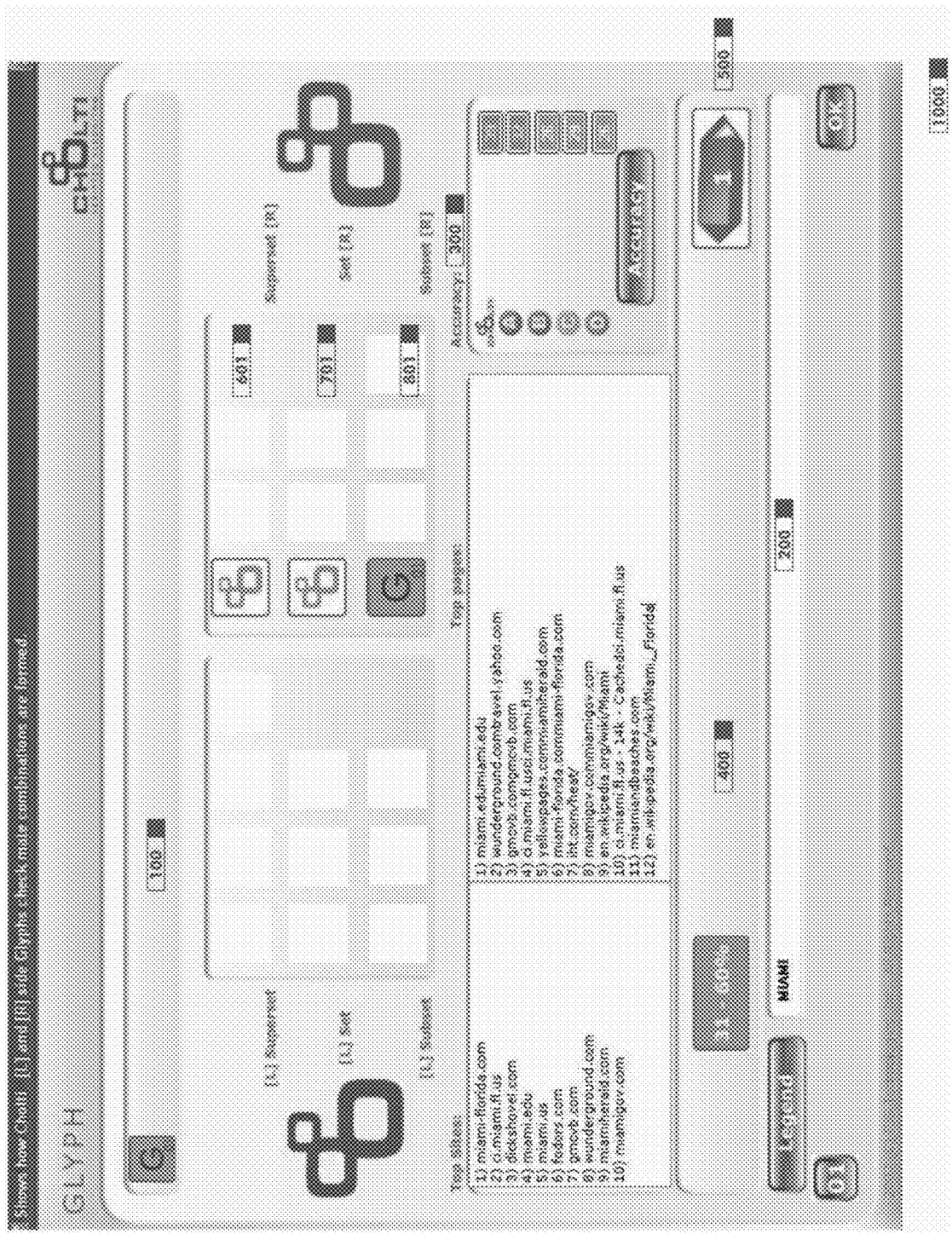
FIG. 4 presents a basic Glyphs right side.

FIG. 4: Basic Glyphs [R] Right Side: Using Cholti (1000) the end user types the following keyword (200) "Miami". This request is measured to have (400) an overall accuracy of 31% to 60% and (500) quality level of 1. Respectively, (300) shows the relative accuracy of [A]=39%, [B]=32%, [C]=29%, [D]=26% the 'Boolean Search' Engines, and [E]=39% for Cholti or 'Deductive Reasoning Search' Engine. In this case the request is converted into "Miami" (100) or [G1]. The program selects "USA" (601) and assigns an unloaded Cholti Glyph as the right side of the brain Superset (i). The system selects "Florida" (701) with an unloaded Cholti Glyph as the right side of the brain Set (i, j). The system selects "Miami" (801) or [G1] as the right side of the brain Subset (i, j, k). After having the relative Cholti accuracy level of each browser engine the overall accuracy upper limit is adjusted to 39%.

Figure 5:
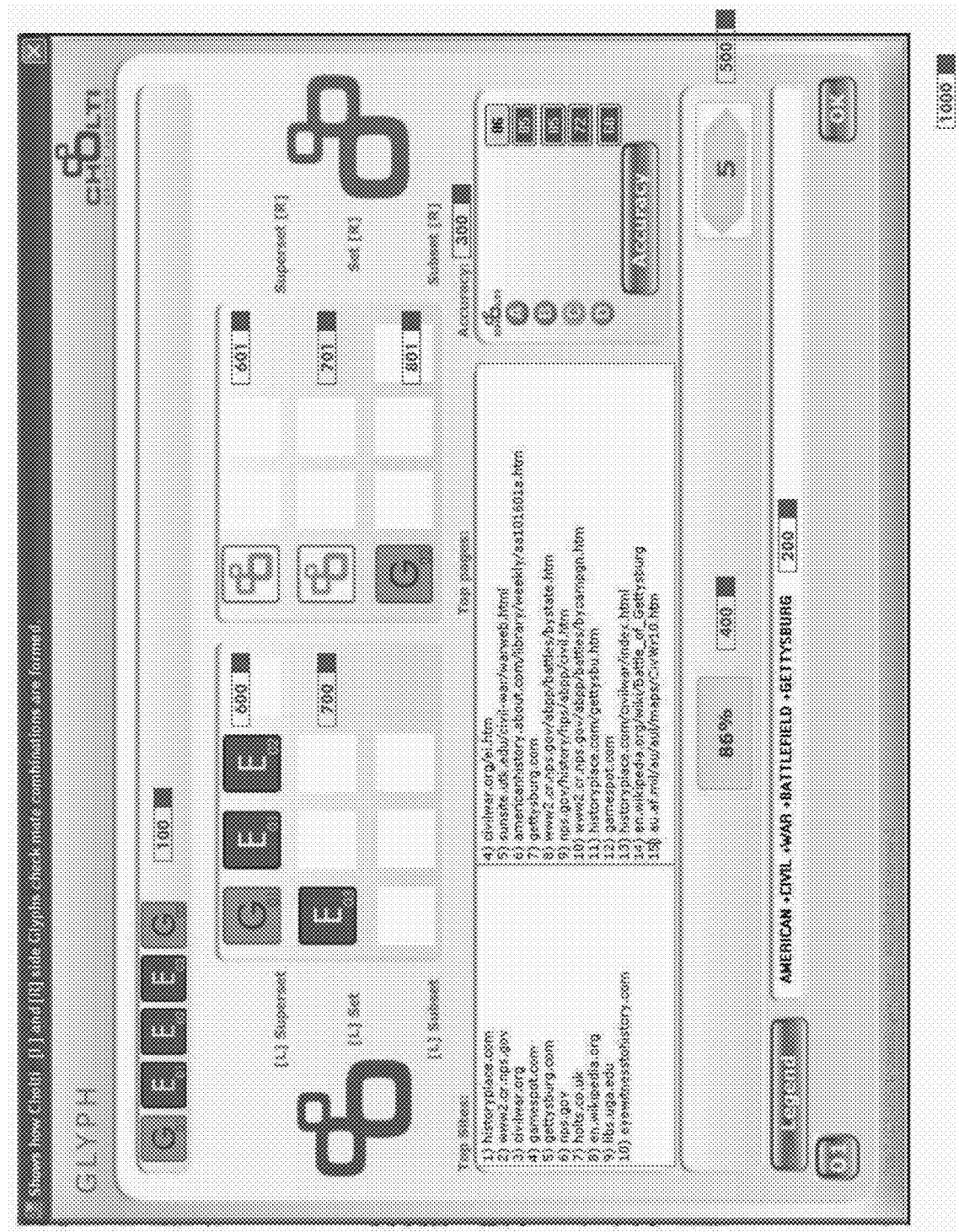
FIG. 5 presents a basic Glyphs overview.

FIG. 5: Basic Glyphs Overview: Using Cholti (1000) the end user types the following keywords (200) "American Civil War Battlefield Gettysburg". This request is measured to have (400) accuracy level of 86% and (500) quality level of 5. Respectively, (300) shows the relative accuracy of [A]=85%, [B]=85%, [C]=72%, [D]=68% the 'Boolean Search' Engines, and [E]=86% for Cholti or 'Deductive Reasoning' Search Engine. In this case the request is converted into (100) "American"=[G1], "Civil"=[E1], "War"=[E2], "Battlefield"=[E3], and "Gettysburg"=[G2]. The system selects "American Civil War" (600) or ([G1]+[E1]+[E2]) as the left side of the brain Superset (i). The system selects "USA" (601) and assigns an unloaded Cholti as the right side of the brain Superset. The system selects "Battlefield" (700) or [E3] as the left side of the brain Set (i, j). The system selects "Pennsylvania" (701) and assigns an unloaded Cholti Glyph as the right side of the brain Set (i, j). The system selects "Gettysburg" (801) or [G2] as the right side of the brain Subset (i, j, k).

Figure 6:
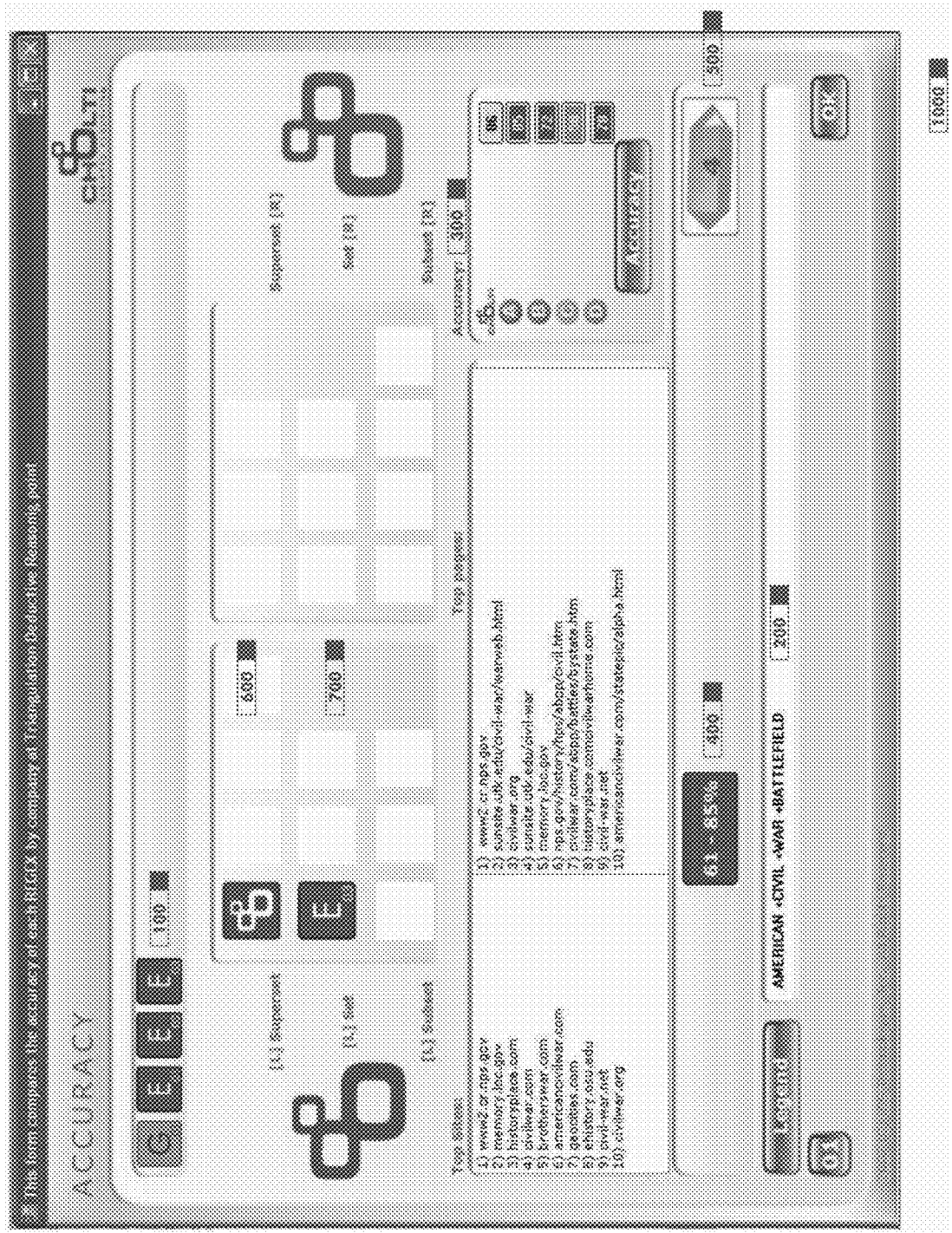
FIG. 6 presents an advanced Glyphs left side.

FIG. 6: Advanced Glyphs [L] Left Side: Using Cholti (1000) the end user types the following keywords (200) "American Civil War Battlefield". This request is measured to have (400) an overall accuracy of 86% and (500) quality level of 4. Respectively, (300) shows the relative accuracy of [A]=85%, [B]=72%, [C]=58%, [D]=78% the 'Boolean Algebra' Search Engines, and [E]=86% for Cholti or 'Deductive Reasoning' Search Engine. In this case the request is converted into (100) "American"=[G1], "Civil"=[E1], "War"=[E2], and "Battlefield"=[E3]. The system selects "American Civil War" (610) or ("[G1]+[E1]+[E2]") or C1 that is represented with a loaded Cholti as the left side of the brain Superset. The system selects "Battlefield" (710) or [E3] as the left side of the brain Superset.

Figure 7:
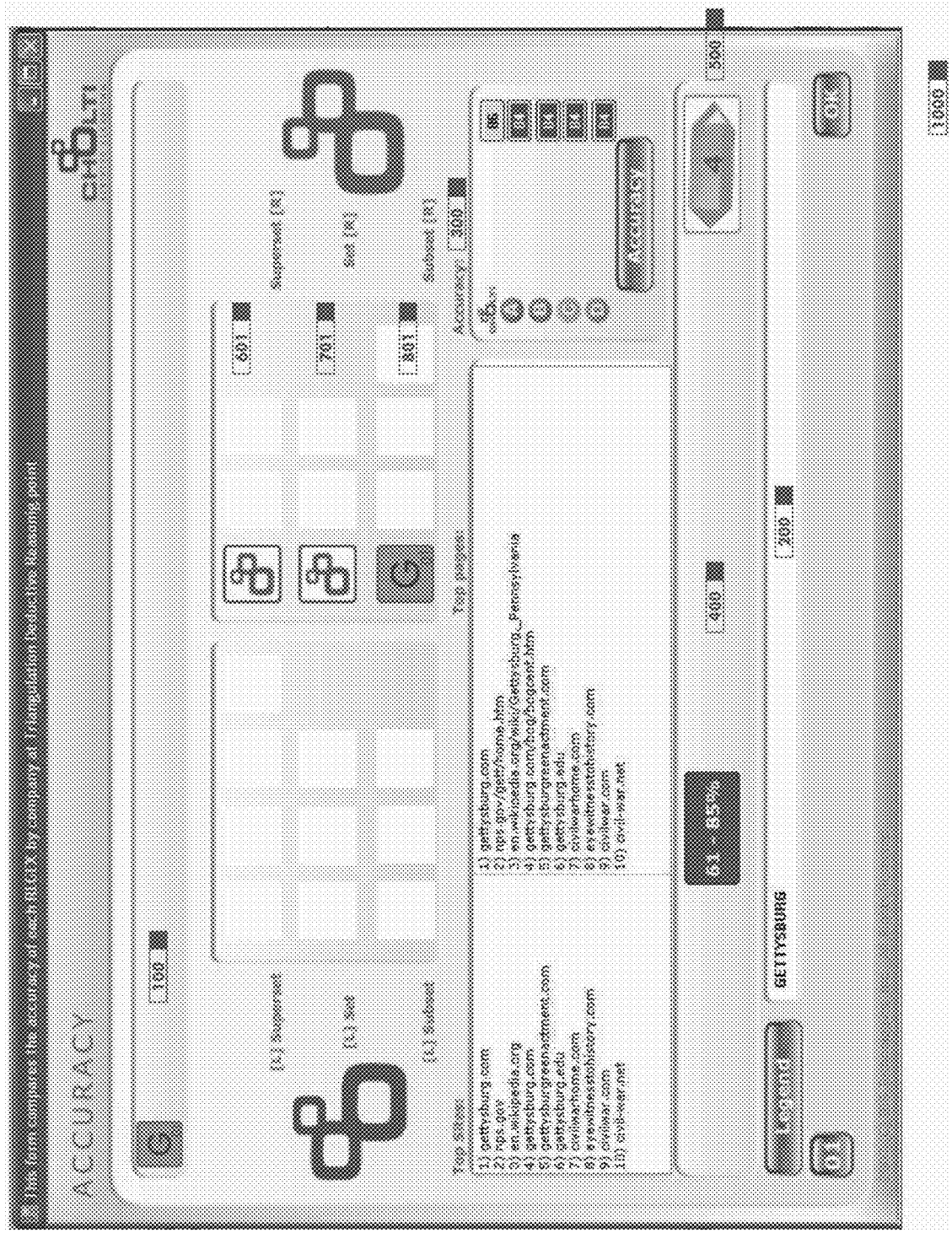
FIG. 7 presents an advanced Glyphs right side.

FIG. 7: Advanced Glyphs [R] Right Side: Using Cholti (1000) the end user types the following keyword (200) "Gettysburg". This request is measured to have (400) an overall accuracy of 86% and (500) quality level of 4. Respectively, (300) shows the relative accuracy of [A]=84%, [B]=84%, [C]=84%, [D]=84% the 'Boolean Algebra' Search Engines, and [E]=86% for Cholti or 'Deductive Reasoning' Search Engine. In this case the request is converted into (100) "Gettysburg"=[G1]. The system selects "USA" (601) and assigns a loaded Cholti Glyph as the right side of the brain Superset (i). The system selects "Pennsylvania" (701) or "PA" with a loaded Cholti Glyph as the right side of the brain Set (i, j). The system selects (801) "Gettysburg" or [G1] as the right side of the brain Subset (i, j, k).

Figure 8:
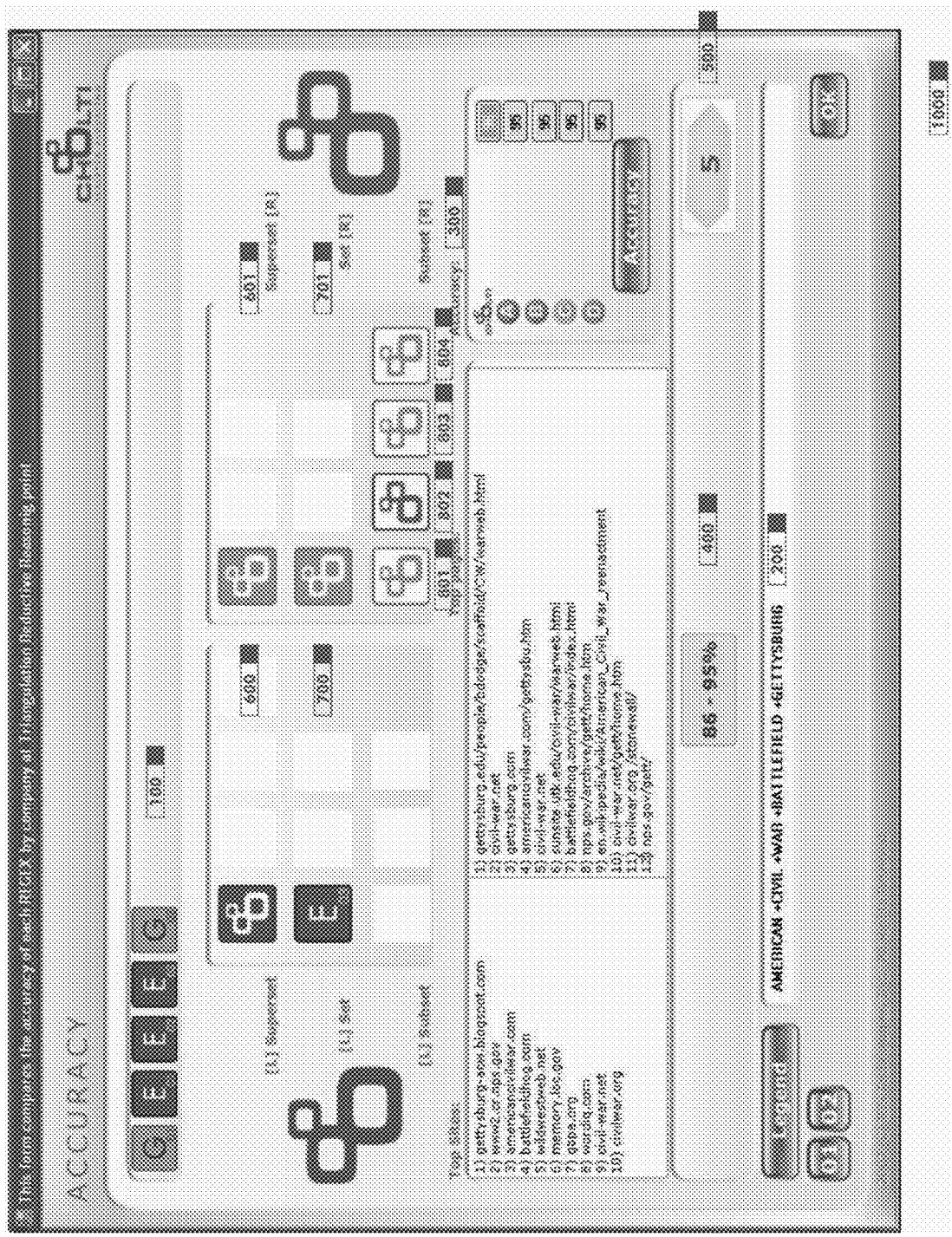
FIG. 8 presents an advanced Glyphs overview.

FIG. 8: Advanced Glyphs Overview: Using Cholti (1000) the end user types the following keywords (200) "American Civil War Battlefield Gettysburg". This request is measured to have (400) an overall accuracy of 86%-95% and (500) quality level of 5. Respectively, (300) shows the relative accuracy of [A]=95%, [B]=95%, [C]=95%, [D]=95% the 'Boolean Algebra' Search Engines, and [E]=96% for Cholti or 'Deductive Reasoning' Search Engine. In this case the request is converted into (100) "American"=[G1], "Civil"=[E1], "War"=[E2], "Battlefield"=[E3], and "Gettysburg"=[G2]. The system selects (600) "American Civil War" ("[G1]+[E1]+[E2]") or C1 represented as a load Cholti as the left side of the brain Superset (i). The system selects "USA" (601) and assigns a loaded Cholti as the right side of the brain Superset (i). The system selects "Battlefield" (700) or [E3] as the left side of the brain Set (i, j). The system selects "Pennsylvania" (701) with a loaded Cholti Glyph as the right side of the brain Set (i, j). The system selects "Gettysburg" (801) or [G2] with (802) loaded Super Glyph {Zip Code}, (803) unloaded Super Glyph {IP Address} and (804) unloaded Super Glyph {ANI} as the right side of the brain Subset. Where ANI equals telephone number ranges, loaded Cholti is certain or reasonable and unloaded Cholti probable. Cholti 'cherry picks' results to further shrink the size of the environment and the accuracy upper limit is adjusted to 96%.

Figure 9:
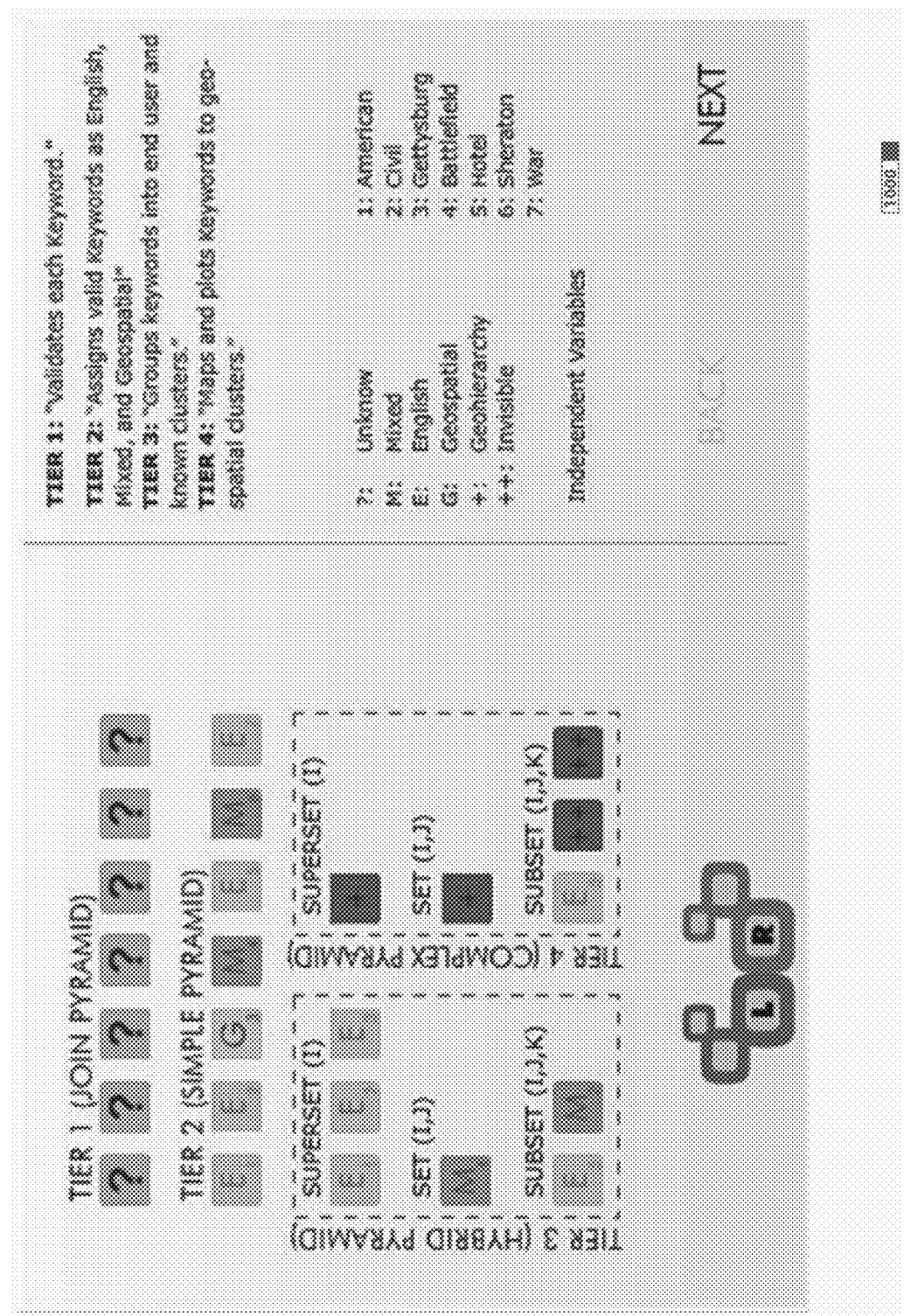
FIG. 9 presents block diagram illustrating the process of stimulating the brain.

FIG. 9: Cholti Simulates the Brain: this diagram explains the step by step process Cholti Scripted Algorithm performs to simulate the human brain. Tier 1 or Join Pyramid (or improbable) the system performs the minimal tasks of identifying, validating and verifying each Keyword and creating a list of Auxiliary variables and related clusters. Tier 2 or Simple Pyramid or (probable) is the process of associating each keyword to specific groups. Tier 3 or Hybrid or (English language or [L] left side of the brain) groups keywords into 'end user' and known clusters. An 'end user cluster' is determined by examining how an end user types keywords in a request and then measures common denominator consecutive keywords and order or priority in which they appear. Tier 4 or Complex (geospatial or [R] right side of the brain) maps and plots Keywords to geospatial clusters that will help valorizes and narrow down top W_Rank. (100) Cholti match/merges the content of the left side and right ([L]+[R]) to identify check mate combination that triggers the process of 'Cherry picking' the optimal result.

Figure 10:
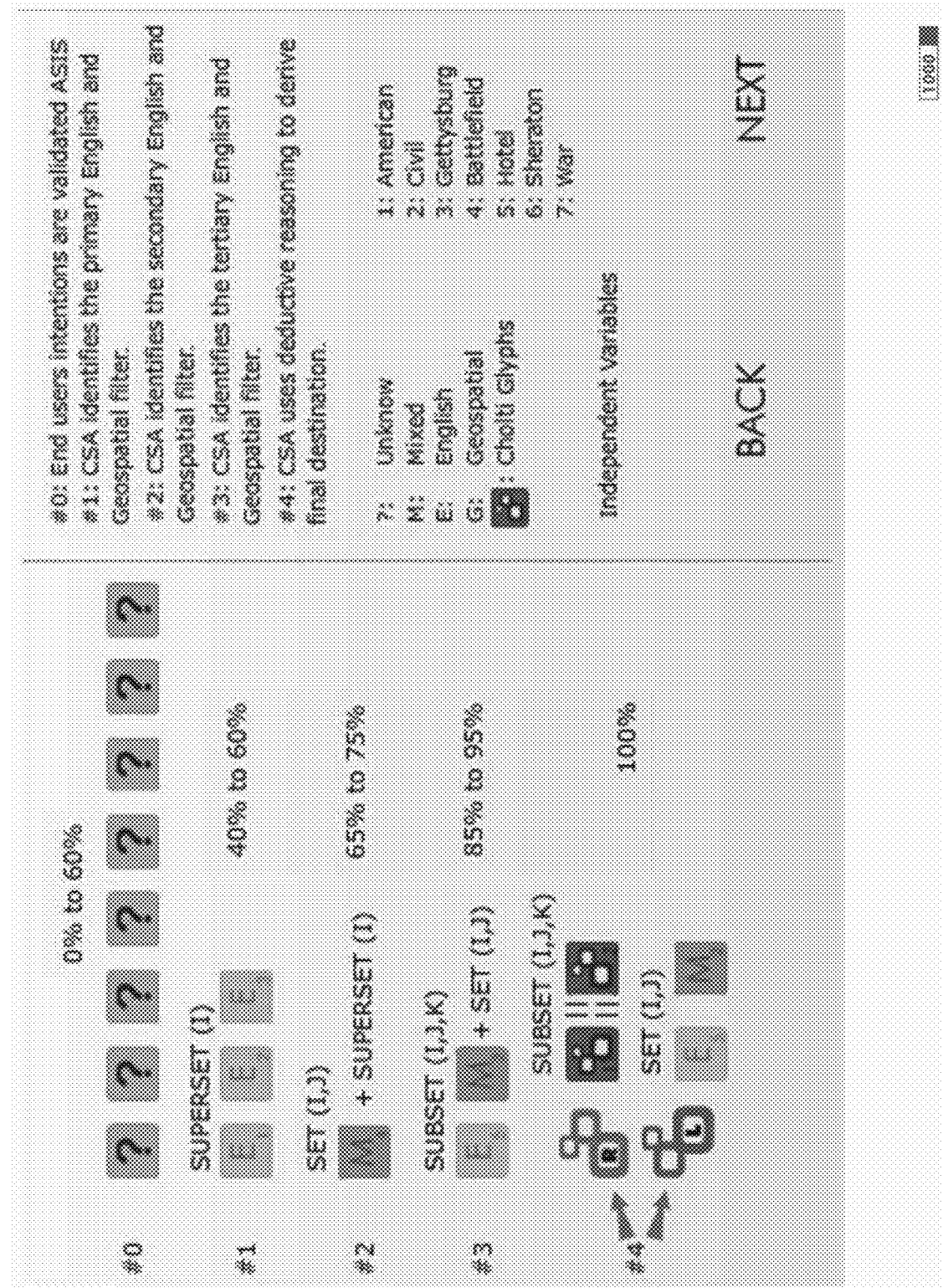
FIG. 10 presents a block diagram illustrating the process performed to reach certitude.

FIG. 10: Accuracy: this diagram explains step by step the process Cholti Scripted Algorithm performs to reach certitude or 100% accuracy. Accuracy is derived as informational entropy improves from vague [0] to certain [4]. [0] is the 'Boolean Algebra' approach that keywords are expressed as 1 valid and 0 invalid. The 'Boolean Algebra' supercomputers use vector components that are feed to the eigenvector based algorithms that select the top page ranks.

[1] or Superset (i) is the process of identifying the primary English [L] left side of the brain and geospatial (or Geodata (w, 0, 0, 0)) [R] right side of the brain primary filter that are used to shrink the size of the environment significant, and serve as the basis of the hierarchical set. [2] or Set (i, j) is the process of further distilling and reducing the environment and then partitioning the Superset(i) into a plurality of Set that have in common a secondary cluster (or keyword) and geospatial (or Geodata (w, x, 0, 0)). [3] or Subset (i, j, k) is the process of further distilling and reducing the environment and then partitioning the Superset (i) into a plurality of Set that have in common a secondary cluster (or keyword) and geospatial (or Geodata (w, x, y, z)). [4] Check Mate combinations or 'Cherry Picking' is the process of weighting the Super Sites and Super Pages against the collection of known facts or Super Glyphs to find the optimal result based on the present conditions of a session. Since 'Boolean Algebra' search engine have a session limit of one request Cholti always measures both the last request and the entire session for optimal results when it estimates a significant difference.

Note: Many leading search engines use Zip Code as their primary filter. This approach can confound a search, for this reason a more robust Telecommunication model is required. Based on U.S. Pat. No. 6,614,893 and its continuations, the Geodata (w, x, y, z) model was incorporated and represents geospatial data in a hierarchical format. Where w=Country, x=State, y=City, and z=Zip Codes that are within a radius of several miles of the latitude and longitude of the City and belong to the same LATA Area or State or Region. To further illustrate the advantages of the Geodata over Zip Code based search the model do the following: 1) Determines how a request affects a response is based on the logical geospatial hierarchical partitioning of the environment. Each a country partitioned into a plurality of Regions, LATA Areas (continental USA if required), NPA or Area Code, NXX or Exchanges and then Zip Codes. Example: A person lives in New Jersey one mile away from New York and the valid geospatial circle radius is fifteen miles, the Zip Code based on State, Area Code, and/or Exchange are worthless, while LATA and Region may yield significant and real results. 2) Geodata assigns probabilities and distances to each plausible match and thus removes all the associated confounding elements with the search. 3) Finds the missing gaps of information Super Sites and Super Pages. The primed information gathered in steps 1 to 3 is inserted into the {State}, {City}, {ANI}, {Zip Code} and {IP Address} Super Glyphs or collections of known facts. For this reason raw Zip Code should never be used as a filter for 'Boolean Algebra' search. The Geodata model is a significant improvement over Zip Code or City Name based searches, since it does not work with raw data. Instead the system does the following steps 1) primes the information to remove confounding data, 2) uses 'Deductive Reasoning' to solve for missing data and 3) insert the correct data associated to the search. To those readers in the telecommunication field in particular when billing, the confounding elements are similar to the infamous USOC.

Figure 11:
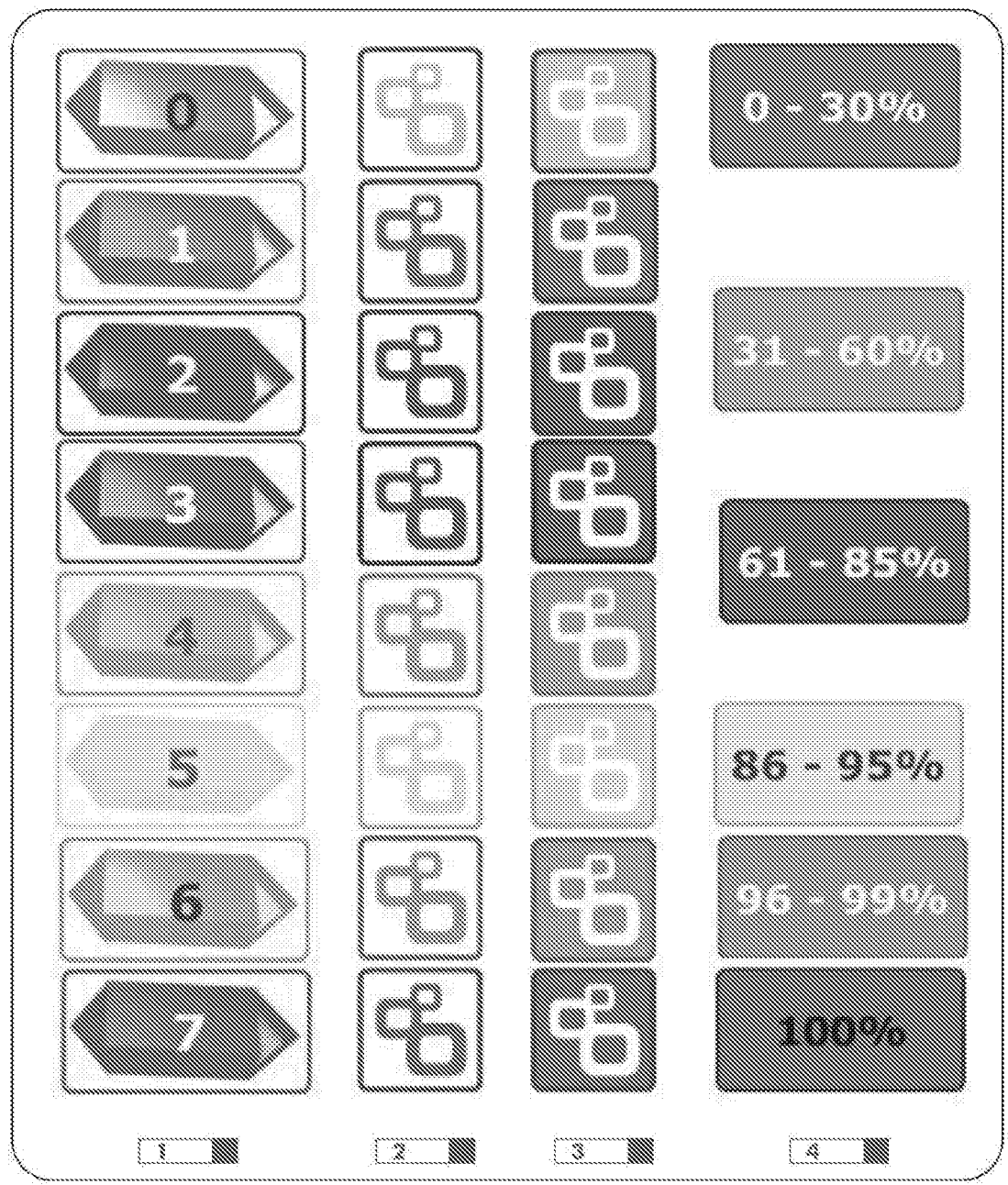
FIG. 11 presents various software symbols utilized by the search engine optimizer.

FIG. 11: Cholti Software Symbols: can divided into four categories: Column (1) measures the quality of the request, where 0 is gray, 1 is violet, 2 is blue, 3 is green, 4 is light green, 5 is yellow, 6 is orange, and 7 is red. Column (2) measures the level of accuracy, based on the quality level as follows: [0] has 0% to 30% accuracy or outer circle, [1 to 2] has 31% to 60% accuracy or acceptable circle, [3 to 4] has 61% to 85% accuracy or traditional 'Boolean Algebra' circle, [5] has 86% to 95% accuracy or improved circle, [6] has 96% to 99% accuracy or inner and [7] is certain or 100% accuracy or 'Cherry picking' circle and thus the red color. Column (3) represents unloaded Cholti Glyphs and Column (4) represents loaded Cholti Glyphs. When identifying the optimal result the unloaded and loaded Cholti Glyphs are used to represent Super Glyph objects. A Super Glyph object is a dynamic object that has a plurality of vector components that are used to measures hierarchical sets.

Figure 12:
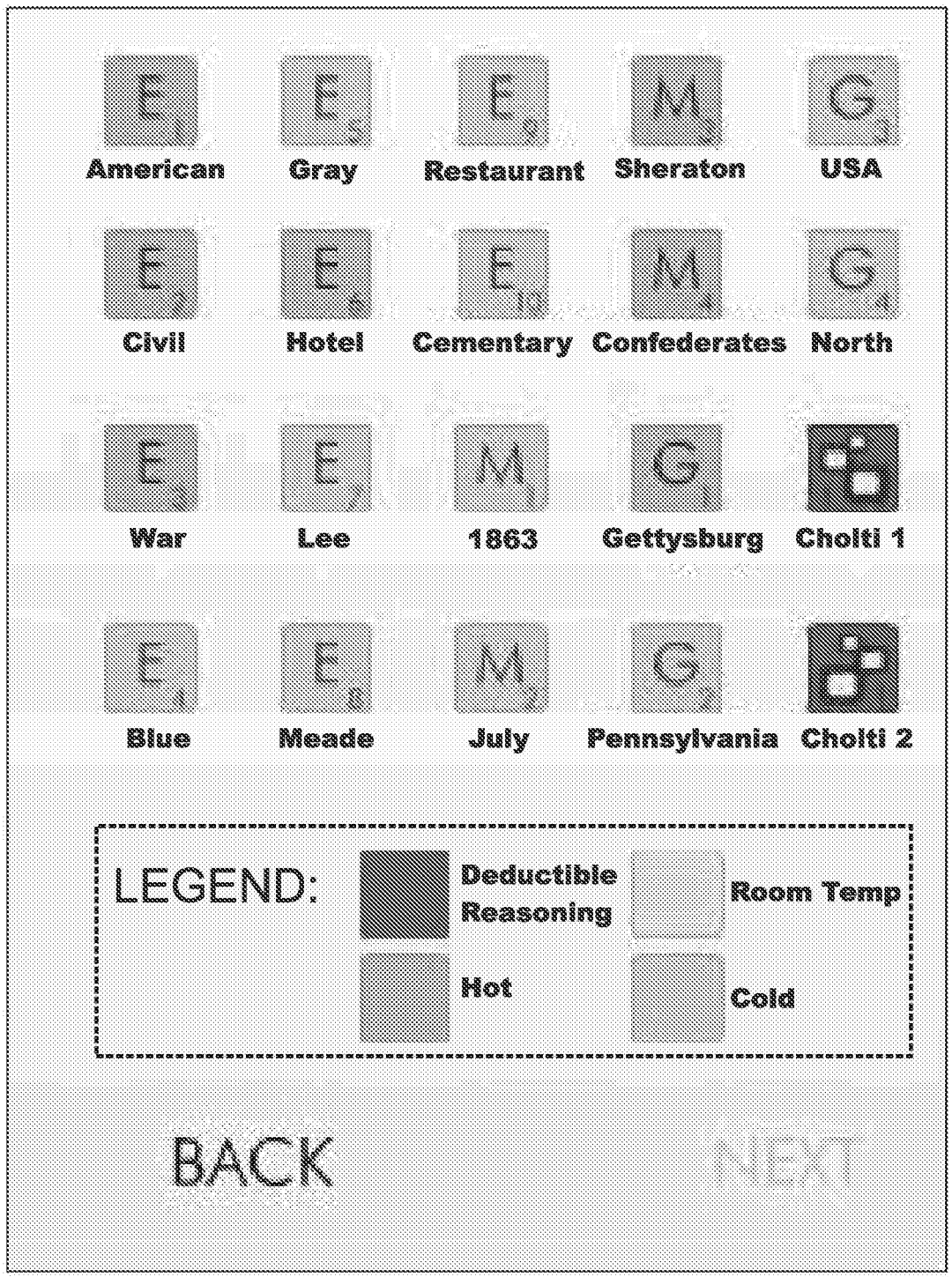
FIG. 12 presents a process utilizing a hot and cold algorithm.

FIG. 12: Hot & Cold Algorithm: once Cholti has measured a plurality of requests in a session see FIG. 14 the program is able to use the Hot and Cold Algorithm.

The Hot Algorithm measure trends and the Cold Algorithm measures 'Boolean Algebra' pitfalls. In the diagram the system has identified a plurality of keywords that are used in a session consisting of a plurality of requests. Cholti identified each keyword as follows: "American" or [E1], "Civil" or [E2], "War" or [E3], "Blue" or [E4], "Gray" or [E5], "Hotel" or [E6], "Lee" or [E7], "Meade" or [E8], "1863" or [M1], "July" or [M2], "Sheraton or [M3], Confederates [M4] or [E11], "Gettysburg" or [G1], "Pennsylvania" or [G2], "USA" or [G3], "North" or [G4], {Zip Code} loaded Cholti or [C1] and {ANI} loaded Cholti or [C2]. Note: When Cholti assigns a geospatial keyword to belong on the [L] left side instead of the right side like "American" or [G1] it set the Geodata to null, otherwise the geospatial information may dramatically dilutes the environment in a confounded manner. When a geospatial keyword is assigned in the [L] left side of the brain it can be referenced as a [M] or mixed keyword.

Since the session had a plurality of requests and thus all keywords are not at room temperature. Cholti determines the following keywords: [E1], [E2], [E3], [E6], [M3], [M4], & [G1] as Hot. Cholti determines the following keywords: [E4], [E5], [E7], [E8], [E9], [E10], [M1], [M2], [G2], [G3], & [G4] as Cold. [C1] and [C2] are valid and reasonable Super Glyphs. Red colored Super Glyph are certain and are fully loaded always and thus Hot words.

Once the optimal button is pressed in the browser, based on the consecutive related request, the system can create the appropriate hierarchical set, and then filter with geospatial information to 'Cherry Pick' using deductive reasoning the optimal result.

Figure 13:
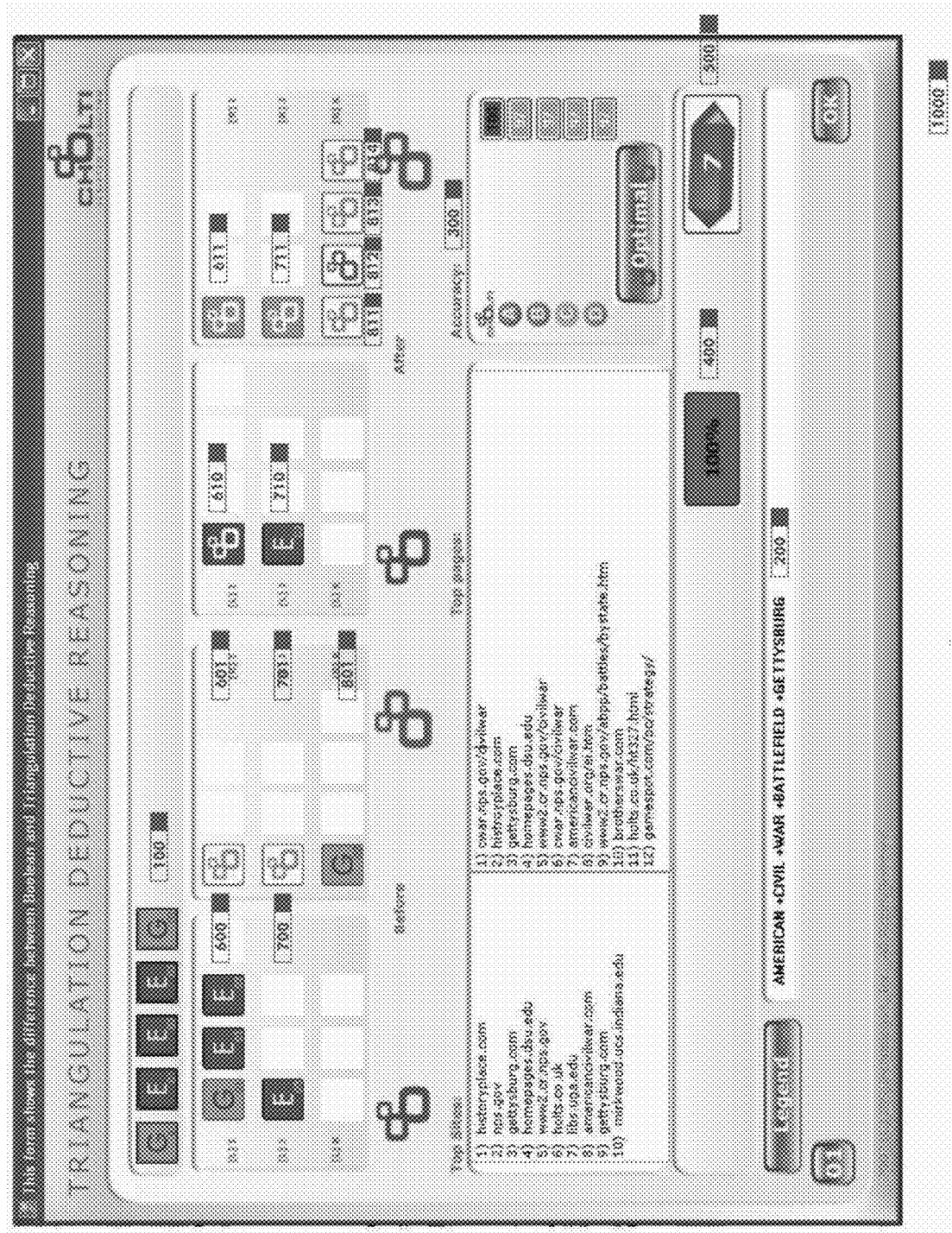
FIG. 13 presents an enhanced Glyphs overview.

FIG. 13: Improved Glyphs Overview: Using Cholti (1000) the end user types the following keywords (200) "American Civil War Battlefield Gettysburg". This request is measured to be certain (400) or has an overall accuracy of 100% and (500) quality level of 7. Respectively, (300) shows the relative accuracy of [A]=97%, [B]=97%, [C]=97%, [D]=97% the 'Boolean Search' Engines, and [E]=100% or certain for Cholti or 'Deductive Reasoning Search' Engine.

Using 'Before' or Ax from FIG. 5. The 'Before' request is converted into (100) "American"=[G1], "Civil"=[E1], "War"=[E2], "Battlefield"=[E3], and "Gettysburg"=[G2]. The system selects "American Civil War" (600) or ([G1]+ [E1]+[E2]) as the left side of the brain Superset (i). The system selects "USA" (601) and assigned an unloaded Cholti as the right side of the brain Superset (i). The system selects "Battlefield" (700) or [E3] as the left side of the brain Set (i, j). The system selects "Pennsylvania" (701) and assigns an unloaded Cholti Glyph as the right side of the brain Set (i, j). The system selects "Gettysburg" (801) or [G2] as the right side of the brain Subset (i, j, k).

Using 'After' or Bx from FIG. 8. The 'After' request is converted into (610) "American Civil War" or ("[G1]+[E1]+ [E2]") or C1 represented as a load Cholti as the left side of the brain Superset (i). The system selects "USA" (611) and assigns a loaded Cholti as the right side of the brain Superset. The system selects "Battlefield" (710) or [E3] as the left side of the brain Set (i, j). The system selects "Pennsylvania" (711) with a loaded Cholti Glyph as the right side of the brain Set (i, j). The system selects "Gettysburg" (811) or [G2] with loaded Super Glyph {Zip Code} (812), unloaded Super Glyph {IP Address} (813) and unloaded Super Glyph {ANI} (814) as the right side of the brain Subset (i, j, k).

When the end user clicks into optimal button, the program will display the Super Glyph equation used to determine certainty.

Figure 14:
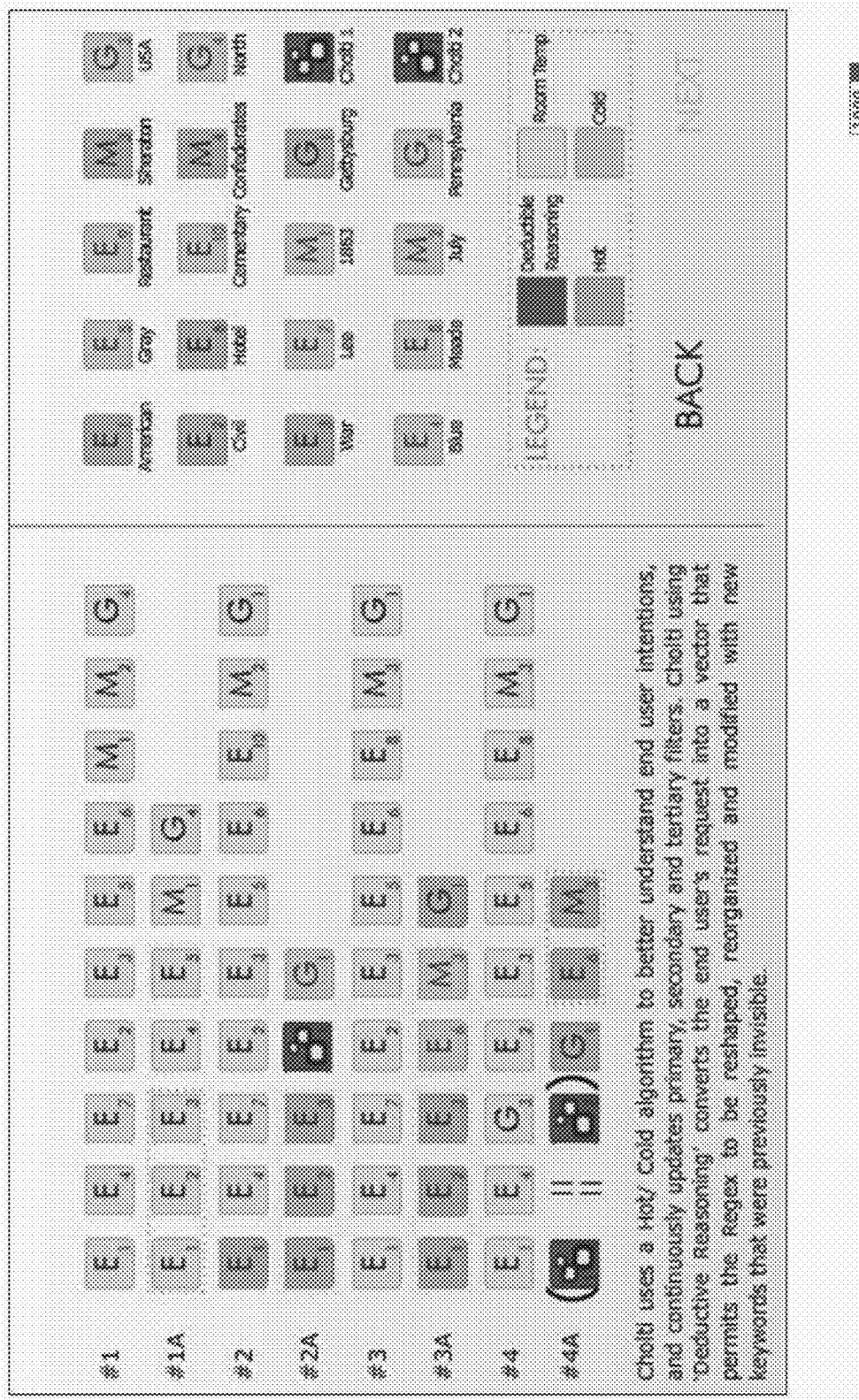
FIG. 14 presents a block diagram illustrating a deductive reasoning search.

FIG. 14: 'Deductive Reasoning' Search: is a diagram that illustrates the left side of the page (1000) with four request sessions. [1], [2], [3] and [4] use 'Boolean Algebra', and [1A], [2A], [3A] and [4A] use 'Deductive Reasoning' The right side of the page as per FIG. 12 shows how the results of the Hot and Cold Algorithms. As Hot & Cold Algorithm keywords and Super Glyphs values are calibrated Cholti is able to rewrite the request of existing 'Boolean Algebra' search engines.

As more significant difference events are encountered and check mate combinations are detected in [4A] Cholti is able to 'Cherry pick' the optimal result. Should a [5] and [5A] request exists the Hot & Cold algorithms keyword values will change, and based on the significant changes of the last request a new valid Super Glyph equation will be created.

Consequently, a session can have multiple valid equations and all are taken into account when determining the final one. Super Glyphs are objects that measure events within valid parameters. In a session common denominator Super Glyphs will have a more volatile range of parameters.

Note: In all of the FIGS. using Cholti the 'After' or Bx accuracy levels represents the quality of existing 'Boolean Algebra search engines [A], [B], [C], and [D] that represent 95% of the US marketing in 2008.

Figure 15:
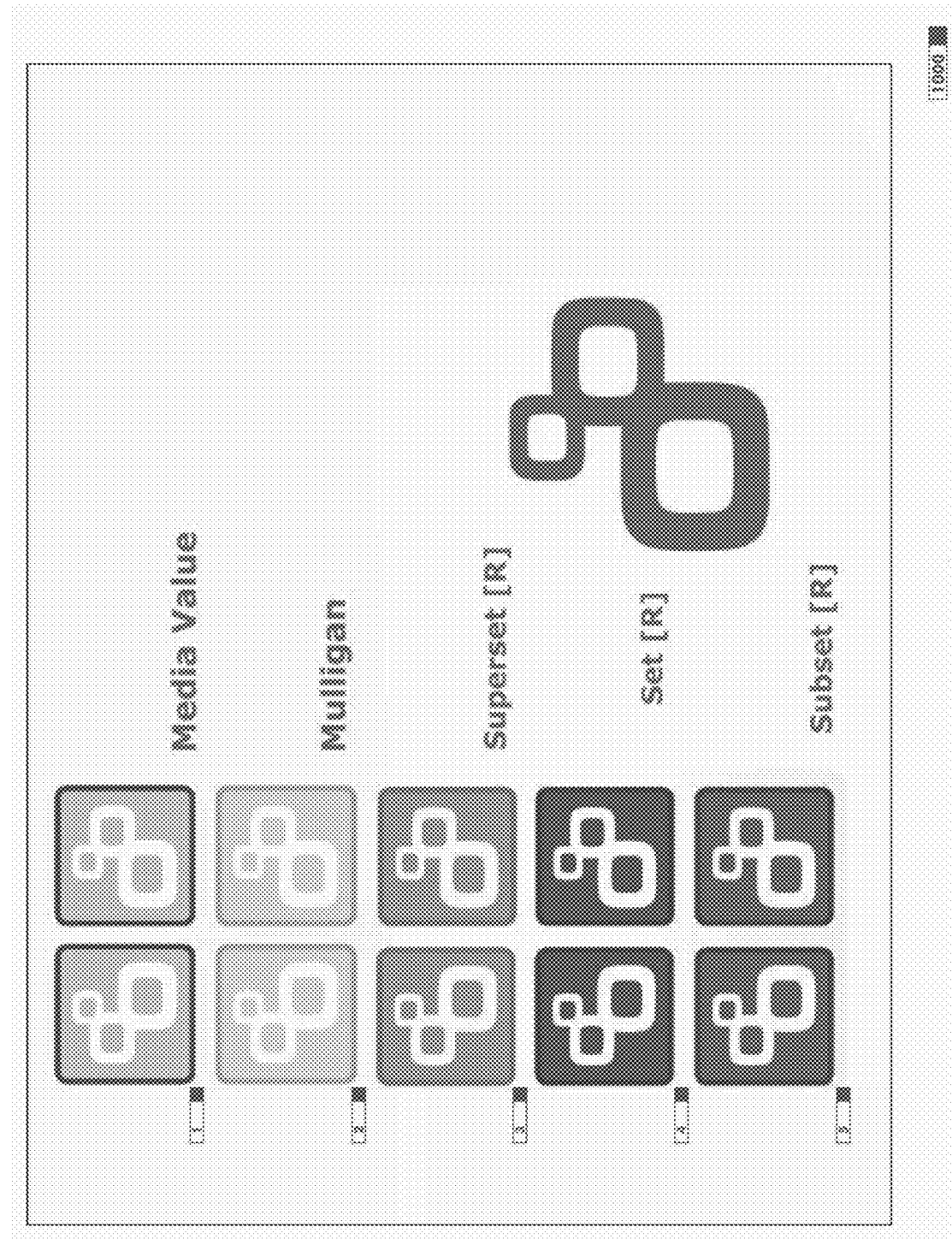
FIG. 15 presents a super Glyph overview.

FIG. 15: Super Glyph Overview: this diagram (1000) represents the final resultant Super Glyph Search equation that is comprised on five pairs of Super Glyphs. From top to bottom: The (1) first pair represents the 'end user' satisfaction and corporate media of particular typed keywords. The second (2) pair represents the (yellow) Mulligan keywords belonging to unrelated partial environments and all the auxiliary keywords belonging to related partial environments. The third (3) pair represents valid (green) geospatial common denominator filters. The fourth (4) pair represents valid (blue) English language common denominator filters. (3) Is used to create Geodata (w, x, y, z) arrays. (4) is used to create hierarchical sets consisting of a plurality of valid Superset(i), Set(I,J) and Subset(I,J,K). The fifth (5) pair represents reasonable or certain element of the Super Glyph equation.

The following FIGS. 16 to 26 associated texts are presented and incorporated by reference in its entirety as originally presented in U.S. patent application Ser. No. 11/584,941 filed on Oct. 23, 2006 (issued as U.S. Pat. No. 7,809,659 on Oct. 5, 2010).

Figure 16:
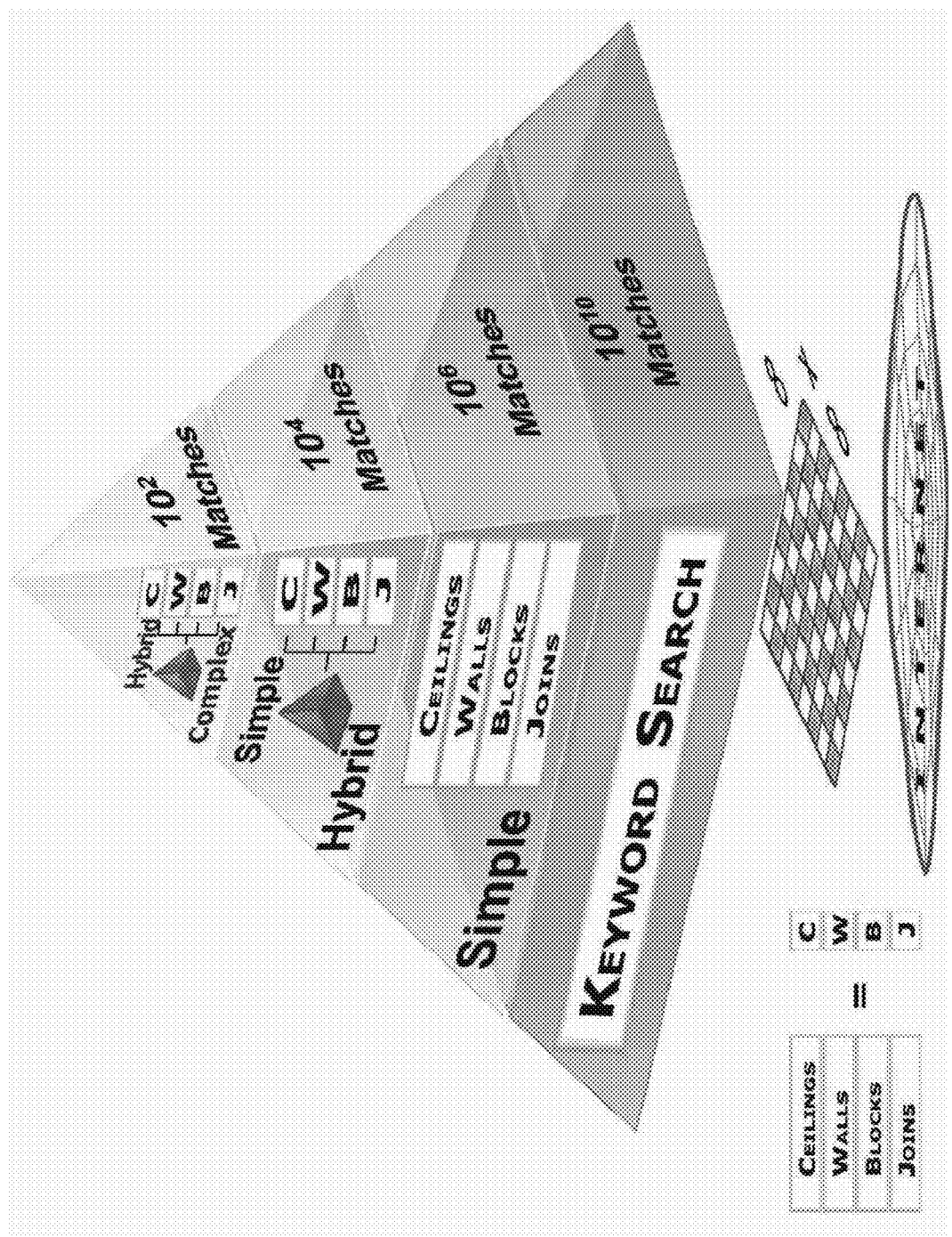
FIGS. 16 to 26 are presented and incorporated by reference in its entirety as originally presented in U.S. patent application Ser. No. 11/584,941 filed on Oct. 23, 2006 (issued as U.S. Pat. No. 7,809,659 on Oct. 5, 2010).

FIG. 16 is a schematic representation of the Information Pyramid Structure that interacts with the environment or Internet. The supplier system simulates the entire superset of valid KEYWORD regular expression requests, and converts the results in Environmental Bitmap map data, so that future request are made absent of the Browser Engine supercomputer (8×8) cluster searching capabilities. The system measures each KEYWORD regular expression magnitude or quantity of hits belonging to a query. For a vague KEYWORD search the system assumes, that a large # of valid hits implicitly exists such as 10,000,000,000 making the value of the response meaningless. For a vague KEYWORD search, the system associates them to a Simple Pyramid Structure search that filters down the magnitude of vagueness by a factor of 10,000. The process of improving the Informational Entropy begins by filtering the vague KEYWORD search by reading, comparing validating the semantic structure of the content of the all the responses and not just the highest page ranks. The supplier system measures the value of the content by comparing the quantity and quality of Simple Joins, Blocks, Ceiling and Walls, which are another name for collections of words and grammatical rules that are used to write properly in a given language.

For a concise KEYWORD search the system assumes, that a medium # of valid hits implicitly exists such as 1,000,000 making the value of the response virtually meaningless. For a concise KEYWORD search, the system associates them to a Hybrid Pyramid Structure search that filters down the magnitude of vagueness by a factor of 100. The process of improving the Informational Entropy continues by filtering the concise KEYWORD search by further reading, comparing validating the semantic structure with their association to higher magnitude words. The supplier system further measures the value of the content by comparing the quantity and quality of Hybrid Joins, Blocks, Ceiling and Walls, which consists of less common word collections, geospatial data, antonyms and synonyms.

For a precise KEYWORD search the system assumes, that a small # of valid hits implicitly exists such as 10,000 making the value of the response discrete. For a precise KEYWORD search, the system associates them to a Complex Pyramid Structure search that filters down the magnitude of vagueness by a factor of 100. The process of improving the Informational Entropy continues by filtering the precise KEYWORD search by further reading, comparing validating the semantic structure with their association to higher magnitude words. The supplier system further measures the value of the content by comparing the quantity and quality of Complex Joins, Blocks, Ceiling and Walls, also analyzes all the HTML information, and associated links to make sure the content is not a spam or viral contamination. Then system finds the optimal KEYWORD search by using the content, page and security value achieve Informational Entropy and derive the top 10 most satisfying results.

Figure 17:
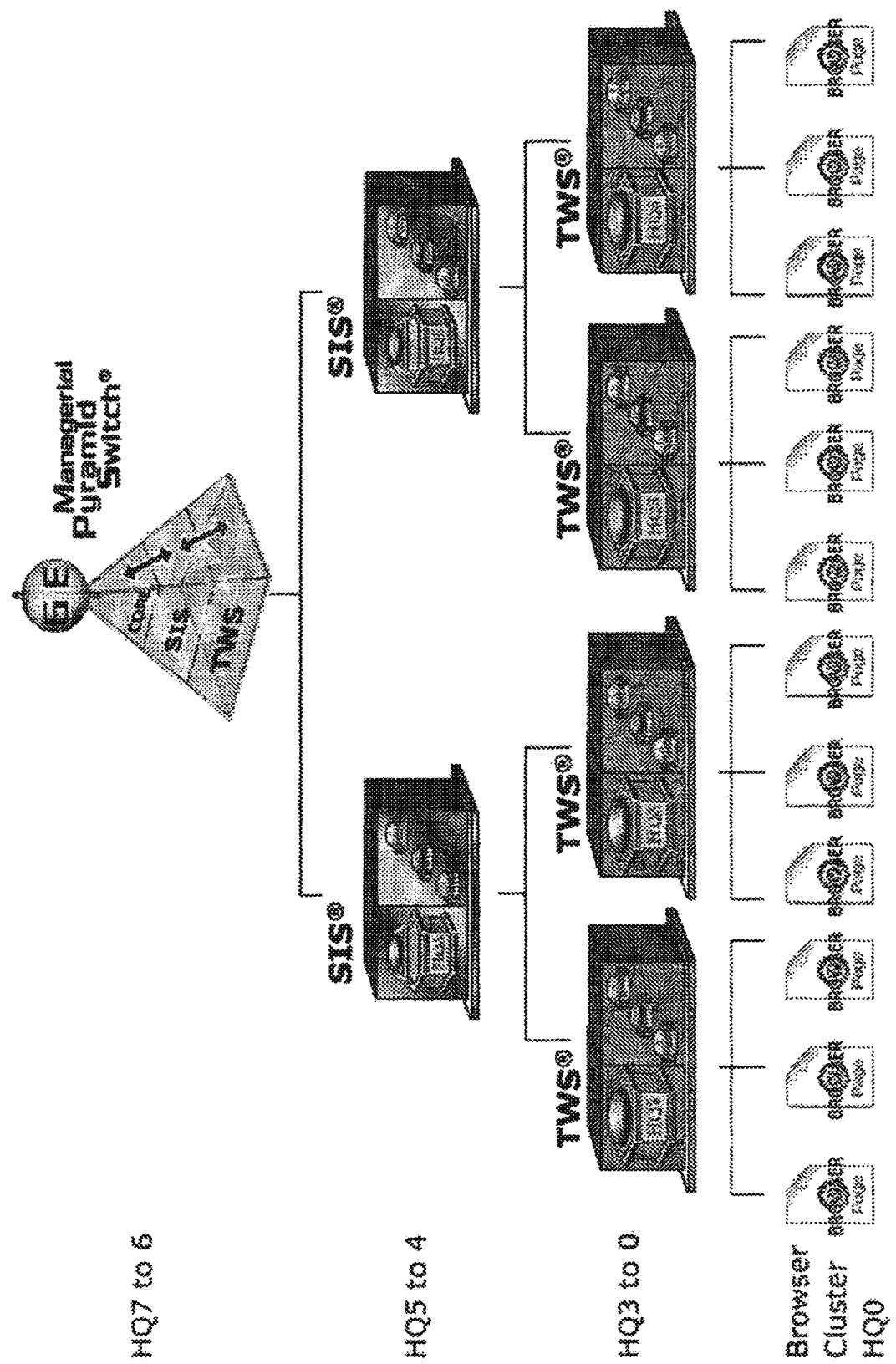

FIG. 17 is a schematic representation of the Distribution of XCommerce. As a global Managerial Pyramid Switch® Architecture, the system is divided into three tiers from top to bottom: 1) MPS® HQ7 to HQ6 manages, controls and through lateral synergy live statistics of end users activities, volumes and patterns of behavior, creates Complex Pyramid Structures and handles all of the financial interaction with 3rd parties. 2) SIS® HQ5 to HQ4 delivers Optimal Value Advertisement instead of Target Advertisement and creates Hybrid Pyramid Structures. 3) TWS® HQ3 to HQ0 controls a plurality of HQ1 to HQ0 that interact with the Environment comprising a plurality of Browser Engine Supercomputers (8×8) that help to identify, valorize and quantify KEYWORD, and then create Simple Pyramid Structures.

Figure 18:
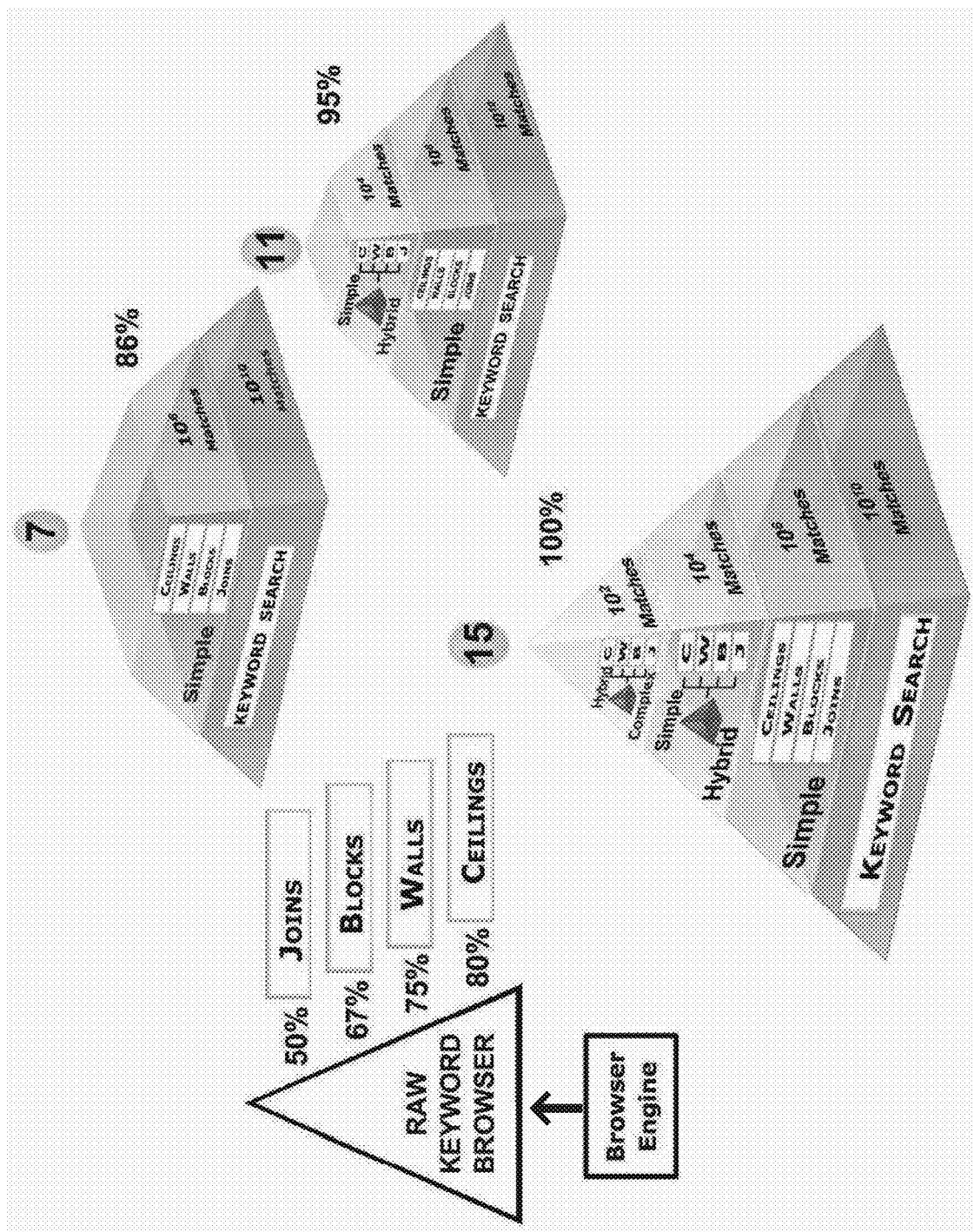

FIG. 18 is a schematic representation of Informational Entropy. An end user makes a request using English language KEYWORDS. (0) $X responses are obtained by a Browser Engine using Caesar's Divide and Conquer based Eigenvector programming. (1) After using Simple Join Collections of KEYWORD, the quality and English value is 50%. (2) After using Simple Blocks Collections of KEYWORD, the quality is 67% and the content is considered to be proper English. (3) After using Simple Walls Collections of KEYWORD, the quality is 75% and is grouped in cells. (4) After using Simple Ceilings Collections of KEYWORD, the quality is 80% and is grouped in blocks. (5) The Simple Pyramid Structure has filtered, validated and verified the quality of the English language value that is 86%, and has measured through relational association common denominator groups that help elucidate the optimal element (A) of the Superset (U). (6) The Hybrid Pyramid Structure has filtered, validated and verified the quality of the geospatial data value that is 95%, and has linked each block the different DATA collections groups to further refine and polish the results that help elucidate the optimal element (A) of the Superset (U). (7) The Complex Pyramid Structure has filtered, validated and verified the quality of the Business Intelligence patterns and statistical analysis of end users' satisfaction to real Informational Entropy of 100%, which has identified the optimal element (A) of the Superset (U). (8) The Simple, Hybrid and Complex Pyramid Structures have $X responses, 1,000,000 cells and 500,000 building blocks each regardless of the KEYWORD.

Figure 19:
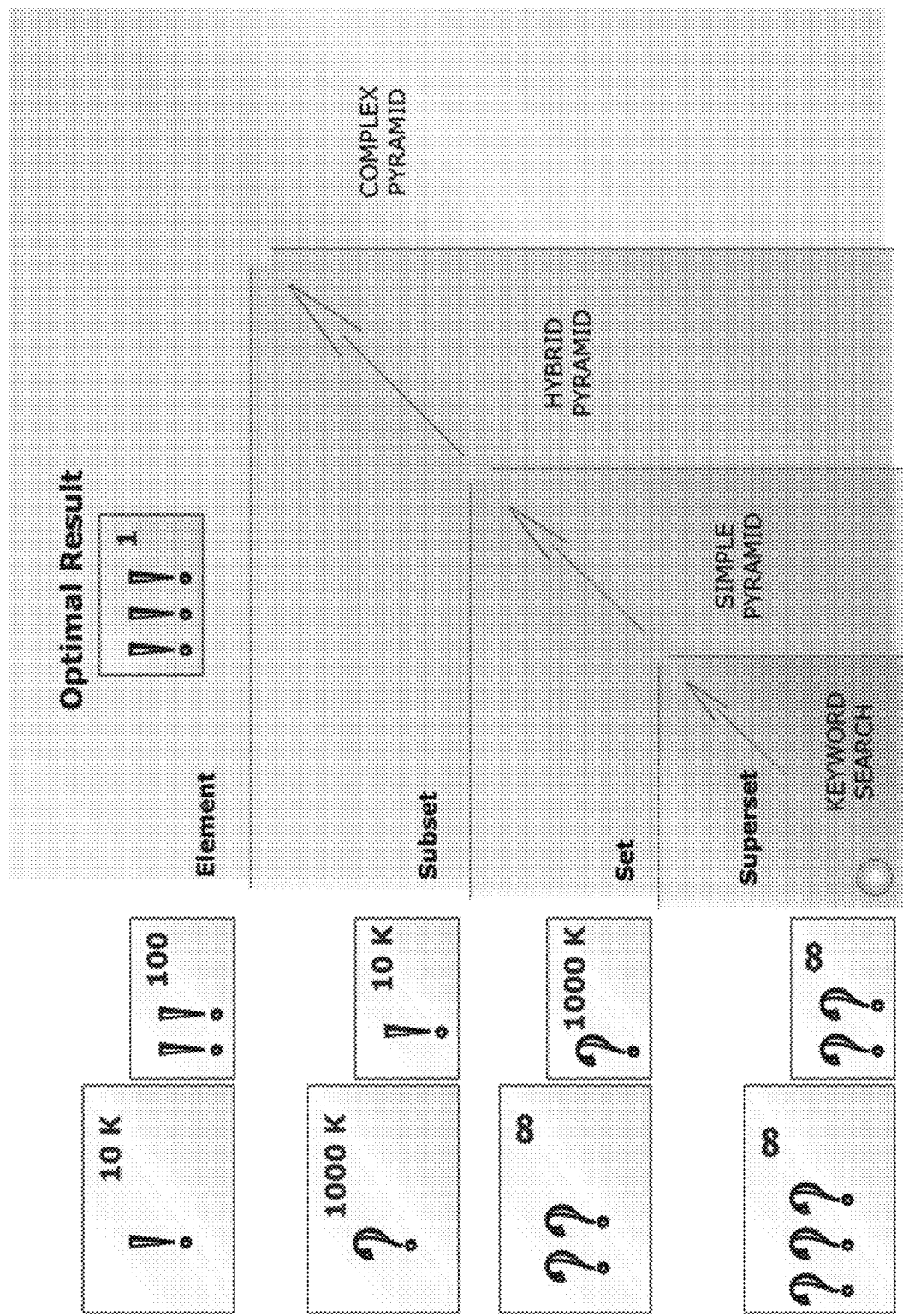

FIG. 19 is a schematic representation of Deriving Information Entropy. This example uses chess notation, where (???) is a blunder, (!) is a good move and (!!!) a superb move. In this case, raw Browser Engine filters out the information of the Internet or Superset that is considered to be (???) and improves it to (?? to !). (1) When the original magnitude <=10,000,000,000 responses, the process of identifying basic English constructs of the contents help narrow down the size of the set to <=100,000,000, which is measured as (??). (2) When the original magnitude <=10,000,000 responses, the process of identifying the English language semantics and geospatial characteristics of the contents help narrow down the size of the set to 1,000,000, which is measured as (?). (3) When the original Browser Engine magnitude <=100,000 and is less than responses, the process of identifying the English language and geospatial characteristics of the contents help narrow down the size of the set to 10,000, is measured as (!). (4) When the original Browser Engine magnitude <=100 and is less than responses, the process of identifying the English language structure and a system understanding of the content of each page helps narrow down the size of the set to 10, which contains 'la crème de la crème' and thus is measured as (!!). (5) From the discrete set of 10 by using Business Intelligence, the optimal element (A) of the Superset is derived and thus is measured as (!!!). The process of identifying the optimal element (A) is the basis of the W_RANK method.

Figure 20:
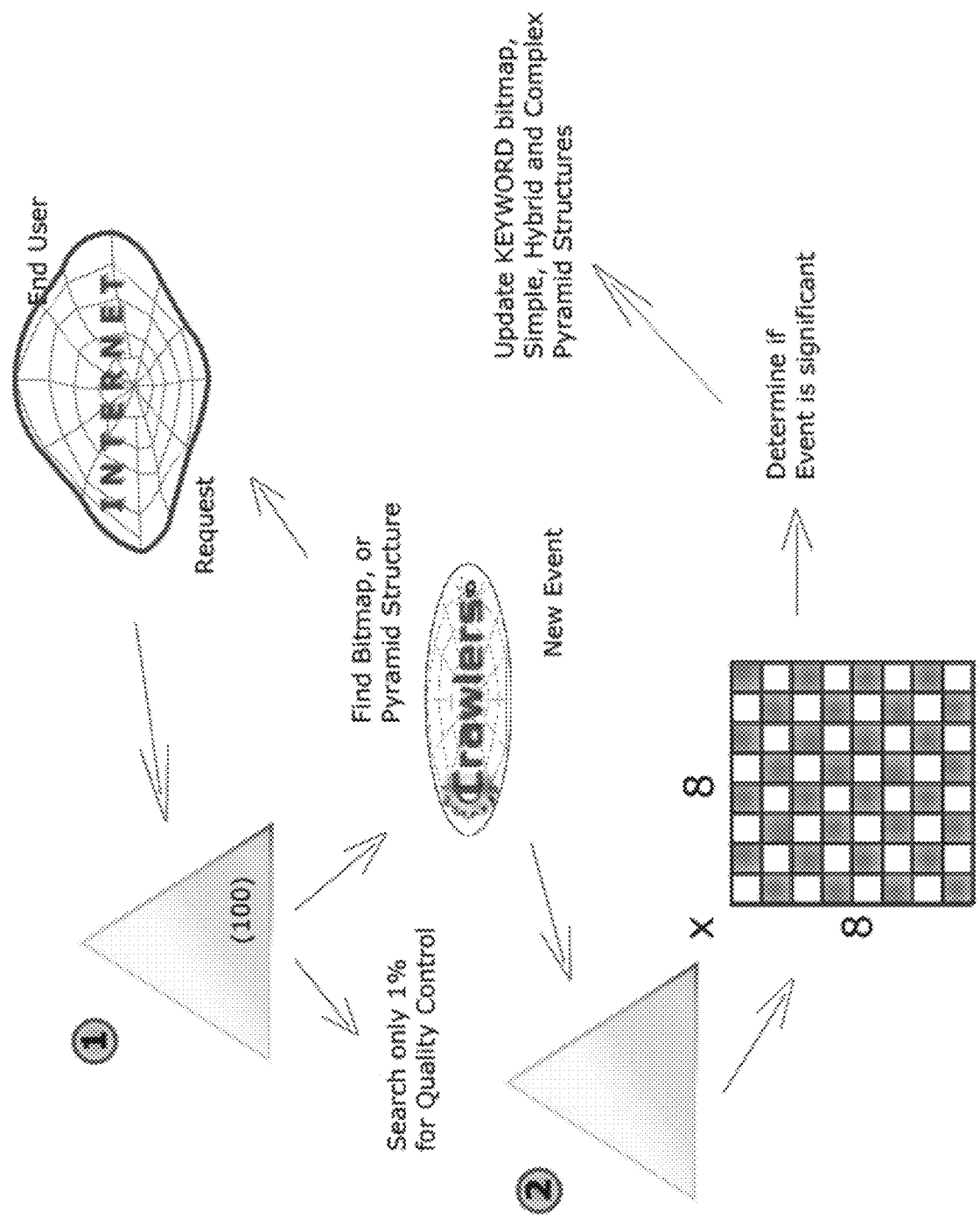

FIG. 20 is a schematic representation of an Interface to Browser overview using the XCommerce technology. The (100) supplier system analyzes the Internet by analyzing, distilling, eliminating redundancy, converting, transforming and standardizing it into a lingua franca geospatial data. (1) The supplier system receives requests from end users, and determines the optimal solution by checking the environmental bitmap information of each KEYWORD. (2) The inventory of information is updated by Web Crawlers that measure the quality of each page belonging to a link as each new event is detected. (3) The cluster of nodes comprises a Supercomputer, analyzes the new event, determines if the event is significant and the update the Environmental Bitmaps Inventories based on KEYWORDS and KEYWORDS Groups.

Figure 21:
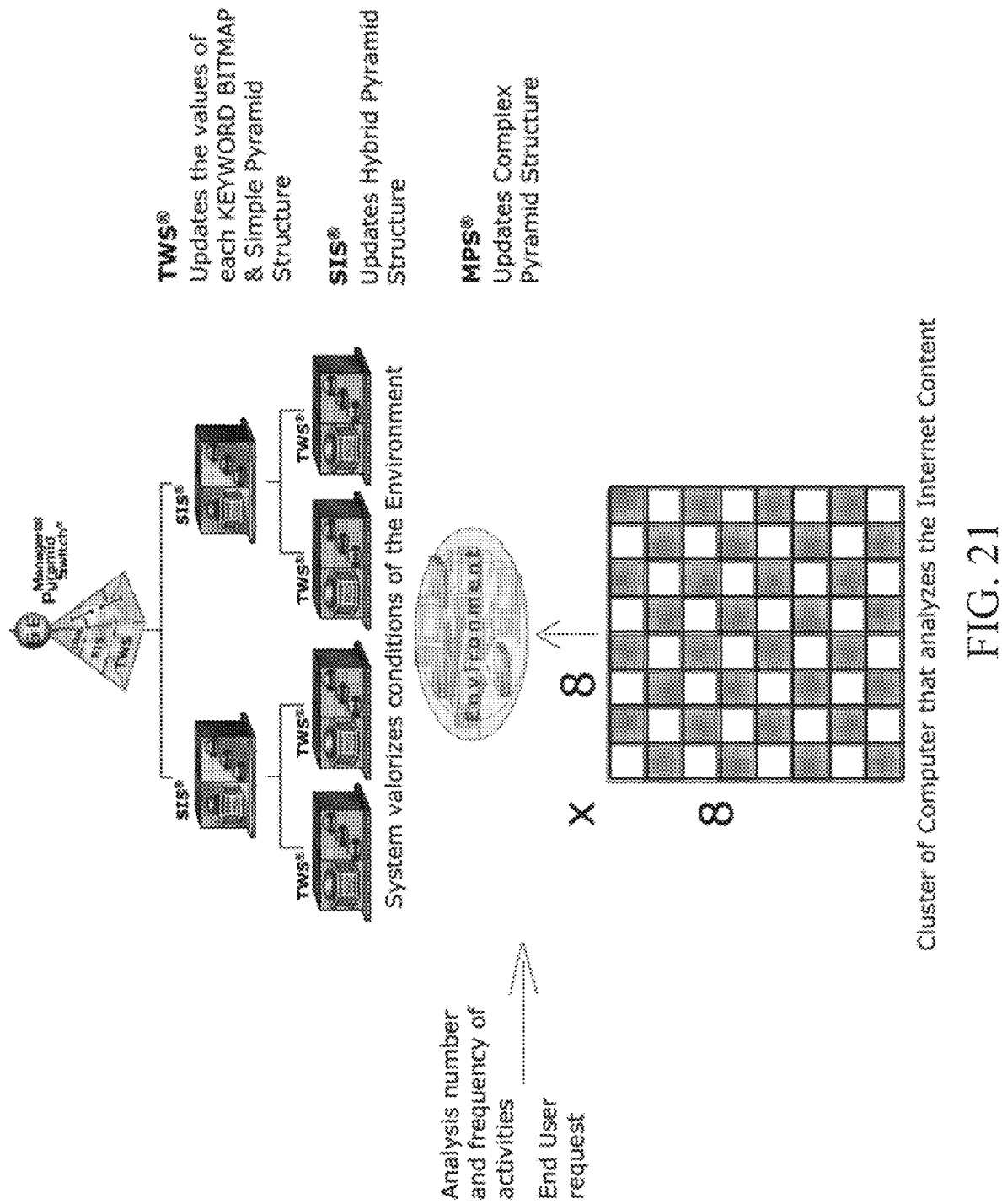

FIG. 21 is a schematic representation of W_RANK Updates. This is the process of integrating existing 3$^{rd}$ party web browsers with the XCommerce technology. In this case, an HQ7 to HQ0 hierarchical organization is used to cover the Internet that has a global scope. (1) The supplier system consists of a three tier Managerial Pyramid Architecture, where the HQ0 to HQ2 creates a single or group based Environmental Bitmap. First, the lower tier has a plurality of TWS® responsible for generating Simple Pyramid Structures, and works in conjunction with its subordinates to identify KEYWORDS collections known as Simple Joins, Blocks, Walls and Ceiling that permit a clearer understanding of the value of the content of each link and its associate pages. Second, the Middle tier has a plurality of SIS® responsible for generating Hybrid Pyramid Structures, and works in conjunction with its subordinate TWS® organizations to identify KEYWORDS collections known as Hybrid Joins, Blocks, Walls and Ceiling that permit a clearer understanding of the value of the content of each link and its associate pages. Third, the Summit tier has a plurality of MPS® responsible for generating Complex Pyramid Structures, and works in conjunction with its subordinate TWS® organizations to identify KEYWORDS collections known as Complex Joins, Blocks, Walls and Ceiling that permit a clearer understanding of the value of the content of each link and its associate pages.

At the same time the MPS® has an interface to a (2) browser engines cluster or 3$^{rd}$ party Supercomputer (8×8) that analyzes the content of the (3) environment or the Internet, and has the capacity of retrieving the most valuable responses for each KEYWORD regular expression request made by an end user. In other words, the MPS® interacts with a browser engine cluster to create single or groups of KEYWORDS Environmental Bitmaps which are the basis for developing the higher structures. In this case, the HQ0 to HQ2 are responsible for not just simulating and mimicking the Network Platform Equipment (or Browser Engine individual nodes) of the environment, but for communicating and working together with them. The supplier system, in order to work in real time, must first create the environmental bitmaps and the higher structure Environmental Bitmaps process that can take one or two months, at which point both technologies are integrated and synchronized as is hereinafter referred as XCommerce.

Figure 22:
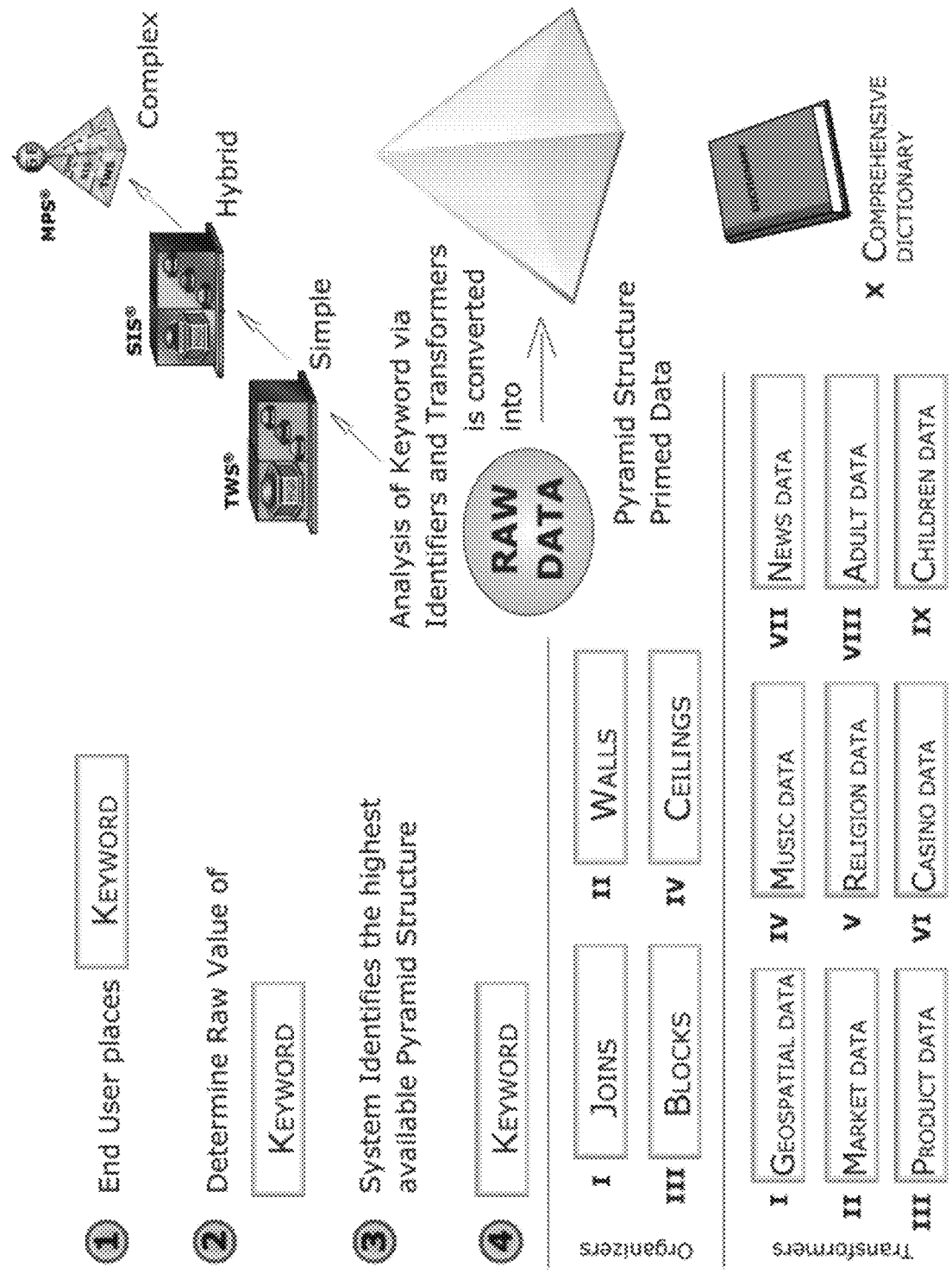

FIG. 22 is a schematic representation of how the Browser Identifies the Highest Match. (1) The end users place a single or group of KEYWORDS regular expression. (2) The system identifies the raw value of the KEYWORDS which is expressed from 0 to 15, where 0 is a very broad result of over 1,000,000,000 (or billion) and 15 is a very narrow result with at most 10 instances. Sometimes, they satisfy and most often they don't, and this is the craving need that this technology resolves. Instead of using the classical method of using a Browser Engine to search each time for KEYWORDS Regular Expression, the system precalculates the inquires as part of the Environmental Bitmap for single or group of KEYWORDS. (3) Based on the Regular Expression of KEYWORDS, the system identifies the highest available Pyramid Structure. For Browser Engines an event begins when an end user makes a request, and for XCommerce an event begins when a mathematically significant change in the environment is detected. (4) The system associates for each KEYWORD a weighted probability of also containing Simple Joins, Blocks, Walls and Ceilings that can be further associated with collections of transformers such as geospatial data, market, product, music, religious, casino, news, adult, children and dictionary data. For example, the word Miami can be associated with Dade County, State of Florida, USA, or America and with 305 and 786 Areas Codes, and a plurality of zip codes. The MPS® technology uses ANI or telephone #'s and zip codes belonging to a Local Access and Transport Areas (LATA) distribution of geographic areas as per Doctoral Dissertation and U.S. Pat. No. 6,614,813.

Figure 23:
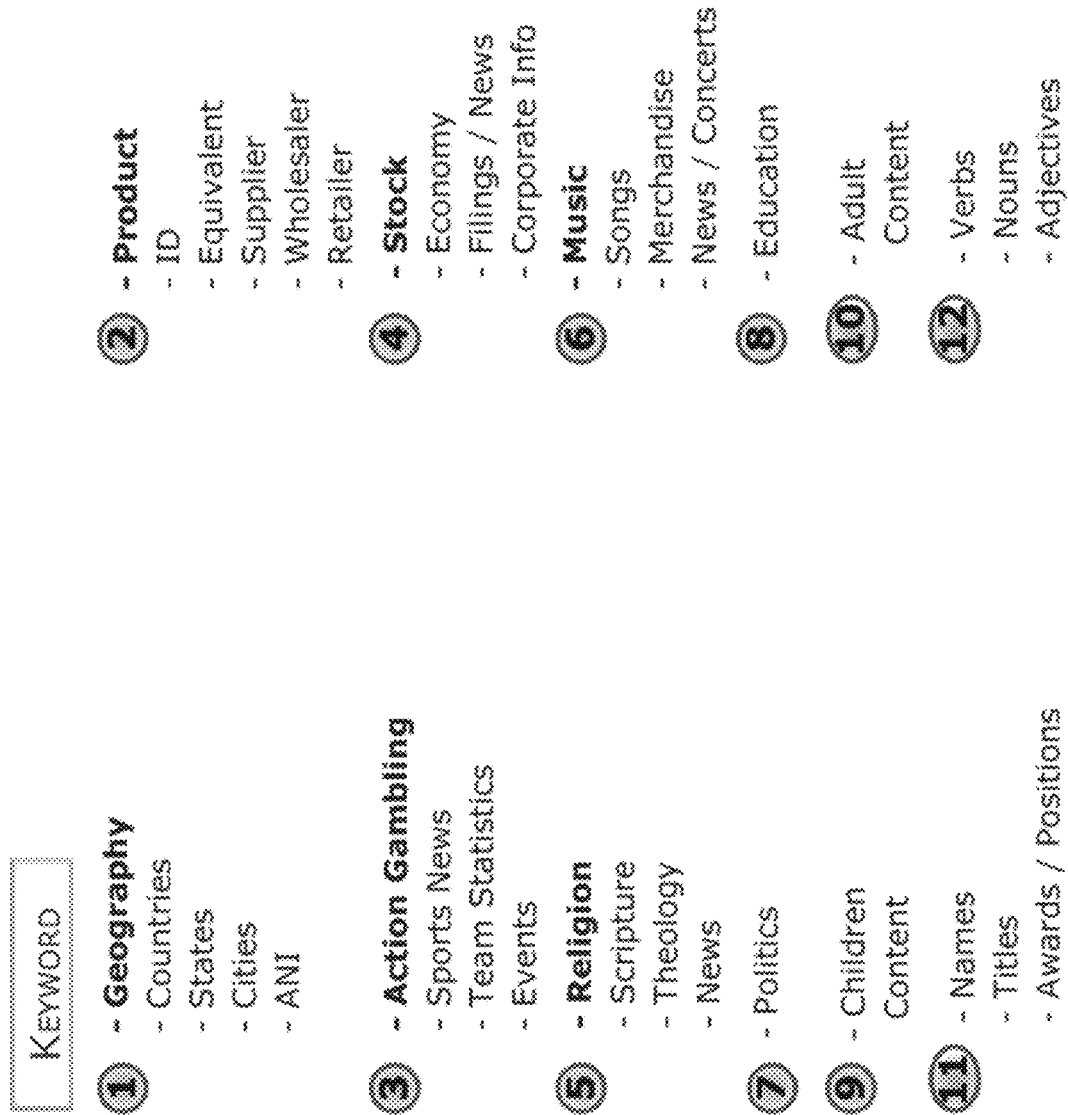

FIG. 23 is a table of Sample DATA collections used by the XCommerce technology to help build Simple, Hybrid and Complex Pyramid Structures.

Figure 24:
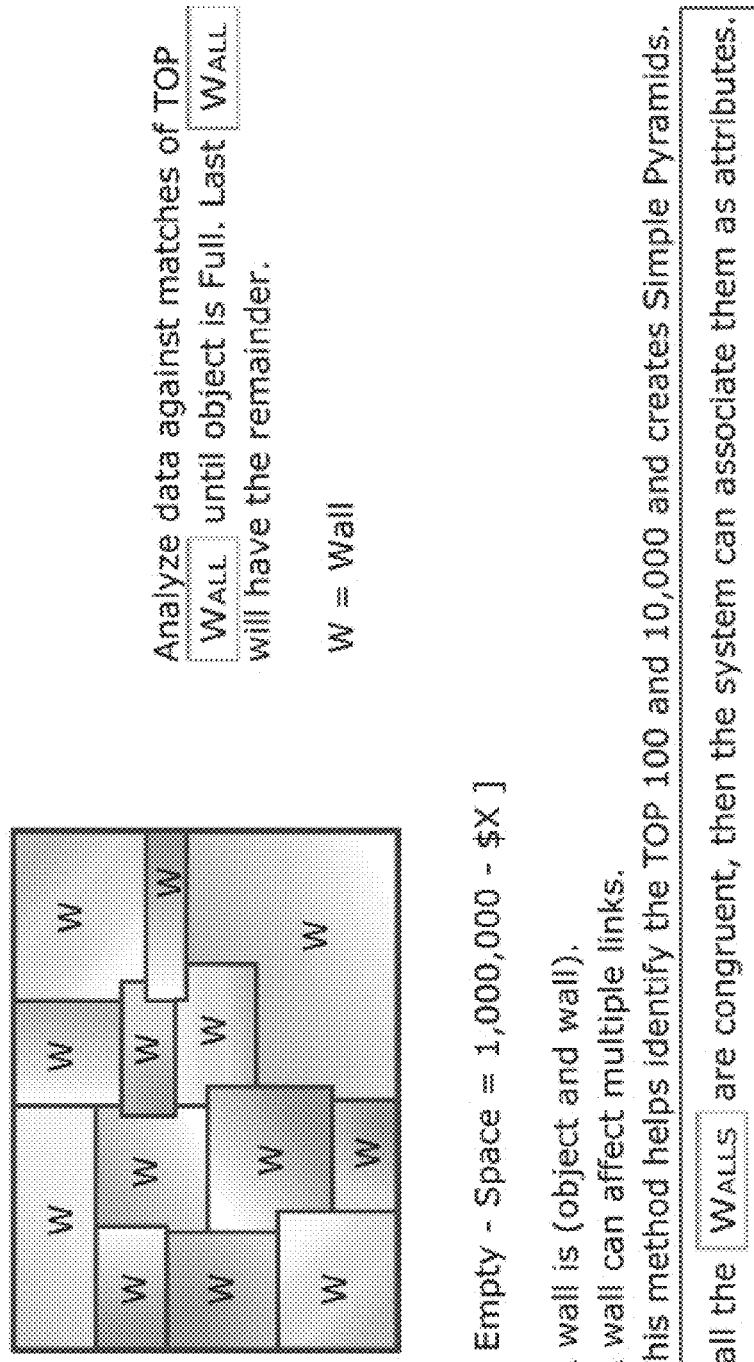

FIG. 24 is a schematic representation of Using Math to Balance an Object. An end user makes a request using KEYWORDS. Each KEYWORD collection consists of a plurality of common denominator verbs, nouns, prepositions, adverbs, adjectives and English semantics. For a KEYWORD Search that has $X matches expressed a number greater than 10,000,000 by the environment, the system has pre parsed the content of each and identified their value based on (A) Join and Block collections KEYWORD filters. Should $X be less than one million, the gamma function will allow that a KEYWORD collection to possess more than one cell instead of just one. The owner of the KEYWORD Intelligent Component uses WALL collections KEYWORD to further subdivide cells. Using math, the system determines the highest value Wall that should possess exactly 100 cells and one or more Walls that possess the next 9900 highest valued cells. The quality of the English semantics is measured.

Figure 25:
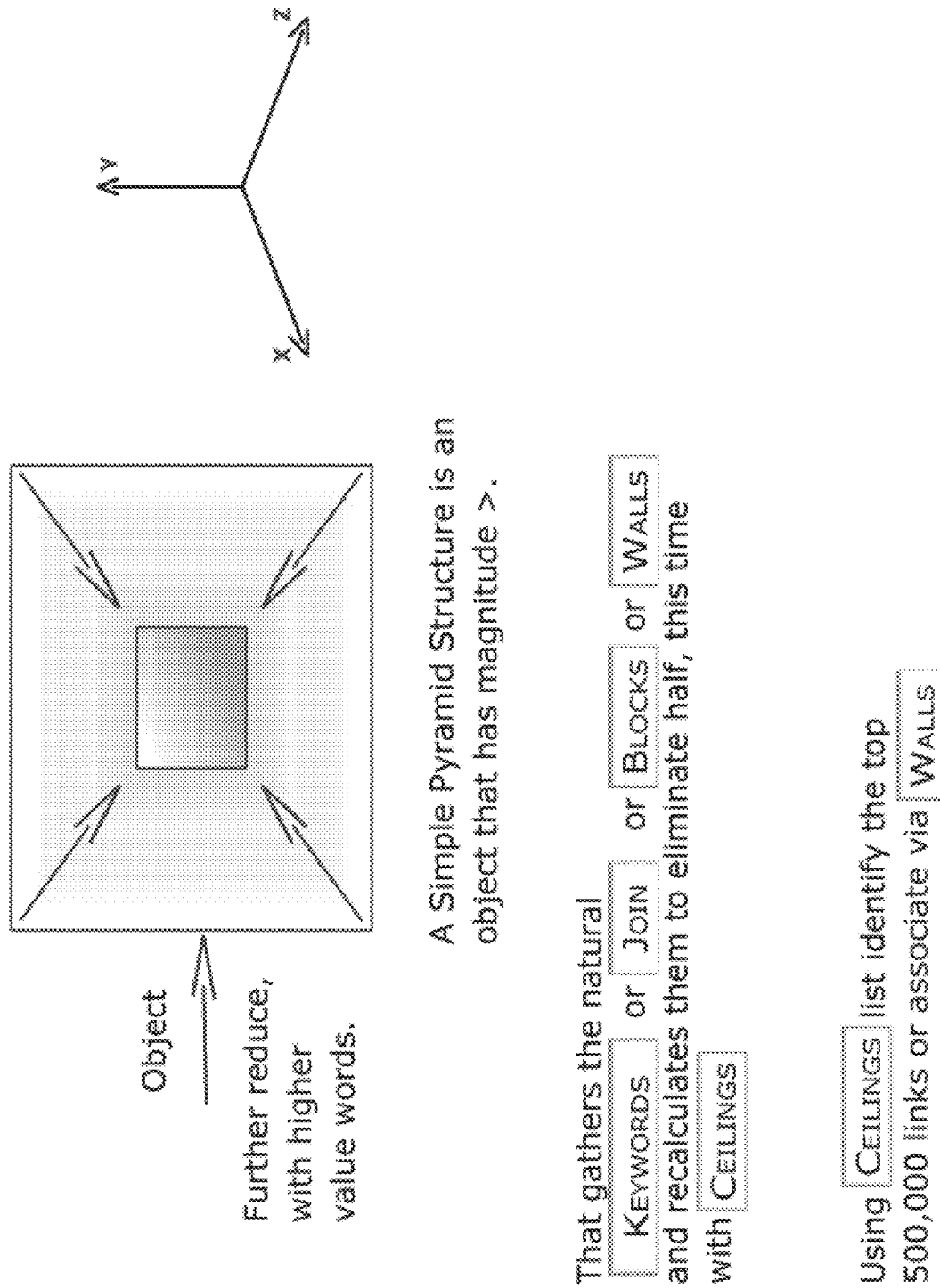

FIG. 25 is a schematic representation of Optimizing Keyword Quality by converting the object into a 3D geospatial structure. (1) The system performed Join and Block collection KEYWORD filtering. (2) The system using Wall collection KEYWORD was able to further subdivide the $X matches expressed in millions of raw requests as per FIG. 24. (3) XCommerce creates 3D compartments by using Ceiling collections KEYWORD filters, meaning that within a wall and each cell there existing some higher order attributes of the English language that help identify the optimal element (A) response of the superset (U). The Ceiling collection of KEYWORD filtering further reduces the number of building blocks to 500,000, where each block consists of 2 cells one on top of the other. The 500,000 cells that are in the bottom are the least satisfying results based on the Browser Engine valorization and the English semantics. Yes, Browser Engine valorization is also used since the site quality, number of hits and other Data Warehousing Business Intelligence statistics help quantify and qualify an optimal element (A).

Figure 26:
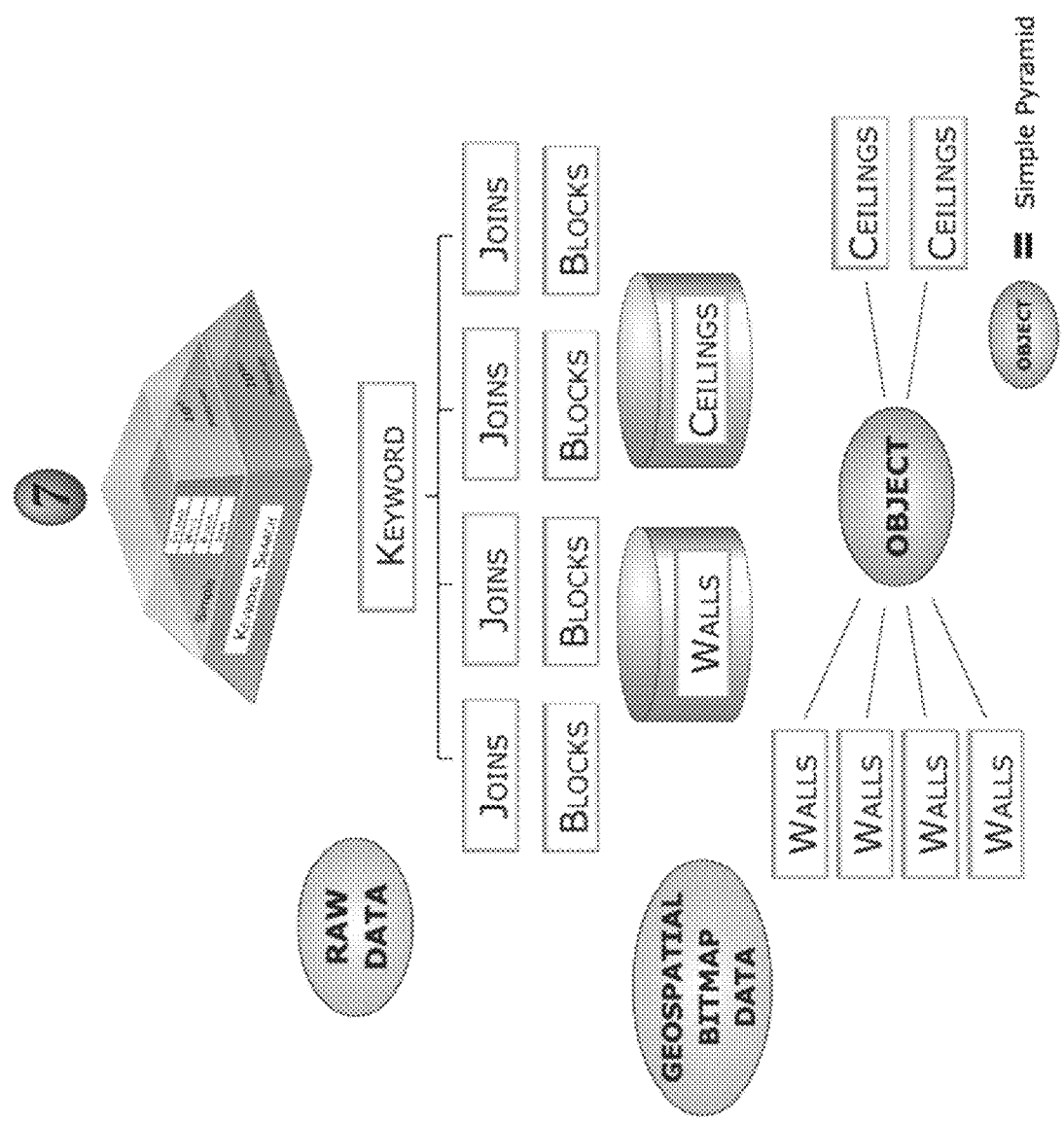

FIG. 26 is a schematic representation of a Simple Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS® XLDB Database Engine. The information is logical distributed, based on Simple Join and Block collection of KEYWORD filters, and further quantified and qualified by Simple Wall and Ceiling collection of KEYWORD. Simple Joins and Blocks help create cells, and Simple Walls and Ceiling create blocks that help construct 3D objects where the highest object is within the Pyramid Structure and the greatest the quality. At the top of the Egyptian pyramid we can find the Pharaoh, in this case, the optimal element (A) consists of the TOP 10,000 responses. Since the TOP 10,000 response is still too broad, further mathematical and semantical analysis is required via the Hybrid Pyramid Structure that further dilutes the object to the TOP 100, and the Complex Pyramid Structure reaches is able to identify the optimal element (A) and the remainder TOP 10.

Note: concerning all the figures. The actual prototype uses the Superset (i), Set (i, j) and Subset (i, j, k) within the environmental domains. Thus, the system identifies optimal configuration of clusters and keyword to filter the size of the environment. Since, the Basic Glyphs are broad and the Advance Glyphs are narrow filtering patterns the order of Superset (i), Set (i, j) and Subset (i, j, k) may differ. In this case, the Basic Glyph controls the hierarchical set. How it branches into a plurality of Sets and Subsets is done by correlating weight. Smaller environment sizes have a greater weight and probability. Z_Price Bitmap stores exact and dynamic matches of Basic and Advanced Glyph search patterns. Exact matches have a higher degree of accuracy with a one to one relationship, than Dynamic matches (many to one).

EXAMPLES

Example #1

XCommerce finds missing gaps of information. End User's Request: "A"+"B"+"C" with the following known clusters:

| | | | |
|---|---|---|---|
| 1. (A + B + I) | 67%, | Value = 4, | Weight = 2.67. |
| 2. (J + B) | 50%, | Value = 3, | Weight = 1.50. |

-continued

| | | | |
|---|---|---|---|
| 3. (K + B + C) | 67%, | Value = 5, | Weight = 3.33. |
| 4. (L + C) | 50%, | Value = 5, | Weight = 2.50. |
| 5. (A + B + C) | 100%, | Value = 5, | Weight = 10.0.* |

In this case, the request has four known clusters 1-5 with "A", "B", & "C" as independent variables and "I", "J", "K", & "L" are Auxiliary Variables or AV. Cholti assigns to each AV a probability. Each Cluster is measured in the scale of 1 to 5. A keyword has a value of 1-3 depending on their raw 'Boolean Algebra' page results. In this case cluster (A+B+C) or "American Civil War" is broad and thus has a value of 1. A cluster possesses the value of Minimum (Sum (Keyword)+1, 5). "A", "C", "I" and "J" has a value of 1, "B" and "K" has a value of 2, and "L" has a value of 3. Weight is calculated by multiplying the probability*value. *If a cluster is an exact match the Weight is multiplied*2. As a SWAG accuracy=Minimum (Maximum (Weight−AV, 1), 10). ^ denotes logical OR, + or & denotes logical AND.

Cholti creates the following hierarchical set:

| | | | |
|---|---|---|---|
| Superset (i) = (A + B + C) | Value = 5, | Weight = 10 & Accuracy = 10. |
| Set (i, 1) = (A + B + I) | Value = 5, | Weight = 6 & Accuracy = 5. |
| Set (i, 2) = (J + B) | Value = 4, | Weight = 4 & Accuracy = 3. |
| Set (i, 3) = (K + B + C) | Value = 5, | Weight = 8 & Accuracy = 7. |
| Set (i, 4) = (L + C) | Value = 5, | Weight = 4 & Accuracy = 3. |

Set (i, 5)=(A+B+C)+J^K^L Value=5, Weight=10 & Accuracy=10.

Example #2 Basic Glyphs

End User's Request: "D"+"A"+"B"+"C"

"D" is the anchor

"A+B+C" is the Superset (i)

"D" is the Set (i, j)

In this case "D+A+B+C" is the request and has four independent variables "A", "B", "C", and "D". "A", "B" and "C" or "American Civil War" have a value of 1, and "D" or "Battlefield" has a value of 2. "D" is the strongest Keyword and is considered the Anchor. When considering the Superset (i) Cholti determines from Example #1 that "A+B+C" is an exact cluster with a value of 5. Consequently, "A+B+C" becomes the Superset (i) and "D" the Set (i, j) used as anchor.

Cholti creates the following hierarchical set:

Superset (i)=(A+B+C) Value=12, Weight=5 & Accuracy=10.

Set (i, j)="D" Value=10, Weight=10 & Accuracy=10.

Subset (i, 1, k)="D" & (B+C)^I^C Value=10, Weight=7 & Accuracy=4.

Subset (i, 2, k)="D" & (A^C^J)^"B" Value=10. Weight=7 & Accuracy=5.

Subset (i, 3, k)="D" & (A^K^B)^"C" Value=10, Weight=7 &Accuracy=6.

Subset (i, 4, k)="D" & (A^B^L)^C Value=10. Weight=7. Accuracy=5.

Subset (i, 5, k)="D" & (A^B^C) Value=10. Weight=10 & Accuracy=10.

*Each Subset (i, j, k) used has a plurality of AV & DV available to further distill and shrink the size of the environment.

Example #3 Advanced Glyphs

End User's Request: "D"+"A"+"B"+"C"+"E"
"D" is the anchor
("A+B+C")+[DV1]+[DV2] is the Superset (i)
"D"+[DV3]+[DV4]+Set (i, j)
"E" Geodata (w, x, y, z)

In this case "D", "A", "B", "C" & "E" is the request and has five independent variables "D", "A", "B", "C" & "E". "A" & "C" have a value of 1, "B" & "D" have a value of 2. "E" or "Gettysburg" is also a Geodata (w, x, y, z) and has a value of 5. "E" is the strongest Keyword but is geospatial and is not the anchor, leaving "D" or "Battlefield" as the Anchor. When considering the Superset (i) Cholti determines from Example #1 that "A+B+C" or "American Civil War" is an exact cluster with a value of 5. Consequently, "A+B+C" becomes the Superset (i) and "D" or "Battlefield" the Set (i, j) used as anchor.

"E" is the Geodata (w, x, y, z), where w=US, x=Pennsylvania, y=a plurality of valid Zip Codes, z=Gettysburg is the center of a circle with a radius of n miles that contains all the y collection of Zip Codes. "US" or w is associated with existing toll free Area Codes of 800 and 888 et al that are national in scope. "Pennsylvania" or x associated with the LATA where the Gettysburg is located.

In example #2, Cholti measured the value of [L] left side of the brain information. In this case there is also [R] right side of the brain information. When calculating checkmate combination the system determines if a 10 exists on both sides for an optimal result, otherwise if [L] side value+[R] right side value are greater than 10 it will display the improved result.

In this case there is no optimal result with a check mate value of 20. When determining Subsets "E" & "D" are matched/merged to "X".

Superset (i)=(A+B+C*) Value=6, Weight=6, Accuracy=10.

Set (i, j)=(A+B+C+D*) Value=8, Weight=8, Accuracy=10.

Subset (i, 1, k)=(D*+A+B)^(I^C) Value=12, Weight=10, Accuracy=9.

Subset (i, 2, k)=(D*+(A^C^J)+B) Value=12, Weight=8, Accuracy=6.

Subset (i, 3, k)=(D*+(A^K)^(B^C) Value=12, Weight=10, Accuracy=9.

Subset (i, 4, k)=(D* & (A^B^L)^C Value=12. Weight=8. Accuracy=6.

Subset (i, 5, k)=(D* & (A^B^C) Value=12, Weight=10, Accuracy=10.

Note: The probability was modified to square root (p(x)). The Weight was rounded to its highest integer value, and it can not exceed 10. Thus 0.5 was modified to 0.7 and 0.67 to 0.8. Each Subset (i, j, k) used the Geodata (w, x, y, z) to further distill and shrink the size of the environment.

Example #4 Super Glyphs

End user's requests are identified, validated and verified into keywords. A keyword can be a 'Zero Cluster' and thus become a (yellow) Super Glyph. Geodata (w, x, y, z) hierarchy filters can become a (green) Super Glyphs. Exact language based clusters that are used as filters becomes (blue) a Super Glyph, corporate information becomes (red) a Super Glyph and personal information becomes a (purple) Super Glyph.

An end user is random surfing the Internet and after several requests the system has determined that a plurality of valid Advanced Glyphs exists.
1. "War Gettysburg*" ([E1]+[G1]).
2. "Civil War Gettysburg*" ([E2]+[E1]+[G1]).
3. "American Civil War Pennsylvania*" ([G2]+[E2]+[E1]+[G3]).
4. "Robert Lee" ([E3]+[E4]).
5. "General" ([E5]).
6. "General Robert Lee" ([E5]+[E3]+[E4]).
7. "Historical Battle Map USA*" ([E6]+[E7]+[E8]+[G4]).
8. "American Civil War Battle Gettysburg*" ([G2]+[E2]+[E1]+[E7]+[G1]).

From this information "USA"=[G4], "Pennsylvania"=[G3], "American"=[G2] and "Gettysburg"=[G1] are Geodata (w, x, y, z) and are represent with (green) Super Glyphs. The system has identified valid (blue) English Keywords and Clusters "War"=[E1], "Civil War"=([E2]+[E1]), "American Civil War"=([G2]+[E2]+[E1]), "General"=[E5], "Historical Map"=([E6]+[E8]), "Battle Map"=([E7]+[E8]) and "Historical Battle"=([E6]+[E7]). The system identifies a plurality of purple or personal Super Glyphs such as "General Robert Lee"=[P1], "Abraham Lincoln"=[P2], "General Meade"=[P3], "General Hancock"=[P4], "General Stuart"=[P5], "General Longstreet"=[P6], "General Ulysses Grant"=[P7] and "Robert Lee"=[P8].

Geodata (green) and English language clusters (blue) consists of "Gettysburg" or [G1] is assumed to appear in all, "Pennsylvania" or [G3] in all except request 7, and "USA" or [G4] in all except requests 3 and 7. "American Civil War" or ([G2]+[E2]+[E1]) has a weight of 10, "Civil War" or ([E2]+[E1]) has a weight of 5, and "War" or [E1] has a weight of 1.

Personal (purple) Super Glyph consists of "General Robert Lee" or [P1] has a weight of 10, "Robert Lee" or [P8] has a weight of 5, and "General" or [E5] has a weight of 1. "Historical Battle Map" or ([E6]+[E7]+[E8]) has a weight of 10, "Historical Battle" or ([E6]+[E7]) has a weight of 3, and "Battle Map" or ([E7]+[E8]) has a weight of 3.

"War" or [E1] is the most frequent keyword appearing in request 1, 2, 3, and 8, and "Battle" or [E7] is the hottest keyword appearing in 7 and 8. "Robert Lee" or [P8] are the coldest keyword since the last request they appear is in 6 and for the first time in 4.

XCommerce using the Hot & Algorithm parameters determines optimal Super Glyph combinations that will yield the reasonable results. XCommerce identifies "Gettysburg" or [G1] as the primary Geodata (w, x, y, z) filter. The system selects "American Civil War" or ([G2]+[E1]+[E2]) as the anchor primary cluster or Superset (i), and "General Robert Lee" or [P1] as the secondary cluster or Set (i, j) and "Historical Battle" as the tertiary cluster or Subset (i, j, k).

The common related Superset (i) environment size is 8 million W_Rank Basis, distributed in the following manner Superset (1) or "American Civil War" has ($10/16$)*8 million or 5 million W_Rank Basis, Superset (2) or "Civil War" has ($5/16$)*8 million or 2.5 million W_Rank Basis, and "War" the remainder 500,000 W_Rank Basis.

The common related Set (i, j) environment size is 800,000 or 800K W_Rank basis, distributed in the following manner Set (i, 1) "General Robert Lee" has ($10/16$)*800K or 500K W_Rank basis, Set (i, 2) or "Robert Lee" has ($5/16$)*800K or 2-5K-W-Rnk250K W_Rank basis, and Set (i, 3) or "General" the remainder 50K W_Rank Basis.

The common related Subset (i, j, k) environment size is 80,000 or 80K W_Rank Basis, distributed in the following manner Subset (i, j, 1) "Historical Battle Maps" has (10/16) *80K or 50K W_Rank Basis, Subset (i, j, 2) or "Historical Battle" and Subset (i, j, 3) "Battle Map" both have (3/16) *80K or 15K W_Rank Basis.

The following personal Super Glyphs have the following weights:

[P1] or "General Robert Lee"=100, [P2] or "Abraham Lincoln"=70, [P3] or "General Meade"=70, [P4] or "General Hancock"=80, [P5] or "General Stuart=70, [P6] or "General Longstreet"=90, [P7] or "Ulysses Grant"=80, and [P8] or "Robert Lee"=95. The strongest keyword is "Longstreet" and "General" the lowest.

The following geospatial Super Glyphs have the following weights:

[G1] or "USA"=100, [G2] or "Pennsylvania"=90, [G1+G2] or "USA+Pennsylvania"=70, [G3] or "Gettysburg"=40, [G1+G3] or "USA+Gettysburg=35, and [G1+G2+G3] or "USA+Pennsylvania+Gettysburg"=20.

The system measures by filtering Superset (1) "American Civil War" then Set (i, 2) or Set (i, 3) "Robert Lee" I General then Subset (i, 2, 2) or Subset(i, 3, 3) "Battle Map" to derive the TOP 1000 W_Rank basis. Then the top 1000 W_Rank Basis are filtered against Geodata (w, x, y, z) filter to determine the TOP 100. Finally, the system derives the TOP 10 W_Rank Basis by comparing Super Site and personal Super Glyphs. Cholti 'cherry picks' the Top 1 or optimal based upon the highest Super Page weighted page rank. In this example the method was explained step by step, the computer performs all these calculation in one shot up to the TOP 100, then it executes the resource intensive algorithm of 'triangulation deductive reasoning' to solve for the optimal solution.

Example #5: Related Requests

1. End User's [A], [B], [C], [D], [E], [F], & [G]. [A]=American, [B]=Civil, [C]=War, [D]=Robert, [E]=Lee, [F] Battlefield, [G]=Gettysburg.

a) (A+B+C) is the Superset (i), (D+E) is the Set (i, j), [F] is the Subset (i, j, k), [G] Gettysburg is a Zero Cluster and the center to Geodata(w, x, y, z), [H]=USA, [I]=Pennsylvania, and [J]=Zip Code valid areas around Gettysburg, Pa. [A-F] consist of a left side check mate combination and [G] derives a right side check mate combination.

b) [K]=Harrisburg (717), [L]=Altoona (814) or Williamsport (570), USA [M]=(800) or (888) toll free Area Code in ANI and are active. [K], [L] & [M] are Super Glyph filters. (717)=95, USA (800) or (888)=80, (570) or (814)=70. Not mentioned by being probable Allentown or (484), (610), (835)=60, Pittsburgh(412), (724), (878)=50, and Philadelphia (215), (267)=50. As you can see the telecommunication side of the equation can quickly become complicated, for simplicity only those that have a probability greater than 70 are used. Probabilities are assigned by distance to the center of the circle of calculation.

2. End User's request is [D], [E], [V], [W]. [D]=Robert, [E]=Lee, [V]=Union, [W] Confederates.

3. End User's request is [G], [X], [Y]. [G] is Gettysburg, [X] Historical, [Y] Maps.

Requests 1 to 3 are valid and each has a separate Superset (i), Set (i, j) and Subset (i, j, k). Cholti determines the following (i) request 1 is directly related to request 2 via [D]+[E] "Robert Lee", (ii) request 1 is directly related to request 2 via [G] Gettysburg, and (iii) request 2 is indirectly related 3 via transitive (1→2).

The anchor Superset (1) is "Civil War", Superset (2) is "American Civil War", Superset (3) is "Robert Lee", Superset (4) is "Historical Maps". The anchor Superset (1) contains the other Superset (i) where i=2 to 4. The system assigns [F] Battlefield, [V] Union, & [W] Confederates as Set (i, j) filters. The Set (i, j) and Subsets (i, j, k) are created by the AV list of all the possible clusters of all the valid and related keyword of request 1-3. Cholti creates a Superset (i) environment of 1,000,000 W_Rank basis based on Civil War, where the "Historical Map" is the hottest filter and "American Civil War" is the coldest.

In this case [G] Gettysburg is the only hot keyword, and the message the end user gives to Cholti is to filter with the [R] side of the brain or geospatial data.

Example #6: Mulligan Requests

1. End User's Request [A], [B], [C]. [A]=Blue, [B]=Gray, [C]=Gettysburg.

2. End User's Request [X1], [Y1], [Z1]. [X1]=US, [Y1]=History, [Z1]=Atlanta.

3. End User's Request [X2], [Y2], [Z2]. [X2]=Novel= [Y2] Newt, [Z2]=Gingrich

4. End User's [D], [E], [F], [G], [H], [I], & [C]. [D]=American, [E]=Civil, [F]=War, [G]=Robert, [H]=Lee, [I] Battlefield, [C]=Gettysburg.

5. (D+E+F) is Superset (i), (G+H) is Set (i, j), [I] is Subset (i, j, k), [C] Gettysburg is a Zero Cluster and the center to Geodata (w, x, y, z), [J]=USA, [K]=Pennsylvania, [L]=Zip Code valid areas with Gettysburg, Pa. [D-I] consist of a [L] side check mate combination. [C1 Z1] derives a [R] side check mate combination.

6. [M]=(717), [N]=[814] or [570] & [0]=[800] or [888] toll free Area Code in ANI and are active. Only those area codes or NPA that are reasonable or have a probability greater than seventy percent are included in this calculation.

7. [P]=Atlanta (404) or (470) & [Q]=Greater Atlanta (678) or (770) are the Area Code in ANI ranges that become inactive via mulligan. Athens (706), Rome (762), Macon (478), Valdosta (229), and Savannah (912) are probabilistic.

8. [M], [N], [0], [P], & [Q] are Super Glyph filters. [X1] is validated as Geodata ([US], X, Y, Z). [Z1] is validated as Geodata ([US], [GA], [Atlanta], Z), (Y2+Z2) is a personal purple Super Glyph (for Alternate History Gettysburg Trilogy.) and [Y1] [X2] are yellow Super Glyphs.

The system is able to match/merge requests 1 to 3 as a single request that is linked to request 4. The keywords used in the match/merge process are assigned as (yellow) unused Super Glyphs. Thus the before request 1 to 3 looks like this [A], [B], [C], [X1], [Y1], [Z1], [X2], [Y2], & [Z2]. The 'After' looks like this [A], [B], [C] (yellow) Super Glyphs. [X1], [Y1], [Z1], [X2], [Y2], [Z2], & Geodata ([US], [GA], [Atlanta], Z) are valid Hot & Cold Algorithm variables values used for 'Triangulation Deductive Reasoning' or 'Deductive Reasoning' as used throughout this document when solving the optimal solution.

Finally the system creates a resultant request based on 1 to 4 that are linked to a single request. [D], [E], [F] is converted to [W1], [G], [H] to [W2], and [Y2], [Z2] to [W3]. The final resultant is [W1]+[W2]+([I]|[A]|[B])+(Geodata ([US], [GA], [Atlanta], Z)+Geodata ([US], [PA], [Gettysburg], Z)|([X1]|[Y1]|[Z1]|[X2]|[W3])).

Example #7 'Triangulation Deductive Reasoning' or Ex Optimal Requests

In Example #6, once the system creates the optimal Dx hierarchical set, the system is able to value and weight each Super Page and Super Site. As noted before Super Pages and Super Sites are dynamic objects that store a plurality of weights and probabilities for all the valid requests belonging to a session.

The system determines the top 100 pages from the TOP 1,000 W_Rank page results. Then it compares by paragraph, which English language or [L] side of the brain matches have the highest values, and compares to the Super Page known valid Geodata (w, x, y, z). At this time the mulligan keywords in particular 'Zero Clusters' are finally used in a 'Boolean Algebra' approach to maximize a paragraph weight using the Ex value. The system determines the weight of page to equal the maximum of (Dx Super Page weight, Ex or Paragraph value*2).

The system 'cherry picks' the highest value from top to bottom until the list of 100 pages is in ascending order. The highest value is the optimal result and the next nine results are also sent to the end user if the browser engine default result size is 10.

Example #8 Cholti Method Overview

In Example #1 to #6 most of the queries begin with keyword and numeric combinations that are converted into a regular expression so that the search engine using 'Boolean Algebra' can find the best page ranks. Cholti calculates or supplies the preprocessed Ax and Bx values to shrink the size of the environment. The system then uses the Hot & Cold Algorithm parameters and Q(x, y, z) values as filtering means to further shrink each member of the hierarchical set to have the smallest possible size.

The unrelated keywords and mulligan keywords are now used to parse and valorize paragraph by paragraph the content of each page. Then the system selects the highest valued as the optimal result. Once the optimal satisfying environment is known with the best results a mathematical equation is created that describes the hierarchical set characteristics and is then converted into Cholti style unloaded and loaded Glyphs with Q(x, y, z) and optionally with Q(w, x, y, z) values that replaces the end user's regular expression. This regular expression has the essence of the matter of Ax, Bx, Cx, and Dx samples, furthermore it has the Ex or paragraph values to solve for the end user's request. When a request has a common denominator Z_Price bitmap and a plurality of unused independent variables the preprocessed optimal environmental hierarchical set is known with the appropriate Q(w, x, y, z) values leaving the Ex calculation to be determined on the fly.

The Cholti Glyph based mathematical equation when available will significantly reduce the processing power required to respond an end user request. The equation takes into account all the requests within a session to create a final hierarchical set.

Instead of assuming erroneously that a 'Boolean Algebra' search always reaches with certitude the final destination. Cholti dynamically adjusts to the end user usage patterns and mimics the end user ongoing trial and error method to reach the final destination, by improving over time as better feedback is obtained.

In a session certitude is achieved each time a significant difference event is detected, unfortunately 'Boolean Algebra' search engines consider all events important. Cholti knows betters and uses set theory rules of association and transitivity to link related and unrelated requests, and measures probabilistically if the change between two consecutives request matters.

When the end user make a predefined 'Z_Price Bitmap' request that the environment has detected millions of similar request in a specific time frame, the results are always certain and up to date, since the AI Spider continuously in real time updates and improves the content of the Cholti mathematical equation optimal environment. Information that is not in real time is confounded. The greater the time the more unreliable the information becomes. In the case of Cholti real time means upon AI spider detection of significant information as it scans methodically the content of the Internet. Upon detect a new page in the environment XCommerce has the information ranked absent of having to perform the resource intensive and time consuming Master index recalculation for all page ranks.

The following Paragraph is presented and incorporated by reference in its entirety as originally presented in U.S. patent application Ser. No. 11/584,941 filed on Oct. 23, 2006 (issued as U.S. Pat. No. 7,809,659 on Oct. 5, 2010).

Comparative analysis of Search Engines versus the W_RANK. The Basic Keyword search {WORLD, CUP, FIFA} versus the Simple Pyramid Structure. The user begins the process of placing enough words until the Browser Engine responds with a satisfying response.

{WORLD} generates 2.5 billion responses. {WORLD, CUP} generates 35 million responses. {WORLD, CUP, FIFA} generates 16 million responses. The Simple Pyramid Structure for {WORLD, CUP, FIFA} is a process that logically associates other valuable common denominator KEYWORDS to derive to the optimal element.

1) {WORLD, CUP, FIFA} consists of 2.5 billion links that are placed into 1,000,000 Building blocks cells. 2) The System uses Simple Joins, Blocks, Walls and Ceilings English Semantics to further valorize each of the links and to associate them to belong to one cell. Thus the 1,000,000 cells have the 2.5 billion responses.

a) Forbidden, Spam, Viral and Porn sites with cookie traps have a value of 0.000000000001
b) Duplicates have a value of 0.0000000001
c) Links that fail the Simple Join test have a value of 0.00000001
d) Links that fail the Simple Block test have a value of 0.000001
e) Links that fail the Simple Wall test have a value of 0.0001
f) Links that fail the Simple Ceiling test have a value of 0.01
g) Links that pass the Simple Join to Ceiling test have a value of 1
h) Links that pass the KEYWORD {WORLD, CUP, FIFA} 1,000,000

In this example collectively the improvements mentioned over existing 'Boolean Algebra' means is what permits Cholti to achieve certitude.

SUMMARY OF THE INVENTION

We've overcome these "issues" or greatly improved the search optimally by doing the following:

Generally stated end user's requests are converted into the Mayan style Glyphs that have left side and right side of the brain characteristics. The system understands that each request on its own can be optimally satisfying, and also knows that some require trial and error method. To solve this dilemma the optimizer creates Super Glyph that has weighted value for a plurality of instances within a session.

At a minimum the system needs to be a large mainframe, a parallel distributed supercomputer or preferably a MPS™ supercomputer. The system has a large data warehouse means that store a 'CORE List' that consists of statistics for each keyword or cluster. Consequently, at its core the technology must perform the following steps:

a) Identify each keyword interactively.

b) Validate each keyword to belong to a group.

c) Verify if a keyword will be an active participant in the process of reducing the size of the environment.

d) Estimate the Ax or 'Before' sample environment size from the keywords typed by the end user.

e) Determine if the end user's request is significant.

f) Create Basic Glyphs that best reflects the essence of the Ax or 'Before' request that will permit the creation of a hierarchical set consisting of a plurality of valid Superset (i), Set (i, j) and Subset (i, j, k).

g) Reorganize the end user's request to create Advanced Glyphs that further distills and shrinks the size of the environment using the Bx or 'After' request.

h) Recognize Advanced Glyph so that the server can determine if it already exist in the 'CORE List'. If the Advanced Glyph exists in the 'CORE List' the optimal response is readily available and preprocessed no further calculations are required. Otherwise, the system must continue with Cx or 'Improved' and Dx or 'Optimal' samples.

i) Request the server to perform the 'Improved' sample by hierarchical distributing the search amongst subordinate based on ownership of the primary, secondary and tertiary keyword or cluster. The Basic and Advanced Glyphs are used to assign size parameter to each valid set of the hierarchical set.

j) Adjust dynamically the value of each keyword and cluster.

k) Exclude identified Zero Cluster keywords.

l) Emphasize through rules of association and transitivity a plurality of request that are considered to have common denominator elements and are then correlated into a partial environment. The partial environment consists of a plurality of request. The partial environment retains the characteristic of each individual request.

m) Deemphasize unrelated keywords to the last significant end user's request. This process is also known as Mulligan and is uses set theory to determine the relationship between a keyword and the last significant request.

n) Maximize keyword values by using the Hot Algorithm that measures the usage pattern and significance of a keyword in a session.

o) Minimize keyword values by using the Cold Algorithm that weights keyword irrelevancy. 'Zero Clusters' and unrelated keywords have a reasonable probability of hiding the optimal result.

p) Correlate the plurality of partial environments into the Cx or 'Improved Samples. This process draconically reduces the environment size using Hot & Cold Algorithm parameters and stores the essence of the matter into Super Sites.

q) Assign a corporate signature to each Super Site.

r) Pick the small Cx Sample top results of each hierarchical set to generate a collection of valid Super Pages.

s) Distill the small Cx Sample using geospatial dimensions that have exact or estimated latitude and longitude components such as Country, Region, LATA, Zip Code, IP Address and ANI.

t) Commercialize keywords by available Corporate Media resources and priorities.

u) Decipher with reasoning the 'Dx' or optimal sample.

v) Translate the end user's language based request into a Cholti language Super Glyph equation.

w) Respond to the client software with the optimal response. The optimal results may be identified as already existing in the preprocessed 'CORE List' in step h) "recognize and all calculations are preprocessed. Alternatively when derived by using steps i) "request" to v) "translate".

x) Display to the end user the optimal request.

y) Recalculate each time the "optimal button" is clicked in the web browser and significant difference event is estimated compared to the latest Super Glyph equation or partial environment.

z) Consolidate a plurality of partial environment into a resultant environment that is contained with the valid environmental size of the hierarchical set.

These and other aspects, features, and advantages of the present invention will become more readily apparent from the attached drawings and the detailed description of the preferred embodiments, which follow.

The Internet search engine methods described herein mimic the function of the human brain by creating a language-based or left brain equation and a geospatial or right brain equation. The terms language-based and left brain are used interchangeably. The terms geospatial and right brain are used interchangeably.

While the preferred embodiments of the invention have been described above, it will be recognized and understood that various modifications can be made in the invention and the appended claims are intended to cover all such modifications which may fall within the spirit and scope of the invention.

What is claimed is:

1. A topic-based search query system, comprising a computer hive made up of several inter-linked computers into a neural network which continuously scans and gathers information from, understands, and interacts with, an environment having specialized functions, the computers operating in unison to build a supercomputer that has shared disk space and memory, in digital communication to a plurality of client/server devices comprising at least one linked database server devices using a 'Boolean Algebra' English language semantics tests to map the searchable Internet web pages and sites using a query; at least one subject matter data warehouse server device performing data mining; and at least one subscriber device performing input/output;

assigning a server side memory that stores computer executable components; and a server side microprocessor that executes the following computer executable components stored in the memory comprising:

receiving a query from a client device;

determining "a list of associated keyword terms and clusters, hereinafter referred to as terms" in at least one subject matter data warehouse, wherein a term is mapped to the query using 'Boolean Algebra' English language semantics tests of the terms given the query;

defining an improved environment upon removing from calculation irrelevant searchable Internet web pages using 'Boolean Algebra' English language semantics tests of the terms given the query;

identifying a set of results from the improved environment for the query in said linked database server device using 'Boolean Algebra' English language semantics tests of the results given the terms; and data mining the relative occurrence of each of term within the improved environment and assigning a quantitative probability value to each term, establishing a minimum probability value associated with vague terms and establishing a maximum probability value associated with unique terms, wherein vague terms are defined as terms having the highest quantity of occurrences of the term in the improved environment and unique terms are defined as terms having the lowest quantity of occurrences of the term in the improved environment;
subdividing and arranging the improved environment into a managerial hierarchy of partitions;
an environmental bitmap is defined as a summary analysis of the best fit web pages for a given partition of the improved environment;
computing the environment bitmap of the searchable Internet web pages of the terms given the query based upon an analysis of results that are associated with the term and the query; and
presenting the results to the at least one subscriber device in an order from highest to lowest probability.

2. The topic-based search query system of claim 1, subdividing and arranging the improved environment into a managerial hierarchy of partitions, further comprising:
defining a searchable environment as all the searchable web pages given the query;
determining "a list of associated keyword terms and clusters, hereinafter referred to as terms" in at least one subject matter data warehouse, wherein a term is mapped to the query of the terms given the query;
defining an improved environment upon removing from calculation irrelevant searchable Internet web pages using 'Boolean Algebra' English language semantics tests of the terms given the query;
searching at least one subject matter data warehouse and finding an optimal version of the query as processing the impact managerial hierarchical related group of independent variables to create an equation that substantially shrinks the size of the improved environment by parsing the search request into primary, secondary and tertiary tiers and managerial hierarchical equations;
defining a Superset as the primary managerial hierarchical equation used to shrink the improved environment;
defining a Set as the secondary managerial hierarchical equation used to shrink the improved environment;
defining a Subset as the tertiary managerial hierarchical equation used to shrink the improved environment;
subdividing the improved environment into a Superset using independent variable (I) as the primary term of the terms given the query, wherein eliminating from calculation any web page not belonging probabilistically to independent variable (I) as irrelevancy to the query; and
computing the Superset returning an estimated $10^6$ results.

3. The topic-based search query system of claim 2, subdividing and arranging the improved environment into a managerial hierarchy of partitions, further comprising:
subdividing the Superset into a least one Set using independent variable (J) as the secondary term of the terms given the query; wherein eliminating from calculation, using at least one subject matter data warehouse, any web page not belonging probabilistically to independent variable (J) as irrelevancy to the query; and
computing the Set returning an estimated $10^4$ results.

4. The topic-based search query system of claim 2, subdividing and arranging the improved environment into a managerial hierarchy of partitions, further comprising:
subdividing the Set into a least one Subset using independent variable (K) as the tertiary term of the terms given the query; wherein eliminating from calculation, using at least one subject matter data warehouse, any web page not belonging probabilistically to independent variable (K) as irrelevancy to the query; and
computing the Subset returning an estimated $10^o$ results.

5. The topic-based search query system of claim 2, subdividing and arranging the improved environment into a managerial hierarchy of partitions, further comprising:
defining an element as the top (n) results:
subdividing the Subset into a least one Element defined as output;
determining the content value as a probability of each result of one of the Superset, Set, or Subset after reading, inspecting and matching on behalf of the end user the content of each result; wherein probabilistically attenuating from calculation results with an unlikely probability content value; and
computing the Element returning the top (n) results.

6. The topic-based search query system of claim 5, further comprising identifying the top (n) results based on the analysis of search click data.

7. The topic-based search query system of claim 6, further comprising dynamically determining the optimal result based on the data mining probability of the at least one term.

8. A method performed on a topic-based search query system comprising a computer hive made up of several inter-linked computers into a neural network which continuously scans and gathers information from, understands, and interacts with, an environment having specialized functions, the computers operating in unison to build a supercomputer that has shared disk space and memory, in digital communication to a plurality of client/server devices comprising at least one linked database server devices using a 'Boolean Algebra' English language semantics tests to map the searchable Internet web pages and sites using a query, at least one subject matter data warehouse server device performing data mining, and at least one subscriber device performing input/output, assigning a server-side memory that stores computer executable components, and executing, by a server-side microprocessor, computer executable components stored in the memory, the method comprising:
receiving, by an input component, a query;
defining an improved environment upon removing from calculation irrelevant searchable Internet web pages using 'Boolean Algebra' English language semantics tests;
mapping the improved environment, by a mapping component, "a list of associated keyword terms and clusters, hereinafter referred to as terms" in at least one subject matter data warehouse;
data mining the relative occurrence of each of term within the improved environment and assigning a quantitative probability value to each term, establishing a minimum probability value associated with vague terms and establishing a maximum probability value associated with unique terms, wherein vague terms are defined as terms having the highest quantity of occurrences of the term in the improved environment and unique terms are defined as terms having the lowest quantity of occurrences of the term in the improved environment;
identifying the results using 'Boolean Algebra' English language semantics tests of the terms given the query based upon an analysis of results that are associated with the term and the query; and
wherein, an environmental bitmap is defined as a summary analysis of the best fit web pages for a given partition of the improved environment, subdividing and arranging the improved environment into a managerial hierarchy of partitions;
computing a environment bitmap returning results of the terms given the query based upon an analysis of results that are associated with the term and the query and presenting the results to the at least one subscriber device in an order from highest to lowest probability.

9. The method of claim 8, subdividing and arranging the improved environment into a managerial hierarchy of partitions, further comprising:
  searching at least one subject matter data warehouse and finding an optimal version of the query as processing the impact managerial hierarchical related group of independent variables to create an equation that substantially shrinks the size of the improved environment by parsing the search request into primary, secondary and tertiary tiers and managerial hierarchical equations;
  defining a Superset as the primary managerial hierarchical equation used to shrink the improved environment;
  defining a Set as the secondary managerial hierarchical equation used to shrink the improved environment;
  defining at least one Subset as the tertiary managerial hierarchical equation used to shrink the improved environment;
  subdividing the improved environment into the Superset using independent variable (I) as the primary term of the terms given the query, wherein eliminating from calculation any web page not belonging probabilistically to independent variable (I) as irrelevancy to the query; and
  computing the Superset returning an estimated $10^6$ results.

10. The method of claim 9, subdividing and arranging the improved environment into a managerial hierarchy of partitions, further comprising:
  subdividing each Superset into a least one Set using independent variable (J) as the secondary term of the terms given the query; wherein eliminating from calculation, using at least one subject matter data warehouse, any web page not belonging probabilistically to independent variable (J) as irrelevancy to the query; and
  computing the Set returning an estimated $10^4$ results.

11. The method of claim 10, subdividing and arranging the improved environment into a managerial hierarchy of partitions further comprising:
  defining an element as the top (n) results:
  subdividing the at least one Subset into at least one Element defined as output;
  determining the content value as a probability of each result of the Subset after reading, inspecting and matching on behalf of the end user the content of each result; wherein probabilistically attenuating from calculation results with an unlikely probability content value; and
  computing the Element returning the top (n) results.

12. The method of claim 9, subdividing and arranging the improved environment into a managerial hierarchy of partitions further comprising subdividing the Set into the at least one Subset using independent variable (K) as the tertiary term of the terms given the query; wherein eliminating from calculation, using at least one subject matter data warehouse, any web page not belonging probabilistically to independent variable (K) as irrelevancy to the query; and
  computing the Subset returning an estimated $10^2$ results.

13. The method of claim 12, further comprising identifying a set of element environment bitmap returning an estimated $10^1$ results the analysis of search click data;
  identifying the top (n) results based on the analysis of search click data; and
  dynamically determining the optimal result based on the data mining probability of the at least one term.

14. A method performed on a topic-based search query system comprising a computer hive made up of several inter-linked computers into a neural network which continuously scans and gathers information from, understands, and interacts with, an environment having specialized functions, the computers operating in unison to build a supercomputer that has shared disk space and memory, in digital communication to a plurality of client/server devices comprising at least one linked database server devices using 'Boolean Algebra' English language semantics tests to map the searchable Internet web pages and sites using a query, at least one subject matter data warehouse server device performing data mining, and at least one subscriber device performing input/output assigning a server-side memory that stores computer executable components and executing, by a server-side microprocessor, computer executable components stored in the memory, the method comprising:
  receiving, by an input component, a query;
  defining an improved environment upon removing from calculation irrelevant searchable Internet web pages using 'Boolean Algebra' English language semantics tests;
  mapping, the improved environment, by a mapping component, "a list of associated keyword terms and clusters, hereinafter referred to as terms" in at least one subject matter data warehouse, and subdividing and arranging the improved environment into a managerial hierarchy of partitions of the terms given the query;
  an environmental bitmap is defined as a summary analysis of the best fit web pages for a given partition of the improved environment;
  data mining the relative occurrence of each of term within the improved environment and assigning a quantitative probability value to each term, establishing a minimum probability value associated with vague terms and establishing a maximum probability value associated with unique terms, wherein vague terms are defined as terms having the highest quantity of occurrences of the term in the improved environment and unique terms are defined as terms having the lowest quantity of occurrences of the term in the improved environment;
  subdividing the improved environment into at least one Superset using independent variable (I) as the primary term of the terms given the query, wherein eliminating from calculation any web page not belonging probabilistically to independent variable (I) as irrelevancy to the query; and mapping the best fit responses to the Superset environmental bitmap;
  iterating refinement subdividing each Superset into a least one Set using independent variable (J) as the secondary term of the terms given the query; wherein eliminating from calculation, using at least one subject matter data warehouse, any web page not belonging probabilistically to independent variable (J) as irrelevancy to the query and mapping the best fit responses to each Set environmental bitmap;
  iterating refinement subdividing each Set into a least one Subset using independent variable (K) as the tertiary term of the terms given the query; using at least one subject matter data warehouse, any web page not belonging probabilistically to independent variable (K) as irrelevancy to the query;
  identifying the results from the managerial hierarchy of environmental bitmaps using 'Boolean Algebra' English language semantics tests of the terms given the query based upon an analysis of results that are associated with the terms and the query; and presenting the results to the at least one subscriber device in an order from highest to lowest probability.

15. The method of claim 14, further comprising:
determining using the output component for each environment bitmap at least one Element defined as the output;
determining the content value as a probability of each result after reading, inspecting and matching on behalf of the end user the content of each web page; wherein probabilistically attenuating from calculation any results with an unlikely probability content value; and
computing the Element returning the top (n) results.

16. The method of claim 15, further comprising dynamically determining the optimal result based on the data mining probability of the at least one term.

17. The method of claim 16, further comprising
iterating refinement to the n(th) terms given the query independent variables X, Y and Z geospatial components using the Global Positioning System (GPS) coordinates of the end user client device defines as smart queries comprising:
independent variable X denotes a country derived from the GPS coordinates,
independent variable Y denotes a set of valid states derived from the GPS coordinates given a distance;
independent variable Z denotes a set of valid cities and zip codes given a distance;
probabilistically attenuating for each Superset results not having independent variable X;
probabilistically attenuating for each Set results not having independent variable Y;
probabilistically attenuating for each Subset results not having independent variable Z;
denoting Boolean algebra independent variable W, as true when a result has a valid address including a telephone number;
probabilistically attenuating each result when independent variable W is false; and
presenting the results to the end user to the at least one subscriber device in an order from highest to lowest probability taking into account distance from the result to the client device location.

18. The method of claim 14, further comprising: identifying the top (n) results based on the analysis of search click data.

19. The method of claim 18, further comprising:
assigning independent variables, $I_{(n)}$ as an array of terms that are semantically similar;
assigning independent variables, $J_{(n)}$ as an array of semantically associations to each parent independent variable $I_{(n)}$ term, and
assigning independent variable $K_{(n)}$, as arrays of semantically associations to each parent independent variable $J_{(n)}$, term and further nesting sets of arrays of independent variables.

* * * * *